(12) United States Patent
Zahdeh et al.

(10) Patent No.: US 12,473,146 B2
(45) Date of Patent: Nov. 18, 2025

(54) AUTONOMOUS TRANSPORT VEHICLE WITH VISION SYSTEM

(71) Applicant: Symbotic LLC, Wilmington, MA (US)

(72) Inventors: Akram Zahdeh, Wilmington, MA (US); Paul Besl, Wilmington, MA (US)

(73) Assignee: Symbotic LLC, Wilmington, MA (US)

( * ) Notice: Subject to any disclaimer, the term of this patent is extended or adjusted under 35 U.S.C. 154(b) by 782 days.

(21) Appl. No.: 17/804,026

(22) Filed: May 25, 2022

(65) Prior Publication Data

US 2023/0050980 A1 Feb. 16, 2023

Related U.S. Application Data

(60) Provisional application No. 63/232,531, filed on Aug. 12, 2021, provisional application No. 63/232,546, filed on Aug. 12, 2021.

(51) Int. Cl.
| | |
|---|---|
| *B65G 1/04* | (2006.01) |
| *B65G 1/06* | (2006.01) |
| *B66F 9/06* | (2006.01) |
| *B66F 9/075* | (2006.01) |
| *G01S 17/931* | (2020.01) |
| *G05D 1/00* | (2006.01) |

(52) U.S. Cl.
CPC ........... *B65G 1/0492* (2013.01); *B65G 1/065* (2013.01); *B66F 9/063* (2013.01); *B66F 9/0755* (2013.01); *G01S 17/931* (2020.01); *G05D 1/0038* (2013.01)

(58) Field of Classification Search
CPC ....... B65G 1/0492; B65G 1/065; B66F 9/063; B66F 9/0755; G05D 1/0038; G05D 1/0234; G05D 1/0253; G01S 15/08; G01S 15/86; G01S 15/88; G01S 17/86; G01S 17/89; G01S 17/894; G01S 17/931
See application file for complete search history.

(56) References Cited

U.S. PATENT DOCUMENTS

| | | | |
|---|---|---|---|
| 8,721,251 B1 * | 5/2014 | Razumov ............. | B65G 1/0492 414/281 |
| 10,365,355 B1 * | 7/2019 | Colarelli, III ......... | G01S 7/4972 |
| 2010/0102625 A1 | 4/2010 | Karimi et al. | |
| 2015/0071743 A1 | 3/2015 | Lert, Jr. | |
| 2016/0103449 A1 | 4/2016 | Desnoyer et al. | |

(Continued)

*Primary Examiner* — Thomas Randazzo
(74) *Attorney, Agent, or Firm* — Perman & Green, LLP

(57) ABSTRACT

An autonomous guided vehicle includes a frame, a drive section, a payload handler, a sensor system, and a supplemental sensor system. The sensor system has electro-magnetic sensors, each responsive to interaction or interface of a sensor emitted or generated electro-magnetic beam or field with a physical characteristic, the electro-magnetic beam or field being disturbed by interaction or interface with the physical characteristic, and which disturbance is detected by and effects sensing of the physical characteristic. The sensor system generates sensor data embodying at least one of a vehicle navigation pose or location information and payload pose or location information. The supplemental sensor system supplements the sensor system, and is, at least in part, a vision system with cameras disposed to capture image data informing the at least one of a vehicle navigation pose or location and payload pose or location supplement to the information of the sensor system.

20 Claims, 25 Drawing Sheets

(56) References Cited

U.S. PATENT DOCUMENTS

| | | | |
|---|---|---|---|
| 2020/0277137 A1* | 9/2020 | Bastian, II | B66F 9/065 |
| 2020/0339351 A1* | 10/2020 | Sullivan | B65G 1/1371 |
| 2021/0039897 A1* | 2/2021 | Cyrulik | B65G 1/1373 |
| 2021/0114826 A1 | 4/2021 | Simon et al. | |
| 2021/0237973 A1 | 8/2021 | Haeggebo et al. | |

* cited by examiner

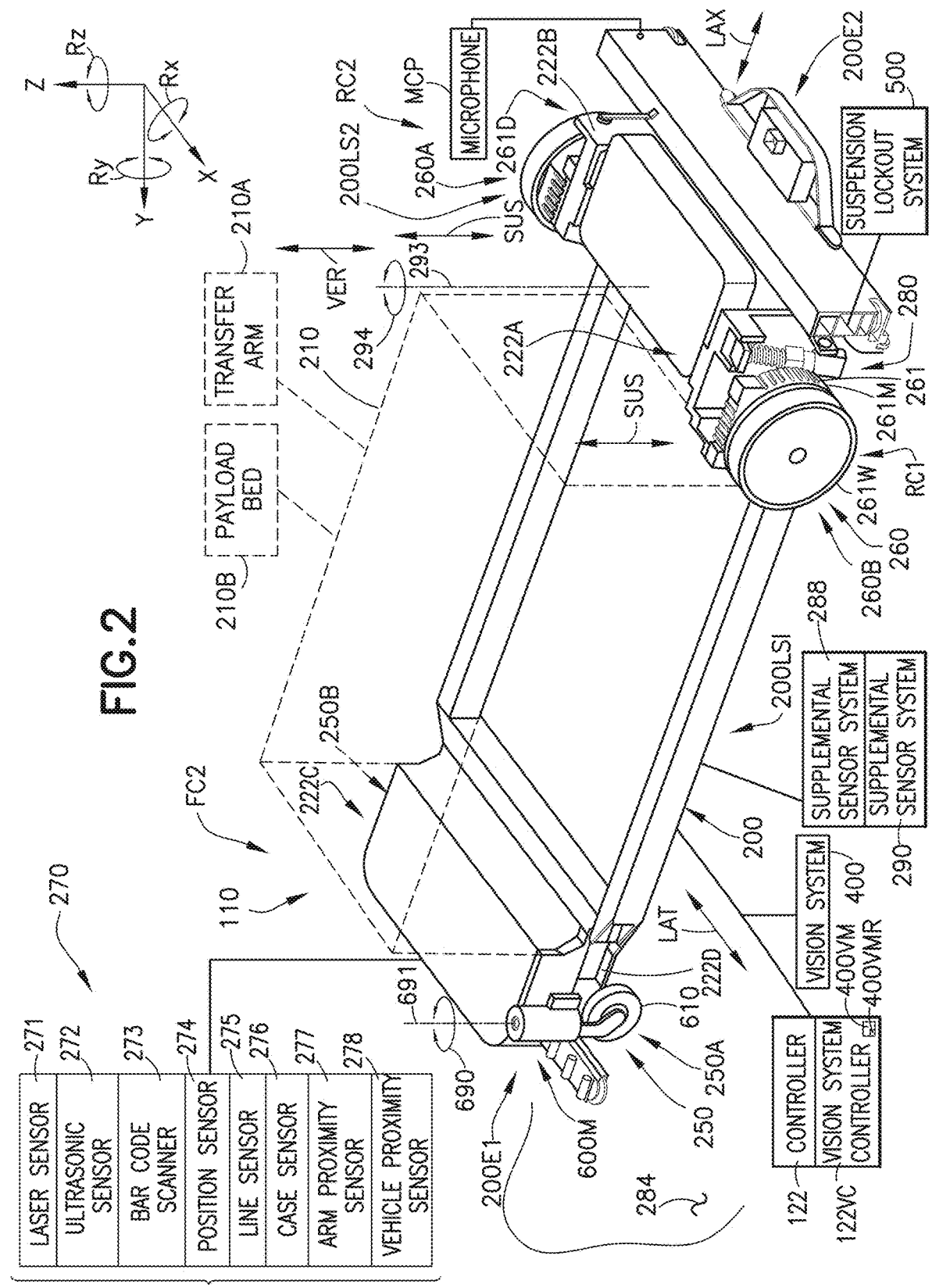

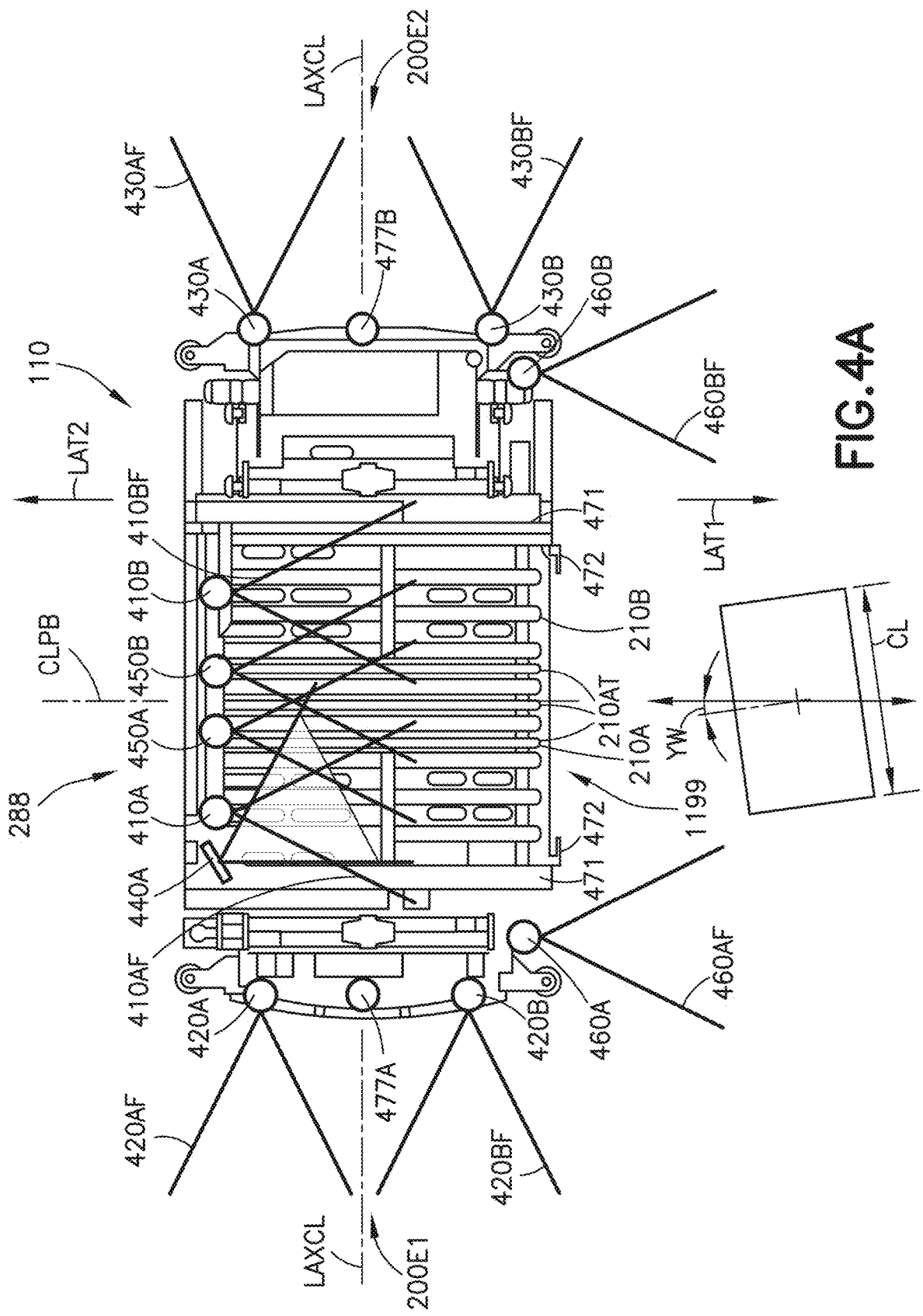

AUTONOMOUS TRANSPORT VEHICLE WITH VISION SYSTEM

CROSS-REFERENCE TO RELATED APPLICATIONS

This application is a non-provisional of and claims the benefit of U.S. provisional patent application No. 63/232,546 filed on Aug. 12, 2021, and U.S. provisional patent application No. 63/232,531 filed on Aug. 12, 2021, the disclosures of which are incorporated herein by reference in their entireties.

BACKGROUND

1. Field

The disclosed embodiment generally relates to material handling systems, and more particularly, to transports for automated storage and retrieval systems.

2. Brief Description of Related Developments

Generally automated storage and retrieval systems employ autonomous vehicles that transport goods within the automated storage and retrieval system. These autonomous vehicles are guided throughout the automated storage and retrieval system by location beacons, capacitive or inductive proximity sensors, line following sensors, reflective beam sensors and other narrowly focused beam type sensors. These sensors may provide limited information for effecting navigation of the autonomous vehicles through the storage and retrieval system or provide limited information with respect to identification and discrimination of hazards that may be present throughout the automated storage and retrieval system.

BRIEF DESCRIPTION OF THE DRAWINGS

The foregoing aspects and other features of the disclosed embodiment are explained in the following description, taken in connection with the accompanying drawings, wherein:

FIG. 2 is an exemplary perspective illustration of an autonomous guided vehicle of the exemplary storage and retrieval system facility of FIG. 1A in accordance with aspects of the disclosed embodiment;

FIG. 4A is an exemplary plan view illustration of the autonomous guided vehicle of FIG. 2 in accordance with aspects of the disclosed embodiment;

DETAILED DESCRIPTION

Figure 1A:
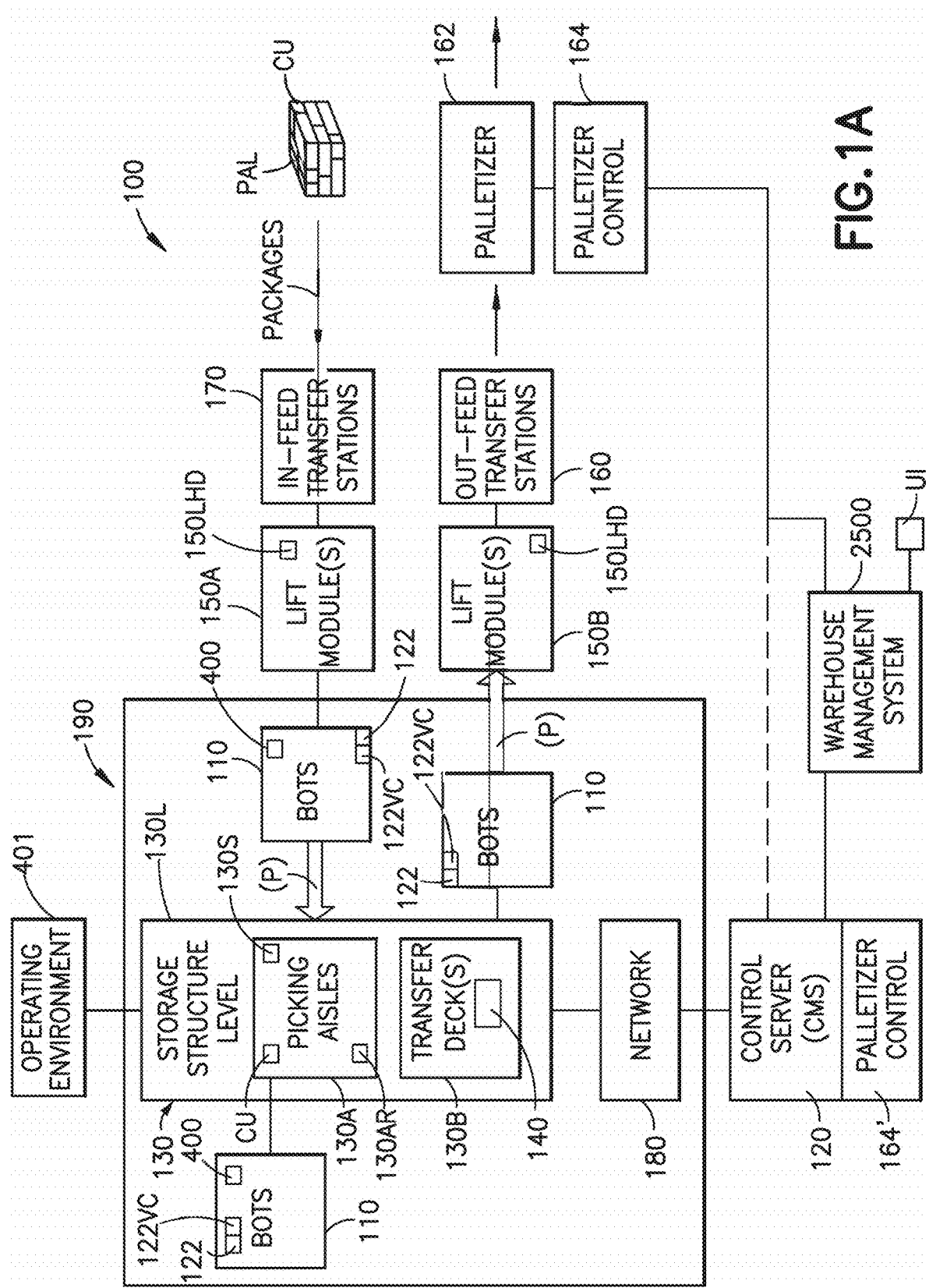
FIG. 1A is a schematic block diagram of an exemplary storage and retrieval system facility incorporating aspects of the disclosed embodiment.
Figure 1B:
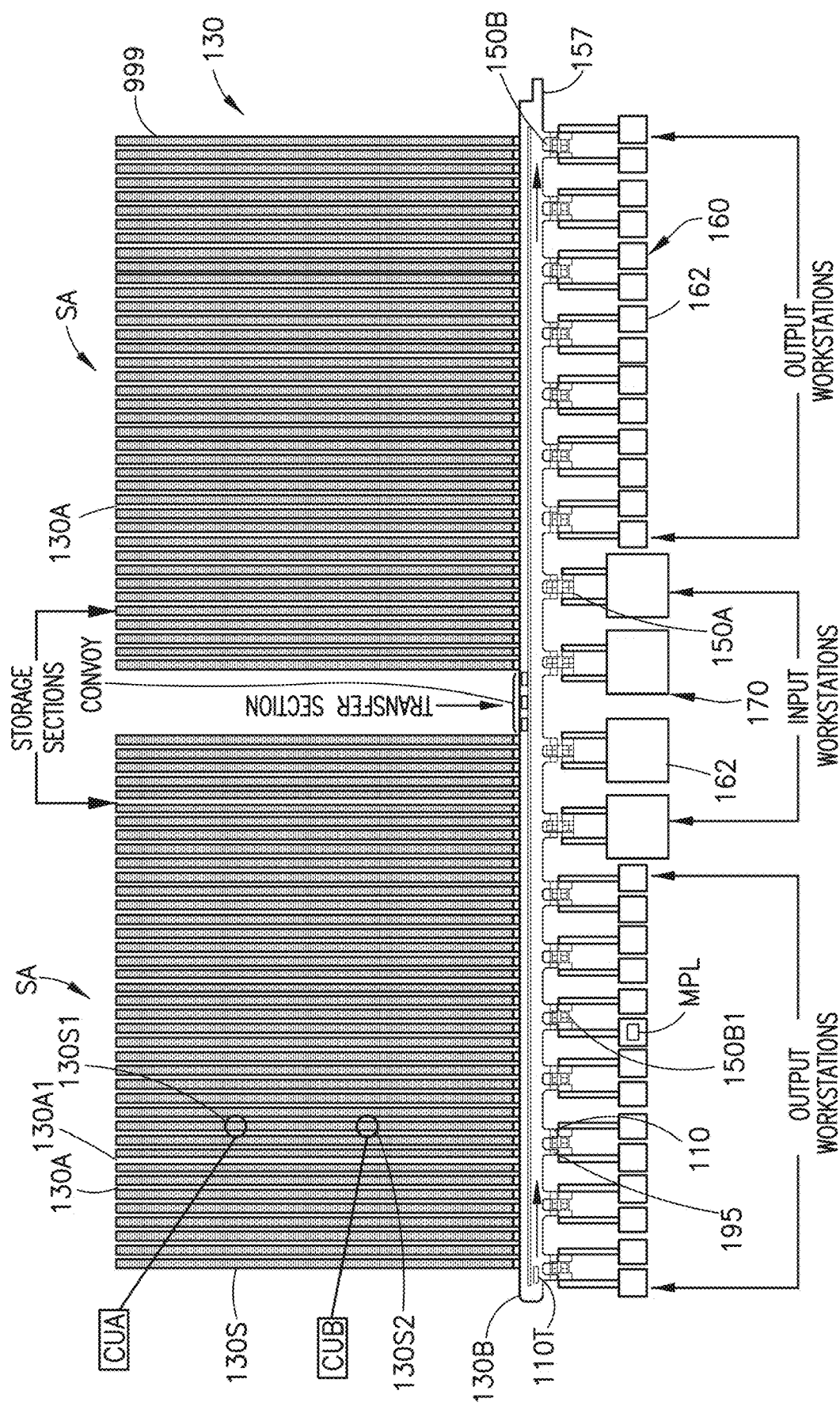
FIG. 1B is a plan view illustration of an the exemplary storage and retrieval system facility of FIG. 1A incorporating aspects of the disclosed embodiment.

FIGS. 1A and 1B illustrate an exemplary automated storage and retrieval system 100 in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

The aspects of the disclosed embodiment provide for an autonomous transport vehicle 110 (also referred to herein as an autonomous guided vehicle) having a physical characteristic sensor system 276 that at least in part effects determination of at least one of a vehicle navigation pose or location and a payload pose or location. The autonomous transport vehicle 110 includes a supplemental or auxiliary navigation system 288 that supplements the information from the physical characteristic sensor system 276 to at least one of verify and increase the accuracy of the vehicle navigation pose or location and the payload pose or location.

In accordance with the aspects of the disclosed embodiment the supplemental navigation sensor system 288 includes a vision system 400 that effects a reduction (e.g., compared to automated transport of case units with conventional vehicles lacking the supplemental sensor system described herein) in case unit transport errors and an increase in storage and retrieval system 100 operation efficiency.

The aspects of the disclosed embodiment also provide for an autonomous transport vehicle 110 having an autonomous navigation/operation sensor system 270 that effects at least in part determination of at least one of a vehicle navigation pose or location and a payload pose or location. The autonomous transport vehicle 110 further includes a supplemental hazard sensor system 290 that supplements the information from the autonomous navigation/operation sensor system 270 for opportunistically determining or discriminating a presence of a predetermined physical characteristic of at least one object or spatial feature 299 (see, e.g., FIGS. 4D and 15) within at least a portion of the facility 100 which the autonomous transport vehicle 110 is navigating (i.e., controller 122 is programmed to command the autonomous transport vehicle to different positions in the facility associated with effecting one or more predetermined payload autonomous transfer tasks). The vehicle navigates to the different positions with the navigation system and operates to effect the predetermined transfer tasks at the different positions separate and distinct from the captured image data by the supplemental hazard sensor system 290 in the different positions. The opportunistic determination/discrimination of the presence of the predetermined physical characteristic of the object or spatial feature 299, incidental or peripheral to the vehicle 110 executing navigation and transfer, causes the controller 122 to selectably reconfigure the autonomous transport vehicle 110 from an autonomous state to a collaborative vehicle state for collaboration with an operator so as to finalize discrimination of the object or spatial feature 299 as a hazard and identify a mitigation action of the vehicle with respect to the hazard (i.e., the collaborative state is supplemental (auxiliary) to the autonomous state of the vehicle (wherein in the autonomous state the vehicle autonomously effects each of the one or more predetermined payload autonomous transfer tasks and in the auxiliary/collaborative state the vehicle collaborates with the operator to discriminate and mitigate hazards as described herein.

It is noted that the supplemental navigation sensor system 288 and the supplemental hazard sensor system 290 may be used in conjunction with each other or separately and may form a common vision system 400 or separate vision systems. In still other aspects, the supplemental hazard sensor system 290 may include sensors from the supplemental navigation sensor system 288 or vice versa (i.e., the supplemental navigation sensor system 288 and the supplemental hazard sensor system 290 share common sensors between the two sensor systems).

In accordance with the aspects of the disclosed embodiment, the autonomous transport vehicle 110 includes at least stereo vision that is focused on at least a payload bed (or bay or area) 210B of the autonomous transport vehicle 110 so that a controller (such as one or more of a control server 120 of the storage and retrieval system 100, a controller 122 of the autonomous transport vehicle 110, or any other suitable controller) or human operator of the storage and retrieval system 100 monitors case unit CU movement to and from the payload bed 210B. The autonomous transport vehicle 110 includes one or more imaging radar systems that independently measure(s) a size and a center point of front faces of case units CU disposed in storage spaces 130S on storage shelves of the storage level structure 130L. As will be described herein, the autonomous transport vehicle may include one or more other navigation and/or vision sensors to effect case unit transfer to and from the payload bed 210B and navigation of the autonomous transport vehicle 110 throughout a respective storage structure level 130L. As will be described further below, imaged or viewed objects described by one or more of supplemental information, supplemental vehicle navigation pose or location, and supplemental payload pose or location, from the supplemental sensor system, are coapted (e.g., fit/combined) to a reference model (or maps—such as model 400VM) of one or more of surrounding facility features and interfacing facility features so as to enhance, via the one or more of the supplemental information, the supplemental vehicle navigation pose or location, and the supplemental payload pose or location resolution of one or more of vehicle navigation pose or location information and payload pose or location information.

For example, referring to FIG. 4A, the autonomous transport vehicle 110 may include a forward looking stereo (e.g., with respect to a direction of travel of the autonomous transport vehicle 110) vision system and a rearward looking (e.g., with respect to the direction of travel) vision system that are configured to effect localization of the autonomous transport vehicle 110 within the storage structure level 130L by detecting any suitable navigation markers or fiducials (e.g., floor tape/lines, structural beams of the storage structure level, storage facility features, etc.) in combination with a storage level floor map and storage structure information (e.g., a virtual model 400VM of locations of columns, storage shelves, storage buffers, floor joints, etc.). Here, the storage level map (or model) and storage structure information embody the location(s) of the navigation markers so that upon recognition of the markers by the vision system 400 the autonomous transport vehicle 110 determines its localized position within the storage and retrieval system 100. The autonomous transport vehicle 110 may include one or more cameras that face upward for detecting any suitable navigation markers or fiducials located on a ceiling of the storage structure level 130L and determining a localization of the autonomous transport vehicle 110 using the storage level floor map and storage structure information. The autonomous transport vehicle 110 may include at least one sideways looking traffic monitoring camera that is configured to monitor autonomous transport vehicle traffic along transfer decks 130B of the storage and retrieval system 100 to facilitate autonomous transport vehicle 110 entry to a transfer deck 130B and merging of the autonomous transport vehicle 110 with other autonomous transport vehicles 110 already travelling along the transfer deck(s) 130B.

Figure 4B:
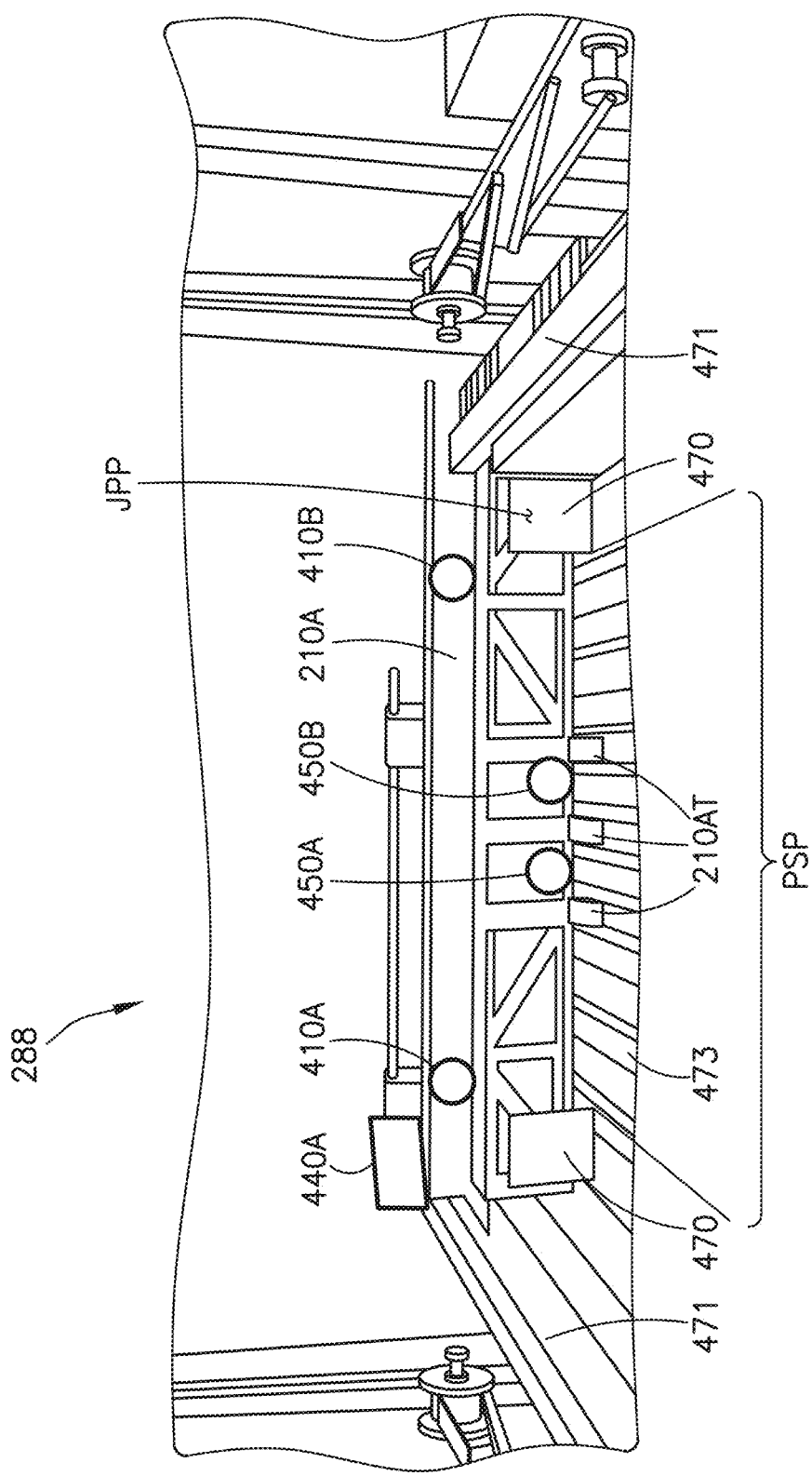
FIG. 4B is an exemplary perspective illustration of a portion of the autonomous guided vehicle of FIG. 2 in accordance with aspects of the disclosed embodiment.
Figure 4C:
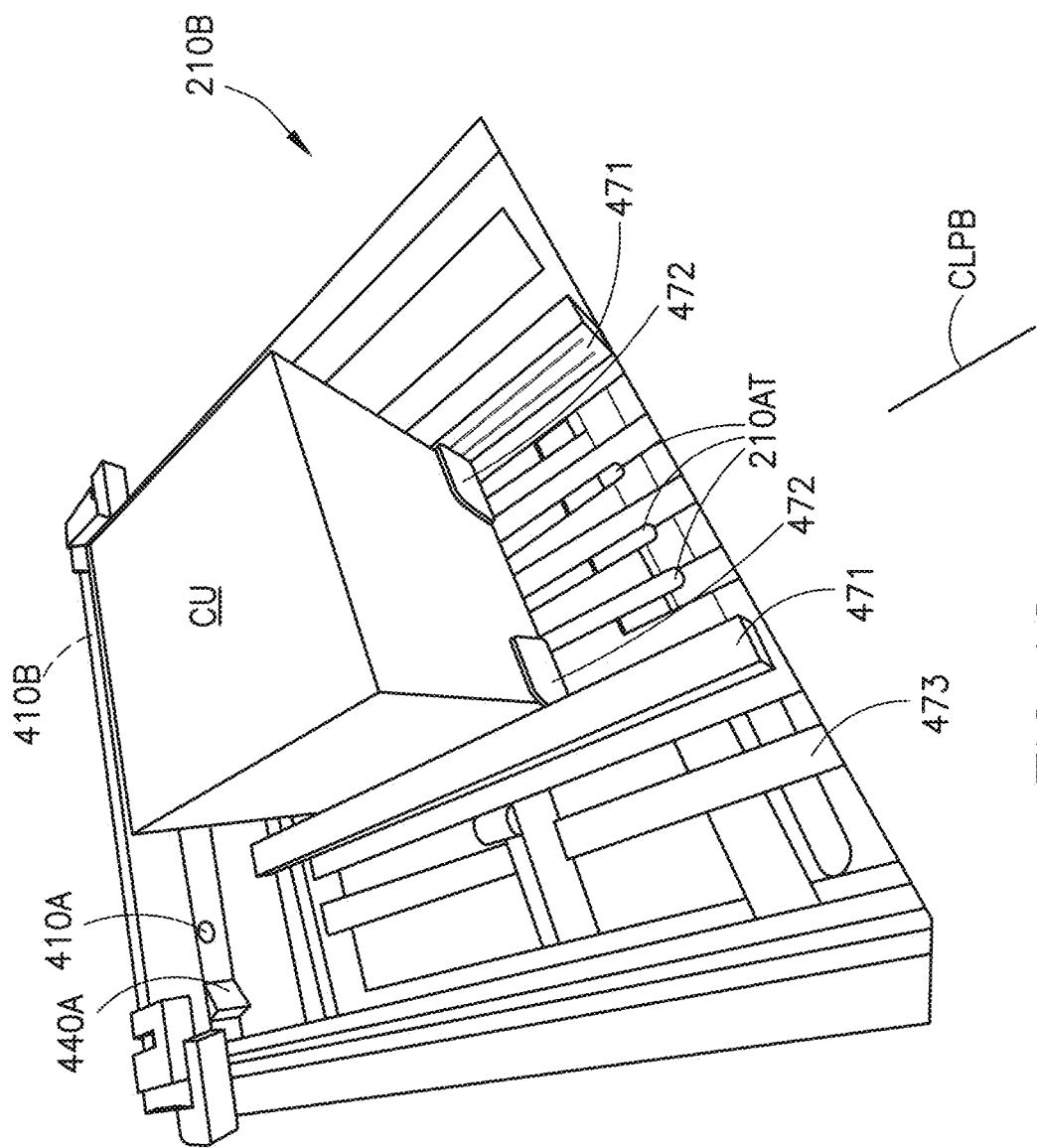
FIG. 4C is an exemplary perspective illustration of a portion of the autonomous guided vehicle of FIG. 2 in accordance with aspects of the disclosed embodiment.
Figure 4D:
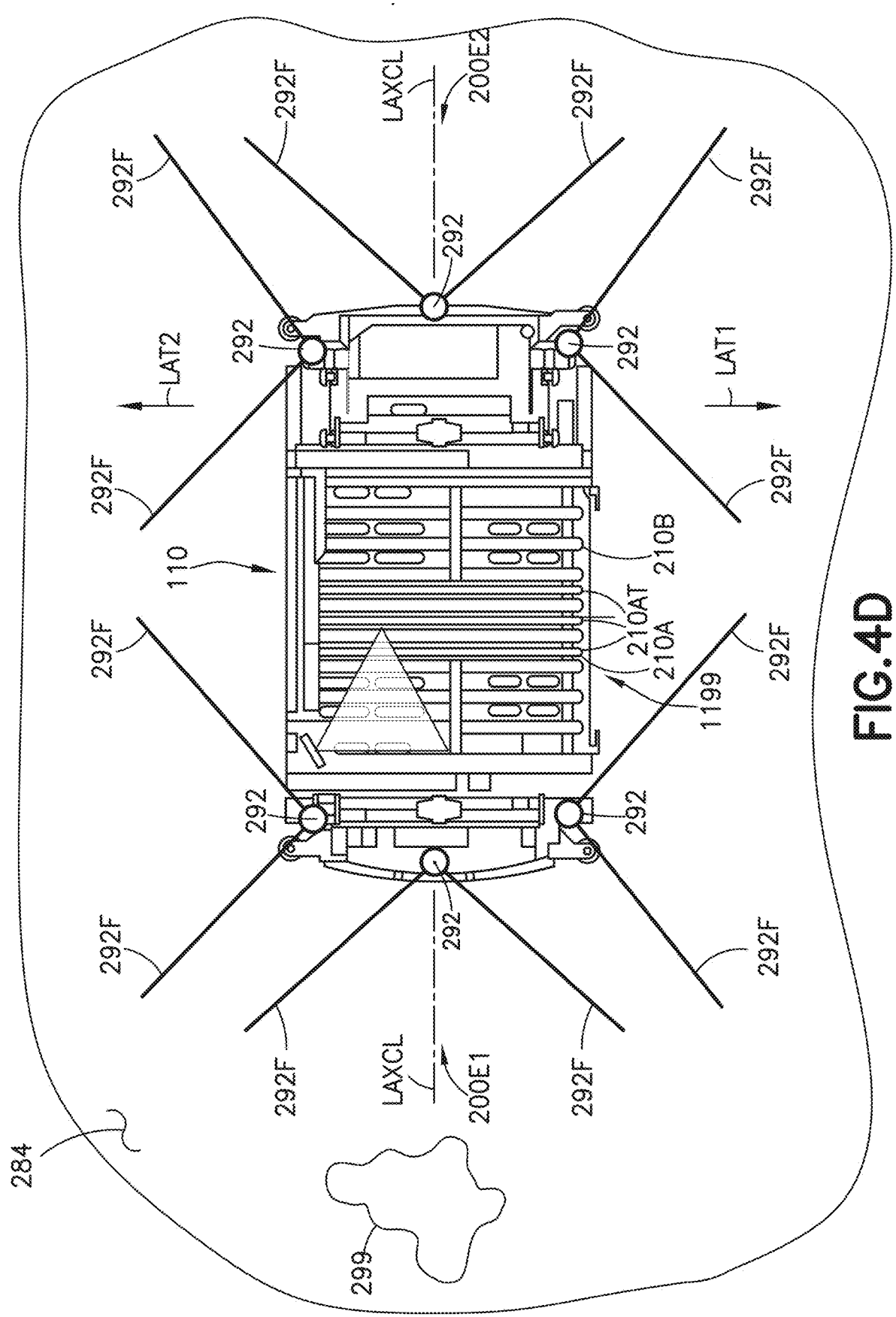
FIG. 4D is an exemplary plan view illustration of the autonomous guided vehicle of FIG. 2 in accordance with aspects of the disclosed embodiment.

Referring to FIG. 4D, the autonomous transport vehicle 110 may also include a forward looking (e.g., with respect to a direction of travel of the autonomous transport vehicle 110) or omnidirectional (x, y, z, θ) vision system and/or a rearward looking (e.g., with respect to the direction of travel) vision system that is configured to effect imaging (available for continuous or periodical) for monitoring (supplemental to autonomous navigating sensor system 270) of the areas or spaces along autonomous travel paths of the autonomous transport vehicle 110 within, e.g., a storage structure level 130L and detecting any objects/hazards that may encroach on the bot travel path. In one aspect, as will be described below, the vision system 400 may effect imaging for supplemental monitoring and detection (of the objects/hazards) by the controller 122 so that monitoring and detection is performed resident on (e.g., onboard) the autonomous transport vehicle 110, such as by employment of a reference storage level floor map and storage structure information (e.g., a virtual model 400VM of locations of columns, storage shelves, storage buffers, floor joints, etc.); and from indication by the controller 122 of such detection and in collaboration with a remote operator remotely accessing the vision system effecting collaborative monitoring/detecting/identifying/discriminating/mitigating of the object 299 (see FIG. 15) with the vehicle 110 in the collaborative state. Where the vision system 400 of the autonomous transport vehicle 110 senses or detects the presence of objects/hazards which are not present in the reference storage level map and storage structure information, a determination of the object(s)/hazard(s) type(s) is effected upon indication by the controller by a remote operator receiving the images/video of the object/hazard transmitted from/by the autonomous transport vehicle 110 to the user interface UI.

As will be described herein, the autonomous transport vehicle 110 includes a vision system controller 122VC disposed onboard the autonomous transport vehicle and communicably coupled to the vision system 400 of the autonomous transport vehicle 110. The vision system controller 122VC is configured with model based vision in that the vision system controller 122VC simulates/models the storage and retrieval system 100 (e.g., based on any suitable information such as computer aided drafting (CAD) data of the storage and retrieval system structure or other suitable data stored in memory or accessible by the vision system controller 122VC that effects modeling/simulation of the storage and retrieval system 100) and compares the data obtained with the vision system 400 to the model/simulation of the storage and retrieval system structure to effect one or more or bot localization and imaging of the object/hazard. Here the autonomous transport vehicle 110 is configured to compare what it "sees" with the vision system 400 substantially directly with what the autonomous transport vehicle 110 expects to "see" based on the simulation of the (reference) storage and retrieval system structure.

The supplemental sensor system also effects augmented reality operator inspection of the storage and retrieval system environment as well as remote control of the autonomous transport vehicle 110 as will be described herein.

In accordance with the aspects of the disclosed embodiment the supplemental navigation sensor system 288 and/or the supplemental hazard sensor system 290 includes a vision system 400 that effects transmission (e.g., streaming live video, time stamped images, or any other suitable manner of transmission) of images/video to a remote operator for identification of the object/hazard present within the facility 100 (e.g., an object extending across the bot travel path, blocking the bot, proximate the bot within a predetermined distance) which is "unknown" (i.e., unidentifiable) by the autonomous transport vehicle 110. In accordance with the aspects of the disclosed embodiment, a controller (such as one or more of a control server 120 of the storage and retrieval system 100, a controller 122 of the autonomous transport vehicle 110, the vision system controller 122VC, or any other suitable controller) or human operator of the storage and retrieval system 100 monitors, via the vision system 400, the bot travel paths as the autonomous transport vehicle 110 navigates the facility to perform autonomous storage and retrieval tasks in accordance with the controller 122 commands. Further, and incidental to effecting the autonomous tasks, the vehicle 110 opportunistically discovers any objects/hazards within the facility 100 which could (based on predetermined initially identified criteria programmed in the controller 122) disrupt bot operations and/or traffic of other bots also navigating the facility 100 autonomously performing storage and retrieval tasks (i.e., the controller is configured so that determination of presence of object/hazard is coincident, at least in part, with, but supplemental and peripheral to bot actions (demanded for) effecting each of the one or more predetermined payload autonomous transfer tasks).

In accordance with the aspects of the disclosed embodiment, the automated storage and retrieval system 100 in FIGS. 1A and 1B may be disposed in a retail distribution center or warehouse, for example, to fulfill orders received from retail stores for replenishment goods shipped in cases, packages, and or parcels. The terms case, package and parcel are used interchangeably herein and as noted before may be any container that may be used for shipping and may be filled with case or more product units by the producer. Case or cases as used herein means case, package or parcel units not stored in trays, on totes, etc. (e.g., uncontained). It is noted that the case units CU (also referred to herein as mixed cases, cases, and shipping units) may include cases of items/unit (e.g., case of soup cans, boxes of cereal, etc.) or individual item/units that are adapted to be taken off of or placed on a pallet. In accordance with the exemplary embodiments, shipping cases or case units (e.g., cartons, barrels, boxes, crates, jugs, shrink wrapped trays or groups or any other suitable device for holding case units) may have variable sizes and may be used to hold case units in shipping and may be configured so they are capable of being palletized for shipping. Case units may also include totes, boxes, and/or containers of one or more individual goods, unpacked/decommissioned (generally referred to as breakpack goods) from original packaging and placed into the tote, boxes, and/or containers (collectively referred to as totes) with one or more other individual goods of mixed or common types at an order fill station. It is noted that when, for example, incoming bundles or pallets (e.g., from manufacturers or suppliers of case units arrive at the storage and retrieval system for replenishment of the automated storage and retrieval system 100, the content of each pallet may be uniform (e.g. each pallet holds a predetermined number of the same item—one pallet holds soup and another pallet holds cereal). As may be realized, the cases of such pallet load may be substantially similar or in other words, homogenous cases (e.g. similar dimensions), and may have the same SKU (otherwise, as noted before the pallets may be "rainbow" pallets having layers formed of homogeneous cases). As pallets leave the storage and retrieval system, with cases or totes filling replenishment orders, the pallets may contain any suitable number and combination of different case units (e.g., each pallet may hold different types of case units—a pallet holds a combination of canned soup, cereal, beverage packs, cosmetics and household cleaners). The cases combined onto a single pallet may have different dimensions and/or different SKU's.

The automated storage and retrieval system 100 may be generally described as a storage and retrieval engine 190 coupled to a palletizer 162. In greater detail now, and with reference still to FIGS. 1A and 1B, the storage and retrieval system 100 may be configured for installation in, for example, existing warehouse structures or adapted to new warehouse structures. As noted before the automated storage and retrieval system 100 shown in FIGS. 1A and 1B is representative and may include for example, in-feed and out-feed conveyors terminating on respective transfer stations 170, 160, lift module(s) 150A, 150B, a storage structure 130, and a number of autonomous transport vehicles 110 (also referred to herein as "bots"). It is noted that the storage and retrieval engine 190 is formed at least by the storage structure 130 and the autonomous transport vehicles 110 (and in some aspect the lift modules 150A, 150B; however in other aspects the lift modules 150A, 150B may form vertical sequencers in addition to the storage and retrieval engine 190 as described in U.S. patent application Ser. No. 17/091,265 filed on Nov. 6, 2020 and titled "Pallet Building System with Flexible Sequencing," the disclosure of which is incorporated herein by reference in its entirety). In alternate aspects, the storage and retrieval system 100 may also include robot or bot transfer stations (not shown) that may provide an interface between the autonomous transport vehicles 110 and the lift module(s) 150A, 150B. The storage structure 130 may include multiple levels of storage rack modules where each storage structure level 130L of the storage structure 130 includes respective picking aisles 130A, and transfer decks 130B for transferring case units between any of the storage areas of the storage structure 130 and a shelf of the lift module(s) 150A, 150B. The picking aisles 130A are in one aspect configured to provide guided travel of the autonomous transport vehicles 110 (such as along rails 130AR) while in other aspects the picking aisles are configured to provide unrestrained travel of the autonomous transport vehicle 110 (e.g., the picking aisles are open and undeterministic with respect to autonomous transport vehicle 110 guidance/travel). The transfer decks 130B have open and undeterministic bot support travel surfaces along which the autonomous transport vehicles 110 travel under guidance and control provided by bot steering (as will be described herein). In one or more aspects, the transfer decks have multiple lanes between which the autonomous transport vehicles 110 freely transition for accessing the picking aisles 130A and/or lift modules 150A, 150B. As used herein, "open and undeterministic" denotes the travel surface of the picking aisle and/or the transfer deck has no mechanical restraints (such as guide rails) that delimit the travel of the autonomous transport vehicle 110 to any given path along the travel surface.

The picking aisles 130A, and transfer decks 130B also allow the autonomous transport vehicles 110 to place case units CU into picking stock and to retrieve ordered case units CU (and define the different positions where the bot performs autonomous tasks, though any number of locations in the storage structure (e.g., decks, aisles, storage racks, etc.) can be one or more of the different positions). In alternate aspects, each level may also include respective bot transfer stations 140. The autonomous transport vehicles 110 may be configured to place case units, such as the above described retail merchandise, into picking stock in the one or more storage structure levels 130L of the storage structure 130 and then selectively retrieve ordered case units for shipping the ordered case units to, for example, a store or other suitable location. The in-feed transfer stations 170 and out-feed transfer stations 160 may operate together with their respective lift module(s) 150A, 150B for bi-directionally transferring case units CU to and from one or more storage structure levels 130L of the storage structure 130. It is noted that while the lift modules 150A, 150B may be described as being dedicated inbound lift modules 150A and outbound lift modules 150B, in alternate aspects each of the lift modules 150A, 150B may be used for both inbound and outbound transfer of case units from the storage and retrieval system 100.

As may be realized, the storage and retrieval system 100 may include multiple in-feed and out-feed lift modules 150A, 150B that are accessible by, for example, autonomous transport vehicles 110 of the storage and retrieval system 100 so that one or more case unit(s), uncontained (e.g., case unit(s) are not held in trays), or contained (within a tray or tote) can be transferred from a lift module 150A, 150B to each storage space on a respective level and from each storage space to any one of the lift modules 150A, 150B on a respective level. The autonomous transport vehicles 110 may be configured to transfer the case units between the storage spaces 130S (e.g., located in the picking aisles 130A or other suitable storage space/case unit buffer disposed along the transfer deck 130B) and the lift modules 150A, 150B. Generally, the lift modules 150A, 150B include at least one movable payload support that may move the case unit(s) between the in-feed and out-feed transfer stations 160, 170 and the respective level of the storage space where the case unit(s) is stored and retrieved. The lift module(s) may have any suitable configuration, such as for example reciprocating lift, or any other suitable configuration. The lift module(s) 150A, 150B include any suitable controller (such as control server 120 or other suitable controller coupled to control server 120, warehouse management system 2500, and/or palletizer controller 164, 164') and may form a sequencer or sorter in a manner similar to that described in U.S. patent application Ser. No. 16/444,592 filed on Jun. 18, 2019 and titled "Vertical Sequencer for Product Order Fulfillment" (the disclosure of which is incorporated herein by reference in its entirety).

The automated storage and retrieval system may include a control system, comprising for example one or more control servers 120 that are communicably connected to the in-feed and out-feed conveyors and transfer stations 170, 160, the lift modules 150A, 150B, and the autonomous transport vehicles 110 via a suitable communication and control network 180. The communication and control network 180 may have any suitable architecture which, for example, may incorporate various programmable logic controllers (PLC) such as for commanding the operations of the in-feed and out-feed conveyors and transfer stations 170, 160, the lift modules 150A, 150B, and other suitable system automation. The control server 120 may include high level programming that effects a case management system (CMS) managing the case flow system. The network 180 may further include suitable communication for effecting a bi-directional interface with the autonomous transport vehicles 110. For example, the autonomous transport vehicles 110 may include an on-board processor/controller 122. The network 180 may include a suitable bi-directional communication suite enabling the autonomous transport vehicle controller 122 to request or receive commands from the control server 120 for effecting desired transport (e.g. placing into storage locations or retrieving from storage locations) of case units and to send desired autonomous transport vehicle 110 information and data including autonomous transport vehicle 110 ephemeris, status and other desired data, to the control server 120. As seen in FIGS. 1A and 1B, the control server 120 may be further connected to a warehouse management system 2500 for providing, for example, inventory management, and customer order fulfillment information to the CMS level program of control server 120. As noted before, the control server 120, and/or the warehouse management system 2500 allow for a degree of collaborative control, at least of bots 110, via a user interface UI, as will be further described below. A suitable example of an automated storage and retrieval system arranged for holding and storing case units is described in U.S. Pat. No. 9,096,375, issued on Aug. 4, 2015 the disclosure of which is incorporated by reference herein in its entirety.

Referring now to FIGS. 1A, 1B, and 2, the autonomous transport vehicle 110 (which may also be referred to herein as an autonomous guided vehicle or bot) includes a frame 200 with an integral payload support or bed 210B. The frame 200 has a front end 200E1 and a back end 200E2 that define a longitudinal axis LAX of the autonomous transport vehicle 110. The frame 200 may be constructed of any suitable material (e.g., steel, aluminum, composites, etc.) and includes a case handling assembly 210 configured to handle cases/payloads transported by the autonomous transport vehicle 110. The case handling assembly 210 includes any suitable payload bed 210B (also referred to herein as a payload bay or payload hold) on which payloads are placed for transport and/or any suitable transfer arm 210A (also referred to herein as a payload handler) connected to the frame. The transfer arm 210A is configured to (autonomously) transfer a payload (such as a case unit CU), with a flat undeterministic seating surface seated in the payload bed 210B, to and from the payload bed 210B of the autonomous guided vehicle 110 and a storage location (such as storage space 130S on storage shelf 555 (see FIG. 5A), a shelf of lift module 150A, 150B, buffer, transfer station, and/or any other suitable storage location), of the payload CU, in a storage array SA, where the storage location 130S, in the storage array SA, is separate and distinct from the transfer arm 210A and the payload bed 210B. The transfer arm 210A is configured to extend laterally in direction LAT and/or vertically in direction VER to transport payloads to and from the payload bed 210B. Examples of suitable payload beds 210B and transfer arms 210A and/or autonomous transport vehicles to which the aspects of the disclosed embodiment may be applied can be found in United States pre-grant publication number 2012/0189416 published on Jul. 26, 2012 (U.S. patent application Ser. No. 13/326,952 filed on Dec. 15, 2011) and titled "Automated Bot with Transfer Arm"; U.S. Pat. No. 7,591,630 issued on Sep. 22, 2009 titled "Materials-Handling System Using Autonomous Transfer and Transport Vehicles"; U.S. Pat. No. 7,991,505 issued on Aug. 2, 2011 titled "Materials-Handling System Using Autonomous Transfer and Transport Vehicles"; U.S. Pat. No. 9,561,905 issued on Feb. 7, 2017 titled "Autonomous Transport Vehicle"; U.S. Pat. No. 9,082,112 issued on Jul. 14, 2015 titled "Autonomous Transport Vehicle Charging System"; U.S. Pat. No. 9,850,079 issued on Dec. 26, 2017 titled "Storage and Retrieval System Transport Vehicle"; U.S. Pat. No. 9,187,244 issued on Nov. 17, 2015 titled "Bot Payload Alignment and Sensing"; U.S. Pat. No. 9,499,338 issued on Nov. 22, 2016 titled "Automated Bot Transfer Arm Drive System"; U.S. Pat. No. 8,965,619 issued on Feb. 24, 2015 titled "Bot Having High Speed Stability"; U.S. Pat. No. 9,008,884 issued on Apr. 14, 2015 titled "Bot Position Sensing"; U.S. Pat. No. 8,425,173 issued on Apr. 23, 2013 titled "Autonomous Transports for Storage and Retrieval Systems"; and U.S. Pat. No. 8,696,010 issued on Apr. 15, 2014 titled "Suspension System for Autonomous Transports", the disclosures of which are incorporated herein by reference in their entireties.

The frame 200 includes one or more idler wheels or casters 250 disposed adjacent the front end 200E1. The frame 200 also includes one or more drive wheels 260 disposed adjacent the back end 200E2. In other aspects, the position of the casters 250 and drive wheels 260 may be reversed (e.g., the drive wheels 260 are disposed at the front end 200E1 and the casters 250 are disposed at the back end 200E2). It is noted that in some aspects, the autonomous transport vehicle 110 is configured to travel with the front end 200E1 leading the direction of travel or with the back end 200E2 leading the direction of travel. In one aspect, casters 250A, 250B (which are substantially similar to caster 250 described herein) are located at respective front corners of the frame 200 at the front end 200E1 and drive wheels 260A, 260B (which are substantially similar to drive wheel 260 described herein) are located at respective back corners of the frame 200 at the back end 200E2 (e.g., a support wheel is located at each of the four corners of the frame 200) so that the autonomous transport vehicle 110 stably traverses the transfer deck(s) 130B and picking aisles 130A of the storage structure 130.

The autonomous transport vehicle 110 includes a drive section 261D, connected to the frame 200, with drive wheels 260 supporting the autonomous transport vehicle 110 on a traverse/rolling surface 284, where the drive wheels 260 effect vehicle traverse on the traverse surface 284 moving the autonomous transport vehicle 110 over the traverse surface 284 in a facility (e.g., such as a warehouse, store, etc.). The drive section 261D has at least a pair of traction drive wheels 260 (also referred to as drive wheels 260—see drive wheels 260A, 260B) astride the drive section 261D. As described herein, the drive wheels 260 have a fully independent suspension 280 coupling each drive wheel 260A, 260B of the at least pair of drive wheels 260 to the frame 200, with at least one intervening pivot link (described herein) between at least one drive wheel 260A, 260B and the frame 200 configured to maintain a substantially steady state traction contact patch between the at least one drive wheel 260A, 260B and rolling/travel surface 284 (also referred to as autonomous vehicle travel surface 284) over rolling surface transients (e.g., bumps, surface transitions, etc.) Suitable examples of the fully independent suspension 280 can be found in U.S. provisional patent application No. 63/213,589 titled "Autonomous Transport Vehicle with Synergistic Vehicle Dynamic Response" filed on Jun. 22, 2021, the disclosure of which is incorporated herein by reference in its entirety.

Figure 3A:
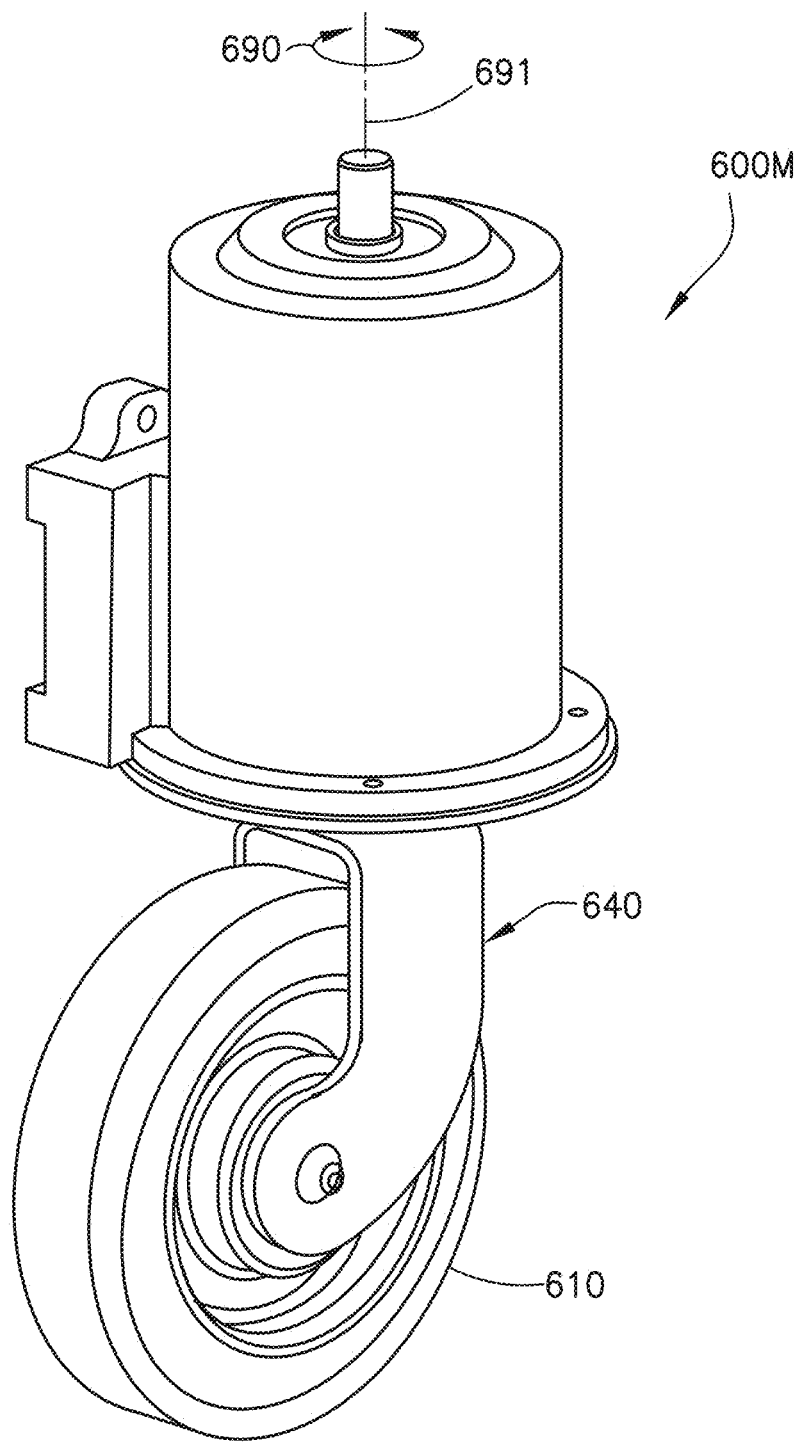
FIGS. 3A and 3B are exemplary perspective illustrations of portions of the autonomous guided vehicle of FIG. 2 in accordance with aspects of the disclosed embodiment.
Figure 3B:
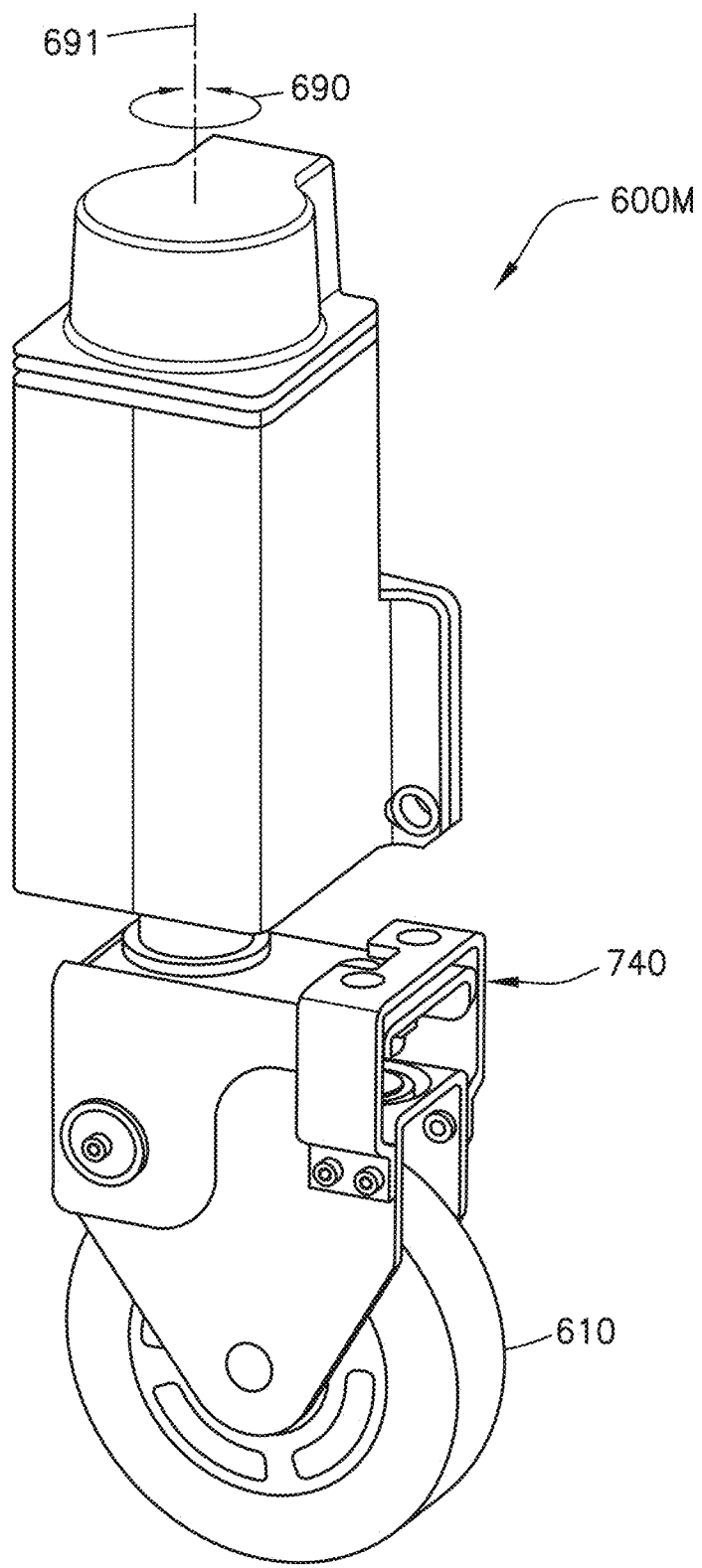

As described above, and also referring to FIGS. 3A and 3B, the frame 200 includes one or more casters 250 disposed adjacent the front end 200E1. In one aspect, a caster 250 is located adjacent each front corner of the frame 200 so that in combination with the drive wheels 260 disposed at each rear corner of the frame 200, the frame 200 stably traverses the transfer deck 130B and picking aisles 130A of the storage structure 130. Referring to FIGS. 2, 3A and 3B, in one aspect, each caster 250 comprises a motorized (e.g., active/motorized steering) caster 600M; however, in other aspects the caster 250 may be a passive (e.g., un-motorized)

caster. In one aspect, the motorized caster 600M includes a caster wheel 610 coupled to a fixed geometry wheel fork 640 (FIG. 3A); while in other aspects the caster wheel 610 is coupled to a variable geometry or articulated (e.g., suspension) fork 740. Each motorized caster 600M is configured to actively pivot its respective caster wheel 610 (independent of the pivoting of other wheels of other motorized casters) in direction 690 about caster pivot axis 691 to at least assist in effecting a change in the travel direction of the autonomous transport vehicle 110. Suitable examples of casters can be found in U.S. provisional patent application No. 63/213,589 filed on Jun. 22, 2021 (previously incorporated herein by reference in its entirety) and U.S. provisional patent application No. 63/193,188 titled "Autonomous Transport Vehicle with Steering" filed on May 26, 2021, the disclosure of which is incorporated herein by reference in its entirety.

The autonomous transport vehicle 110 includes a physical characteristic sensor system 270 (also referred to as an autonomous navigation operation sensor system) connected to the frame 200. The physical characteristic sensor system 270 has electro-magnetic sensors. Each of the electro-magnetic sensors responsive is to interaction or interface of a sensor emitted or generated electro-magnetic beam or field with a physical characteristic (e.g., of the storage structure or a transient object such as a case unit CU, debris, etc.), where the electro-magnetic beam or field is disturbed by interaction or interface with the physical characteristic. The disturbance in the electro-magnetic beam is detected by and effects sensing by the electro-magnetic sensor of the physical characteristic, wherein the physical characteristic sensor system 270 is configured to generate sensor data embodying at least one of a vehicle navigation pose or location (relative to the storage and retrieval system or facility in which the autonomous transport vehicle 110 operates) information and payload pose or location (relative to a storage location 130S or the payload bed 210B) information.

The physical characteristic sensor system 270 includes, for exemplary purposes only, one or more of laser sensor(s) 271, ultrasonic sensor(s) 272, bar code scanner(s) 273, position sensor(s) 274, line sensor(s) 275, case sensors 278 (e.g., for sensing case units within the payload bed 210B onboard the vehicle 110 or on a storage shelf off-board the vehicle 110), arm proximity sensor(s) 277, vehicle proximity sensor(s) 278 or any other suitable sensors for sensing a position of the vehicle 110 or a payload (e.g., case unit CU). In some aspects, supplemental navigation sensor system 288 may form a portion of the physical characteristic sensor system 270. Suitable examples of sensors that may be included in the physical characteristic sensor system 270 are described in U.S. Pat. No. 8,425,173 titled "Autonomous Transport for Storage and Retrieval Systems" issued on Apr. 23, 2013, U.S. Pat. No. 9,008,884 titled "Bot Position Sensing" issued on Apr. 14, 2015, and 9,946,265 titled Bot Having High Speed Stability" issued on Apr. 17, 2018, the disclosures of which are incorporated herein by reference in their entireties.

The sensors of the physical characteristic sensor system 270 may be configured to provide the autonomous transport vehicle 110 with, for example, awareness of its environment and external objects, as well as the monitor and control of internal subsystems. For example, the sensors may provide guidance information, payload information or any other suitable information for use in operation of the autonomous transport vehicle 110.

The bar code scanner(s) 273 may be mounted on the autonomous transport vehicle 110 in any suitable location. The bar code scanners(s) 273 may be configured to provide an absolute location of the autonomous transport vehicle 110 within the storage structure 130. The bar code scanner(s) 273 may be configured to verify aisle references and locations on the transfer decks by, for example, reading bar codes located on, for example the transfer decks, picking aisles and transfer station floors to verify a location of the autonomous transport vehicle 110. The bar code scanner(s) 273 may also be configured to read bar codes located on items stored in the shelves 555.

The position sensors 274 may be mounted to the autonomous transport vehicle 110 at any suitable location. The position sensors 274 may be configured to detect reference datum features (or count the slats 520L of the storage shelves 555) (e.g. see FIG. 5A) for determining a location of the vehicle 110 with respect to the shelving of, for example, the picking aisles 130A (or a buffer/transfer station located adjacent the transfer deck 130B or lift 150). The reference datum information may be used by the controller 122 to, for example, correct the vehicle's odometry and allow the autonomous transport vehicle 110 to stop with the support tines 210AT of the transfer arm 210A positioned for insertion into the spaces between the slats 520L (see, e.g., FIG. 5A). In one exemplary embodiment, the vehicle 110 may include position sensors 274 on the drive (rear) end 200E2 and the driven (front) end 200E1 of the autonomous transport vehicle 110 to allow for reference datum detection regardless of which end of the autonomous transport vehicle 110 is facing the direction the vehicle is travelling.

The line sensors 275 may be any suitable sensors mounted to the autonomous transport vehicle 110 in any suitable location, such as for exemplary purposes only, on the frame 200 disposed adjacent the drive (rear) and driven (front) ends 200E2, 200E1 of the autonomous transport vehicle 110. For exemplary purposes only, the line sensors 275 may be diffuse infrared sensors. The line sensors 275 may be configured to detect guidance lines 900 (see FIGS. 9A and 15) provided on, for example, the floor of the transfer decks 130B. The autonomous transport vehicle 110 may be configured to follow the guidance lines when travelling on the transfer decks 130B and defining ends of turns when the vehicle is transitioning on or off the transfer decks 130B. The line sensors 275 may also allow the vehicle 110 to detect index references for determining absolute localization where the index references are generated by crossed guidance lines (see FIGS. 9A and 15).

The case sensors 276 may include case overhang sensors and/or other suitable sensors configured to detect the location/pose of a case unit CU within the payload bed 210B. The case sensors 276 may be any suitable sensors that are positioned on the vehicle so that the sensor(s) field of view(s) span the payload bed 210B adjacent the top surface of the support tines 210AT (see FIGS. 4A and 4B). The case sensors 276 may be disposed at the edge of the payload bed 210B (e.g., adjacent a transport opening 1199 of the payload bed 210B to detect any case units CU that are at least partially extending outside of the payload bed 210B.

The arm proximity sensors 277 may be mounted to the autonomous transport vehicle 110 in any suitable location, such as for example, on the transfer arm 210A. The arm proximity sensors 277 may be configured to sense objects around the transfer arm 210A and/or support tines 210AT of the transfer arm 210A as the transfer arm 210A is raised/lowered and/or as the support tines 210AT are extended/retracted.

The laser sensors 271 and ultrasonic sensors 272 may be configured to allow the autonomous transport vehicle 110 to locate itself relative to each case unit forming the load carried by the autonomous transport vehicle 110 before the case units are picked from, for example, the storage shelves 555 and/or lift 150 (or any other location suitable for retrieving payload). The laser sensors 271 and ultrasonic sensors 272 may also allow the vehicle to locate itself relative to empty storage locations 130S for placing case units in those empty storage locations 130S. The laser sensors 271 and ultrasonic sensors 272 may also allow the autonomous transport vehicle 110 to confirm that a storage space (or other load depositing location) is empty before the payload carried by the autonomous transport vehicle 110 is deposited in, for example, the storage space 130S. In one example, the laser sensor 271 may be mounted to the autonomous transport vehicle 110 at a suitable location for detecting edges of items to be transferred to (or from) the autonomous transport vehicle 110. The laser sensor 271 may work in conjunction with, for example, retro-reflective tape (or other suitable reflective surface, coating or material) located at, for example, the back of the shelves 555 to enable the sensor to "see" all the way to the back of the storage shelves 555. The reflective tape located at the back of the storage shelves allows the laser sensor 1715 to be substantially unaffected by the color, reflectiveness, roundness, or other suitable characteristics of the items located on the shelves 555. The ultrasonic sensor 272 may be configured to measure a distance from the autonomous transport vehicle 110 to the first item in a predetermined storage area of the shelves 555 to allow the autonomous transport vehicle 110 to determine the picking depth (e.g. the distance the support tines 210AT travel into the shelves 555 for picking the item(s) off of the shelves 555). One or more of the laser sensors 271 and ultrasonic sensors 272 may allow for detection of case orientation (e.g. skewing of cases within the storage shelves 555) by, for example, measuring the distance between the autonomous transport vehicle 110 and a front surface of the case units to be picked as the autonomous transport vehicle 110 comes to a stop adjacent the case units to be picked. The case sensors may allow verification of placement of a case unit on, for example, a storage shelf 555 by, for example, scanning the case unit after it is placed on the shelf.

Vehicle proximity sensors 278 may also be disposed on the frame 200 for determining the location of the autonomous transport vehicle 110 in the picking aisle 130A and/or relative to lifts 150. The vehicle proximity sensors 278 are located on the autonomous transport vehicle 110 so as to sense targets or position determining features disposed on rails 130AR on which the vehicle 110 travels through the picking aisles 130A (and/or on walls of transfer areas 195 and/or lift 150 access location). The position of the targets on the rails 130AR are in known locations so as to form incremental or absolute encoders along the rails 130AR. The vehicle proximity sensors 278 sense the targets and provide sensor data to the controller 122 so that the controller 122 determines the position of the autonomous transport vehicle 110 along the picking aisle 130A based on the sensed targets.

The sensors of the physical characteristic sensing system 270 are communicably coupled to the controller 122 of the autonomous transport vehicle 110. As described herein, the controller 122 is operably connected to the drive section 261D and/or the transfer arm 210A. The controller 122 is configured to determine from the information of the physical characteristic sensor system 270 vehicle pose and location (e.g., in up to six degrees of freedom, X, Y, Z, Rx, Ry, Rz) effecting independent guidance of the autonomous transport vehicle 110 traversing the storage and retrieval facility/system 100. The controller 122 is also configured to determine from the information of the physical characteristic sensor system 270 payload (e.g., case unit CU) pose and location (onboard or off-board the autonomous transport vehicle 110) effecting independent underpick (e.g., lifting of the case unit CU from underneath the case unit CU) and place of the payload CU to and from a storage location 130S and independent underpick and place of the payload CU in the payload bed 210B.

Referring to FIGS. 1A, 1B, 2, 4A, and 4B, as described above, the autonomous transport vehicle 110 includes a supplemental or auxiliary navigation sensor system 288, connected to the frame 200. The supplemental navigation sensor system 288 supplements the physical characteristic sensor system 270. The supplemental navigation sensor system 288 is, at least in part, a vision system 400 with cameras disposed to capture image data informing the at least one of a vehicle navigation pose or location (relative to the storage and retrieval system structure or facility in which the vehicle 110 operates) and payload pose or location (relative to the storage locations or payload bed 210B) that supplements the information of the physical characteristic sensor system 270. It is noted that the term "camera" described herein is a still imaging or video imaging device that includes one or more of a two-dimensional camera, a two dimensional camera with RGB (red, green, blue) pixels, a three-dimensional camera with XYZ+A definition (where XYZ is the three-dimensional reference frame of the camera and A is one of a radar return strength, a time of flight stamp, or other distance determination stamp/indicator), and an RGB/XYZ camera which includes both RGB and three-dimensional coordinate system information, non-limiting examples of which are provided herein. It should be understood that while the vision system 400 is described herein with respect to the autonomous transport vehicle 110 in other aspects the vision system 400 may be applied to a load handling device 150LHD (FIG. 1—which may be substantially similar to the payload bed 210B of the autonomous transport vehicle 110) of a vertical lift 150 or a pallet builder of the infeed transfer stations 170. Suitable examples, of load handling devices of lifts that the vision system 400 may be incorporated are described in U.S. Pat. No. 10,947,060 titled "Vertical Sequencer for Product Order Fulfilment" and issued on Mar. 16, 2021, the disclosure of which is incorporated herein by reference in its entirety.

Referring to FIGS. 2, 4A, and 4B, the vision system 400 includes one or more of the following: case unit monitoring cameras 410A, 410B, forward navigation cameras 420A, 420B, rearward navigation cameras 430A, 430B, one or more three-dimensional imaging system 440A, 440B, one or more case edge detection sensors 450A, 450B, one or more traffic monitoring camera 460A, 460B, and one or more out of plane (e.g., upward or downward facing) localization cameras 477A, 477B (noting the downward facing cameras may supplement the line following sensors 275 of the physical characteristic sensor system 270 and provide a broader field of view than the line following sensors 275 so as to effect guidance/traverse of the vehicle 110 to place the guide lines 900 (see FIG. 9A) back within the field of view of the line following sensors 275 in the event the vehicle path strays from the guide line 900 removing the guide line 900 from the line following sensor 275 field of view). Images (static images and/or dynamic video images) from the different vision system 400 cameras are requested from the vision system controller 122VC by the controller 122 as desired for any given autonomous transport vehicle 110 task. For example, images are obtained by the controller 122 from at least one or more of the forward and rearward navigation cameras 420A, 420B, 430A, 430B to effect navigation of the autonomous transport vehicle along the transfer deck 130B and picking aisles 130A.

As another example, the controller 122 may obtain images from one or more of the three-dimensional imaging system 440A, 440B, the case edge detection sensors 450A, 450B, and the case unit monitoring cameras 410A, 410B to effect case handling by the vehicle 110. Case handling includes picking and placing case units from case unit holding locations (such as case unit localization, verification of the case unit, and verification of placement of the case unit in the payload bed 210B and/or at a case unit holding location such as a storage shelf or buffer location).

Images from the out of plane localization cameras 477A, 477B may be obtained by the controller 122 to effect navigation of the autonomous transport vehicle and/or to provide data (e.g., image data) supplemental to localization/navigation data from the one or more of the forward and rearward navigation cameras 420A, 420B, 430A, 430B. Images from the one or more traffic monitoring camera 460A, 460B may be obtained by the controller 122 to effect travel transitions of the autonomous transport vehicle 110 from a picking aisle 130A to the transfer deck 130B (e.g., entry to the transfer deck 130B and merging of the autonomous transport vehicle 110 with other autonomous transport vehicles travelling along the transfer deck 130B).

The case unit monitoring cameras 410A, 410B are any suitable high resolution or low resolution video cameras (where video images that include more than about 480 vertical scan lines and are captured at more than about 50 frames/second are considered high resolution). The case unit monitoring cameras 410A, 410B are arranged relative to each other to form a stereo vision camera system that is configured to monitor case unit CU ingress to and egress from the payload bed 210B. The case unit monitoring cameras 410A, 410B are coupled to the frame 200 in any suitable manner and are focused at least on the payload bed 210B. In one or more aspects, the case unit monitoring cameras 410A, 410B are coupled to the transfer arm 210A so as move in direction LAT with the transfer arm 210A (such as when picking and placing case units CU) and are positioned so as to be focused on the payload bed 210B and support tines 210AT of the transfer arm 210A.

Figure 5A:
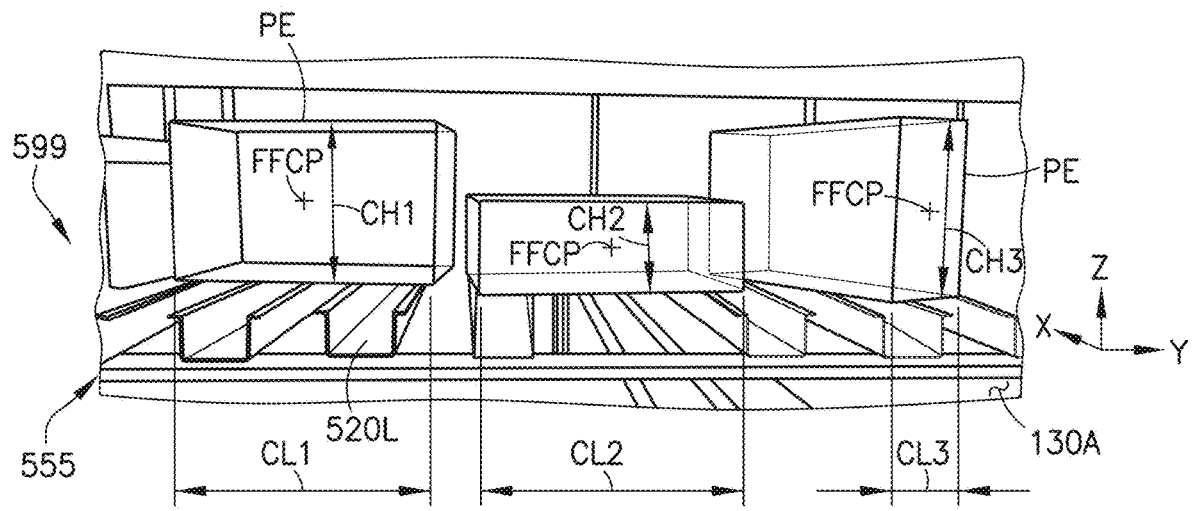
FIGS. 5A, 5B, and 5C is an exemplary illustration of pose and location estimation in accordance with aspects of the disclosed embodiment.

Referring also to FIG. 5A, the case unit monitoring cameras 410A, 410B effect at least in part one or more of case unit determination, case unit localization, case unit position verification, and verification of the case unit justification features (e.g., justification blades 471 and pushers 470) and case transfer features (e.g., tines 210AT, pullers 472, and payload bed floor 473). For example, the case unit monitoring cameras 410A, 410B detect one or more of case unit length CL, CL1, CL2, CL3, a case unit height CH1, CH2, CH3, and a case unit yaw YW (e.g., relative to the transfer arm 210A extension/retraction direction LAT). The data from the case handling sensors (e.g., noted above) may also provide the location/positions of the pushers 470, pullers 472, and justification blades 471, such as where the payload bed 210B is empty (e.g., not holding a case unit).

The case unit monitoring cameras 410A, 410B are also configured to effect, with the vision system controller 122VC, a determination of a front face case center point FFCP (e.g., in the X, Y, and Z directions with the case units disposed on a shelf or other holding area off-board the vehicle 110) relative to a reference location of the autonomous transport vehicle 110. The reference location of the autonomous transport vehicle 110 may be defined by one or more justification surfaces of the payload bed 210B or the centerline CLPB of the payload bed 210B. For example, the front face case center point FFCP may be determined along the longitudinal axis LAX (e.g. in the Y direction) relative to a centerline CLPB of the payload bed 210B (FIG. 4A). The front face case center point FFCP may be determined along the vertical axis VER (e.g. in the Z direction) relative to a case unit support plane PSP of the payload bed 210B (FIG. 4B—formed by one or more of the tines 210AT of the transfer arm 210A and the payload bed floor 473). The front face case center point FFCP may be determined along the lateral axis LAT (e.g. in the X direction) relative to a justification plane surface JPP of the pushers 470 (FIG. 4A). Determination of the front face case center point FFCP of the case units CU located on a storage shelf 555 (see FIG. 5A) or other case unit holding location provides, as non-limiting examples, for localization of the autonomous transport vehicle 110 relative to case units CU to be picked, mapping locations of case units within the storage structure (e.g., such as in a manner similar to that described in U.S. Pat. No. 9,242,800 issued on Jan. 26, 2016 titled "Storage and retrieval system case unit detection", the disclosure of which is incorporated herein by reference in its entirety), and/or pick and place accuracy relative to other case units on the storage shelf 555 (e.g., so as to maintain predetermined gap sizes between case units. The determination of the front face case center point FFCP also effects a comparison of the "real world" environment in which the autonomous transport vehicle 110 is operating with the virtual model 400VM so that controller 122 of the autonomous transport vehicle 110 compares what is "sees" with the vision system 400 substantially directly with what the autonomous transport vehicle 110 expects to "see" based on the simulation of the storage and retrieval system structure. Moreover, in one aspect, illustrated in FIG. 5A, the object (case unit) and characteristics determined by the vision system controller 122VC are coapted (combined, overlayed) to the virtual model 400VM enhancing resolution, in up to six degrees of freedom resolution, of the object pose with respect to a facility reference frame. As may be realized, registration of the cameras of the vision system 400 with the facility reference frame allows for enhanced resolution of vehicle 110 pose and/or location with respect to both a global reference (facility features rendered in the virtual model 400VM) and the imaged object. More particularly, object position discrepancies or anomalies apparent and identified upon coapting the object image and virtual model (e.g., edge spacing between case unit fiducial edges or case unit inclination or spew, with respect to the rack slats 520L of the virtual model 400VM), if greater than a predetermined nominal threshold, describe an errant pose of one or more of case, rack, and/or vehicle 110. Discrimination as to whether errancy is with the pose/location of the case, rack or vehicle 110, one or more is determined via comparison with pose data from sensors 270 and supplemental navigation sensor system 288.

As an example of the above-noted enhanced resolution, if one case unit disposed on a shelf that is imaged by the vision system 400 is turned compared to juxtaposed case units on the same shelf (also imaged by the vision system) and to the virtual model 400VM the vision system 400 may determine the one case is skewed and provide the enhanced case position information to the controller 122 for operating the transfer arm 210A and positioning the transfer arm 210A so as to pick the one case based on the enhanced resolution of the case pose and location. As another example, if the edge of a case is offset from a slat 520L (see FIG. 5A-5C) edge by more than a predetermined threshold the vision system 400 may generate a position error for the case; noting that if the offset is within the threshold, the supplemental information from the supplemental navigation sensor system 288 enhances the pose/location resolution (e.g., an offset substantially equal to the determined pose/location of the case with respect to the salt 520L and vehicle 110 payload bed 210B transfer arm 210A frame. It is further noted that if only one case is skewed/offset relative to the slat 520L edges the vision system may generate the case position error; however, if two or more juxtaposed cases are determined to be skewed relative to the slat 520L edges the vision system may generate a vehicle 110 pose error and effect repositioning of the vehicle 110 (e.g., correct the position of the vehicle 110 based on an offset determined from the supplemental navigation sensor system 288 supplemental information) or a service message to an operator (e.g., where the vision system 400 effects a "dash cam" collaborative mode (as described herein) that provides for remote control of the vehicle 110 by an operator with images (still and/or real time video) from the vision system being conveyed to the operator to effect the remote control operation). The vehicle 110 may be stopped (e.g., does not traverse the picking aisle 130A or transfer deck 130B) until the operator initiates remote control of the vehicle 110.

The case unit monitoring cameras 410A, 410B may also provide feedback with respect to the positions of the case unit justification features and case transfer features of the autonomous transport vehicle 110 prior to and/or after picking/placing a case unit from, for example, a storage shelf or other holding locations (e.g., for verifying the locations/positions of the justification features and the case transfer features so as to effect pick/place of the case unit with the transfer arm 210A without transfer arm obstruction). For example, as noted above, the case unit monitoring cameras 410A, 410B have a field of view that encompasses the payload bed 210B. The vision system controller 122VC is configured to receive sensor data from the case unit monitoring cameras 410A, 410B and determine, with any suitable image recognition algorithms stored in a memory of or accessible by the vision system controller 122VC, positions of the pushers 470, justification blades 471, pullers 472, tines 210AT, and/or any other features of the payload bed 210B that engage a case unit held on the payload bed 210B. The positions of the pushers 470, justification blades 471, pullers 472, tines 210AT, and/or any other features of the payload bed 210B may be employed by the controller 122 to verify a respective position of the pushers 470, justification blades 471, pullers 472, tines 210AT, and/or any other features of the payload bed 210B as determined by motor encoders or other respective position sensors; while in some aspects the positions determined by the vision system controller 122VC may be employed as a redundancy in the event of encoder/position sensor malfunction.

The justification position of the case unit CU within the payload bed 21B may also be verified by the case unit monitoring cameras 410A, 410B. For example, referring also to FIG. 4C, the vision system controller 122VC is configured to receive sensor data from the case unit monitoring cameras 410A, 410B and determine, with any suitable image recognition algorithms stored in a memory of or accessible by the vision system controller 122VC, a position of the case unit in the X, Y, Z directions relative to, for example, one or more of the centerline CLPB of the payload bed 210B, a reference/home position of the justification plane surface JPP of the pushers 470, and the case unit support plane PSP. Here, position determination of the case unit CU within the payload bed 210B effects at least place accuracy relative to other case units on the storage shelf 555 (e.g., so as to maintain predetermined gap sizes between case units.

Referring to FIGS. 2, 4A, 4B, 6, 7A, 7B, and 8, the one or more three-dimensional imaging system 440A, 440B includes any suitable three-dimensional imager(s) including but not limited to, e.g., time-of-flight cameras, imaging radar systems, light detection and ranging (LIDAR), etc. The one or more three-dimensional imaging system 440A, 440B may effect, with the vision system controller 122VC, a determination of a size (e.g., height and width) of the front face (i.e., the front face surface) of a case unit CU and front face case center point FFCP (e.g., in the X, Y, and Z directions) relative to a reference location of the autonomous transport vehicle 110 and invariant of a shelf supporting the case unit CU (e.g., the one or more three-dimensional imaging system 440A, 440B effects case unit CU location without reference to the shelf supporting the case unit CU and effects a determination as to whether the case unit is supported on a shelf through a determination of a shelf invariant characteristic of the case units). Here, the determination of the front face surface and case center point FFCP also effects a comparison of the "real world" environment in which the autonomous transport vehicle 110 is operating with the virtual model 400VM so that controller 122 of the autonomous transport vehicle 110 compares what is "sees" with the vision system 400 substantially directly with what the autonomous transport vehicle 110 expects to "see" based on the simulation of the storage and retrieval system structure. The image data obtained from the one or more three-dimensional imaging system 440A, 440B may supplement the image data from the cameras 410A, 410B in the event data from the cameras 410A, 410B is incomplete or missing.

Figure 6:
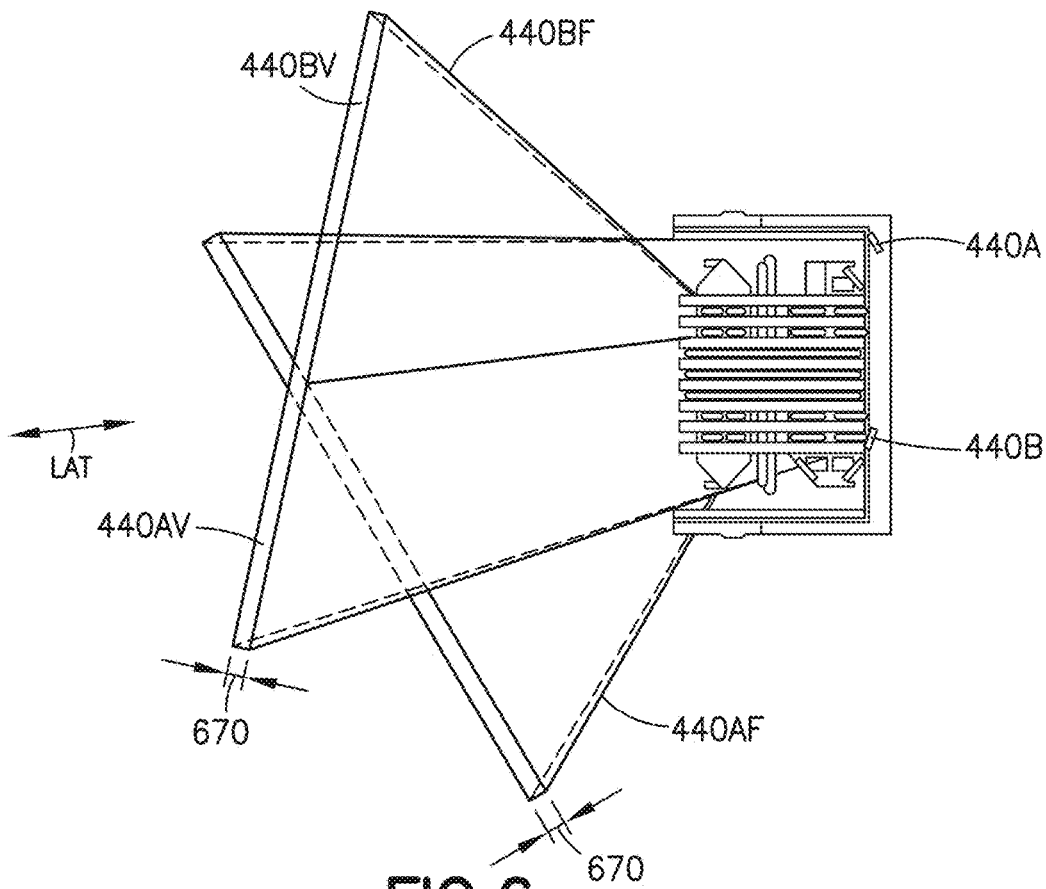
FIG. 6 is an exemplary plan view illustration of a portion of the autonomous guided vehicle of FIG. 2 in accordance with aspects of the disclosed embodiment.
Figure 8:
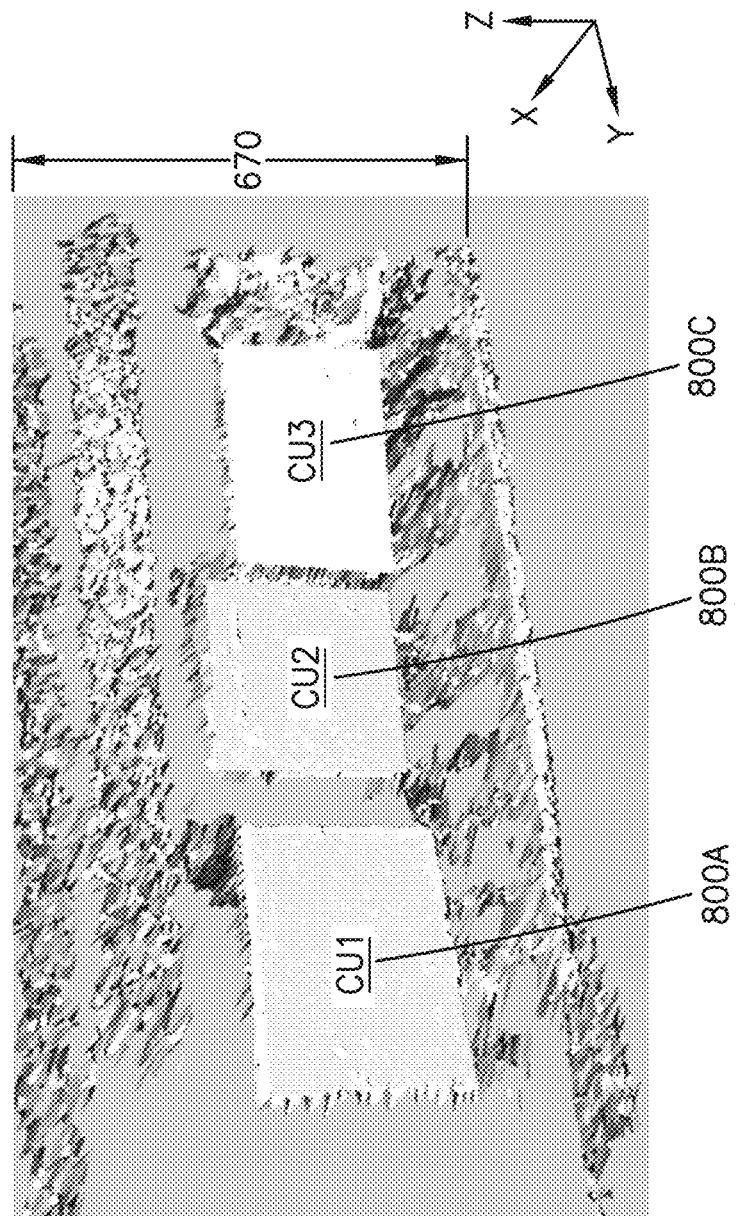
FIG. 8 is an exemplary illustration of data captured by a supplemental sensor system of the autonomous guided vehicle of FIG. 2 in accordance with aspects of the disclosed embodiment.

As illustrated in FIG. 6, the one or more three-dimensional imaging system 440A, 440B has a respective field of view that extends past the payload bed 210B substantially in direction LAT so that each three-dimensional imaging system 440A, 440B is disposed to sense case units CU adjacent to but external of the payload bed 210B (such as case units CU arranged so as to extend in one or more rows along a length of a picking aisle 130A (see FIG. 5A) or a substrate buffer/transfer stations (similar in configuration to storage racks 599 and shelves 555 thereof disposed along the picking aisles 130A) arranged along the transfer deck 130B). The field of view 440AF, 440BF of each three-dimensional imaging system 440A, 440B encompasses a volume of space 440AV, 440BV that extends a height 670 of a pick range of the autonomous transport vehicle 110 (e.g., a range/height in direction VER—FIGS. and 8—in which the arm 210A can move to pick/place case units to a shelf 555 or stacked shelves accessible from a common rolling surface 284 (e.g., of the transfer deck 130B or picking aisle 130A—see FIG. 2) on which the autonomous transport vehicle 110 rides). Here, as can be seen in FIG. 8, the one or more three-dimensional imaging system 440A, 440B provides sensor data to the vision system controller 122VC that embodies at least the front face surfaces 800A, 800B, 800C of case units CU1, CU2, CU3, where such front face surface detection is detected/determined without reference to and regardless of the presence of a shelf supporting the case units. The vision system controller 122VC determines if the case unit CU detected is disposed on a shelf with other case units through a determination of a shelf invariant characteristic common to each case unit disposed on the same shelf. Here, for case units CU with substantially vertically orientated faces, extraction of a front face normal vector (e.g., such as by planar fit) and a bottom edge of the front face (e.g., such as by region edge detection) provides for a planar equation for the shelf in the autonomous transport vehicle coordinate system X, Y, Z.

Figure 7A:
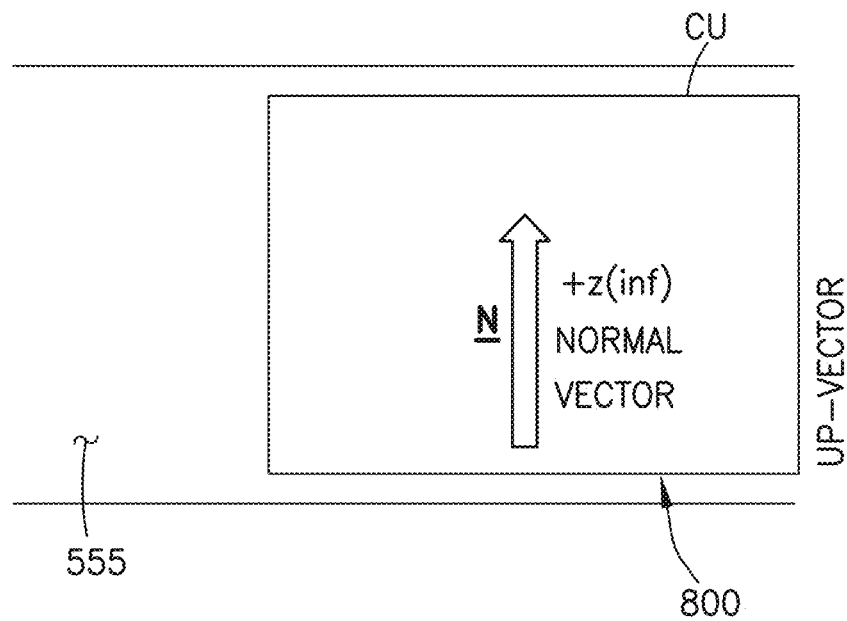
FIGS. 7A and 7B are respectively plan and perspective illustrations of a case unit illustrating a shelf invariant front face detection in accordance with aspects of the disclosed embodiment.
Figure 7B:
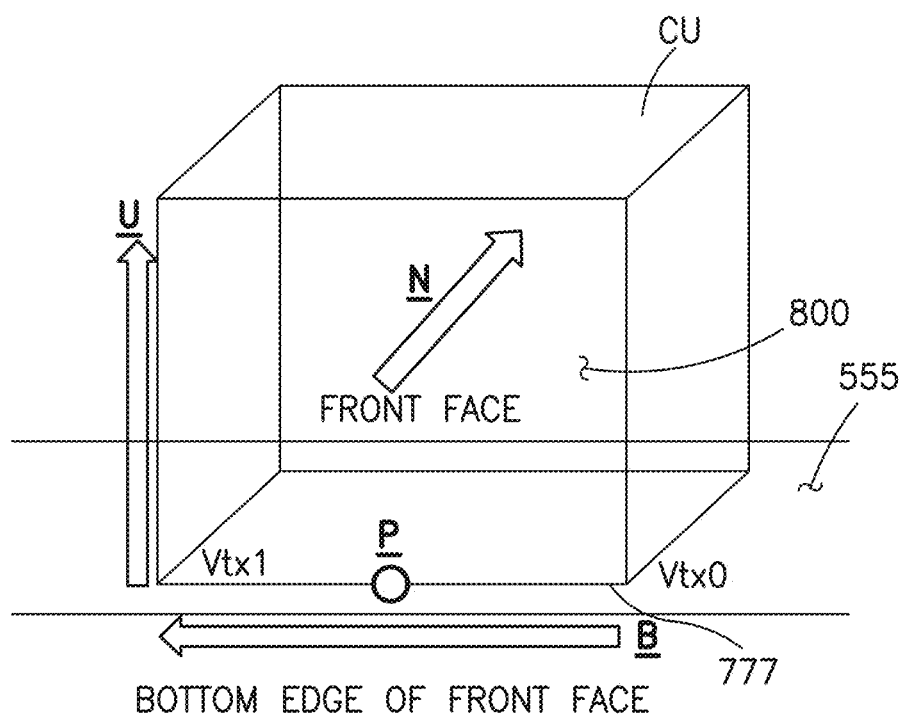

As can be seen in FIGS. 7A and 7B, a case unit sitting/seated on a shelf 555 has a front face or front face surface 800 that is visible to the one or more three-dimensional imaging system 440A, 440B (and to the case unit monitoring cameras 410A, 410B). From the detected front face surface 800 the vision system controller 122VC determines a front face normal vector N that is normal to the front face surface 800. Also from the detected front face surface 800, the vision system controller 122VC (with any suitable image processing algorithms thereof) determines the bottom edge 777 (and vector B thereof) of the front face surface 800, where a shelf invariant characteristic of the case unit CU is derived from the front face normal vector N and the bottom edge 777. For example, an UP or Z axis vector U can be determined from the cross product of vectors N and B as follows:

$$U = N \times B \qquad [\text{eq. 1}]$$

A center point P of the bottom edge 777 is determined by vision system controller 122VC (with any suitable image processing algorithms thereof) and a scalar equation of a plane (that represents the bottom surface of the case unit CU seated on the shelf 555) can be written as follows:

$$d = U^* P \qquad [\text{eq. 2}]$$

Where (U, d) is the shelf invariant characteristic that is common to any case unit seated on the same shelf 555 (e.g., any case unit seated on the same shelf has the same shelf invariant feature vector within a predetermined tolerance). Here, the vision system controller 122VC can determine whether the case units CU1, CU2, CU3 (see FIG. 8) are disposed on the same shelf by scanning of case units CU1, CU2, CU3 with at least the one or more three-dimensional imaging system 440A, 440B and determining the shelf invariant characteristic. The determination of the shelf invariant characteristic may effect, at least in part, comparison between what the vision system 400 of the autonomous transport vehicle 110 "sees" substantially directly with what the autonomous transport vehicle 110 expects to "see" based on the simulation of the storage and retrieval system structure. Determination of the shelf invariant characteristic may also effect placement of case units on the plane of the shelf 555 as determined from the shelf invariant characteristic.

Referring to FIGS. 2 and 4A, the forward navigation cameras 420A, 420B, are any suitable cameras configured to provide object detection and ranging. The forward navigation cameras 420A, 420B may be placed on opposite sides of the longitudinal centerline LAXCL of the autonomous transport vehicle 110 and spaced apart by any suitable distance so that the forward facing fields of view 420AF, 420BF (see also Fig. provide the autonomous transport vehicle 110 with stereo vision. The forward navigation cameras 420A, 420B are any suitable high resolution or low resolution video cameras (where video images that include more than about 480 vertical scan lines and are captured at more than about 50 frames/second are considered high resolution), time-of-flight cameras, laser ranging cameras, or any other suitable cameras configured to provide object detection and ranging for effecting autonomous vehicle traverse along the transfer deck 130B and picking aisles 130A. The rearward navigation cameras 430A, 430B may be substantially similar to the forward navigation cameras. The forward navigation cameras 420A, 420B and the rear navigation cameras 430A, 430B provide for autonomous transport vehicle 110 navigation with obstacle detection and avoidance (with either end 200E1 of the autonomous transport vehicle 110 leading a direction of travel or trailing the direction of travel) as well as localization of the autonomous transport vehicle within the storage and retrieval system 100. Localization of the autonomous transport vehicle 110 may be effected by one or more of the forward navigation cameras 420A, 420B and the rearward navigation cameras 430A, 430B by detection of lines 900 on the travel/rolling surface 284 and/or by detection of suitable storage structure, including but not limited to storage rack (or other) structure 999. The line detection and/or storage structure detection may be compared to floor maps and structure information (e.g., stored in a memory of or accessible by) of the vision system controller 122VC. The forward navigation cameras 420A, 420B and the rearward navigation cameras 430A, 430B may also send signal to the controller 122 (inclusive of or through the vision system controller 122VC) so that as objects approach the autonomous transport vehicle 110 (with the autonomous transport vehicle 110 stopped or in motion) the autonomous transport vehicle 110 may be maneuvered (e.g., on the undeterministic rolling surface of the transfer deck 130B or within the picking aisle 130A (which may have a deterministic or undeterministic rolling surface) to avoid the approaching object (e.g., another autonomous transport vehicle, case unit, or other transient object within the storage and retrieval system 100).

The forward navigation cameras 420A, 420B and the rear navigation cameras 430A, 430B may also provide for convoys of vehicles 110 along the picking aisles 130A or transfer deck 130B, where one vehicle 110 follows another vehicle 110A at predetermined fixed distances. As an example, FIG. 1B illustrates a three vehicle 110 convoy where one vehicle closely follows another vehicle at the predetermined fixed distance.

Still referring FIGS. 2 and 4A, the one or more case edge detection sensors 450A, 450B are any suitable sensors such as laser measurement sensors configured to scan the shelves of the storage and retrieval system to verify the shelves are clear for placing case units CU, or to verity a case unit size and position before picking the case unit CU. While one case edge detection sensor 450A, 450B is illustrated on each side of the payload bed 210B centerline CLPB (see FIG. 4A) there may be more or less than two case edge detection sensors placed at any suitable locations on the autonomous transport vehicle 110 so that the vehicle 110 can traverse by and scan case units CU with the front end 200E1 leading a direction of vehicle travel or the rear/back end 200E2 leading the direction of vehicle travel.

The one or more traffic monitoring cameras 460A, 460B are disposed on the frame 200 so that a respective field of view 460AF, 460BF faces laterally in lateral direction LAT1. While the one or more traffic monitoring cameras 460A, 460B are illustrated as being adjacent a transfer opening 1199 of the transfer bed 210B (e.g., on the pick side from which the arm 210A of the autonomous transport vehicle 110 extends), in other aspects there may be traffic monitoring cameras disposed on the non-pick side of the frame 200 so that a field of view of the traffic monitoring cameras faces laterally in direction LAT2. The traffic monitoring cameras 460A, 460B provide for an autonomous merging of autonomous transport vehicles 110 exiting, for example, a picking aisle 130A or lift transfer area 195 onto the transfer deck 130B (see FIG. 1B). For example, the autonomous transport vehicle 110 leaving the lift transfer area 195 (FIG. 1B) detects autonomous transport vehicle 110T travelling along the transfer deck 130B. Here, the controller 122 autonomously strategizes merging (e.g., entering the transfer deck in front of or behind the autonomous transport vehicle 110T, acceleration onto the transfer deck based on a speed of the approaching vehicle 110T, etc.) on to the transfer deck based on information (e.g., distance, speed, etc.) of the vehicle 110V gathered by the traffic monitoring cameras 460A, 460B and communicated to and processed by the vision system controller 122VC.

The one or more out of plane (e.g., upward or downward facing) localization cameras 477A, 477B are disposed on the frame 200 of the autonomous transport vehicle 110 so as to sense/detect location fiducials (e.g., location marks 971, lines 900, etc.) disposed on a ceiling 991 of the storage and retrieval system or on the rolling surface 284 of the storage and retrieval system. The location fiducials have known locations within the storage and retrieval system and may provide unique identification marks/patterns that are recognized by the vision system controller 122VC (e.g., processing data obtained from the localization cameras 477A, 477B). Based on the location fiducial detected, the vision system controller 122VC compares the detected location fiducial to known location fiducials (e.g., store in a memory of or accessible to the vision system controller 122VC) to determine a location of the autonomous transport vehicle 110 within the storage structure 130.

The cameras of the supplemental navigation sensor system 288 may be calibrated in any suitable manner (such as by, e.g., an intrinsic and extrinsic camera calibration) to effect sensing of case units CU, storage structure (e.g., shelves, columns, etc.), and other structural features of the storage and retrieval system. Referring to FIGS. 4A, 4B, 5A, 5B, and 5C, known objects (such as case units CU1, CU2, CU3 (or storage system structure) (e.g., having a known physical characteristics such as shape, size, etc.) may be placed within the field of view of a camera (or the vehicle 110 may be positioned so that the known objects are within the field of view of the camera) of the supplemental navigation sensor system 288. These known objects may be imaged by the camera from several angles/view points to calibrate each camera so that the vision system controller 122VC is configured to detect the known objects based on sensor signals from the calibrated camera.

Figure 5B:
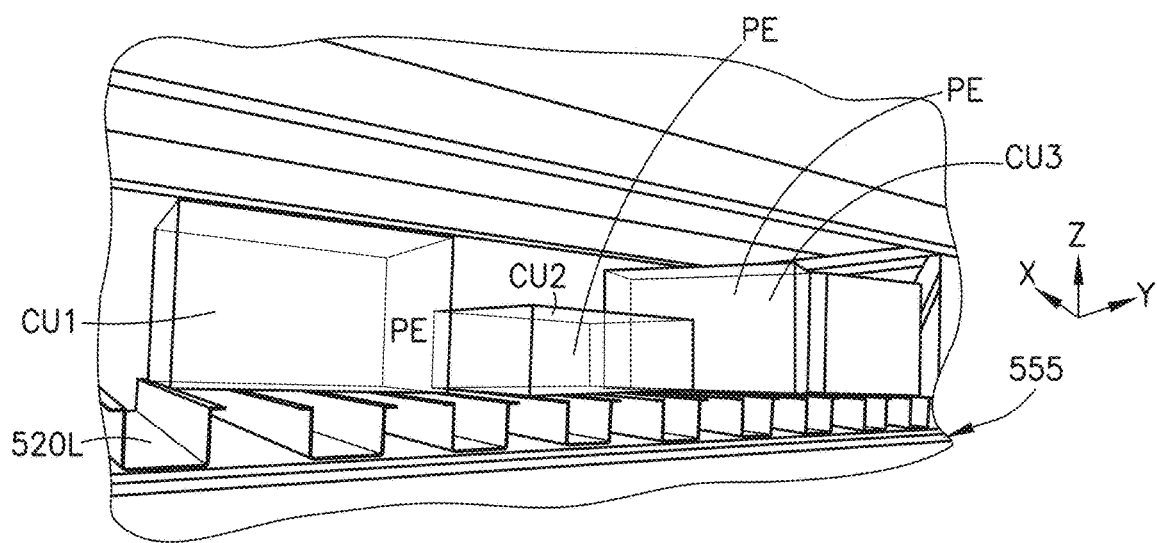
Figure 5C:
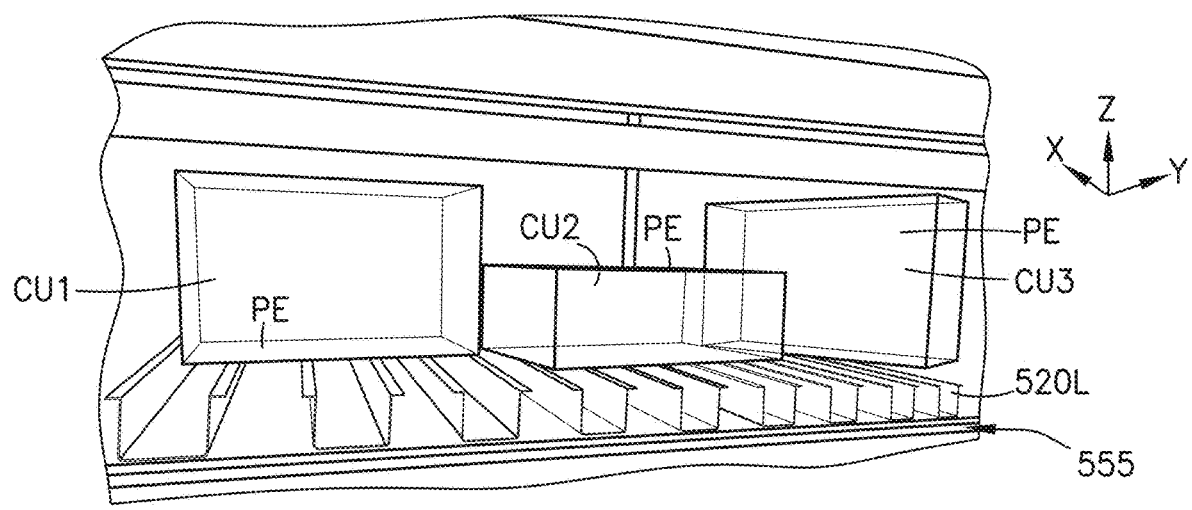

For example, calibration of case unit monitoring cameras 410A, 410B will be described with respect to case units CU1, CU2, CU3 having known physical characteristics/parameters. FIGS. 5A-5C are exemplary images captured from one of case unit monitoring cameras 410A, 410B from, for exemplary purposes, three different view points. Here, physical characteristics/parameters (e.g., shape, length, width, height, etc.) of the case units CU1, CU2, CU3 are known by the vision system controller 122VC (e.g., the physical characteristics of the different case units CU1, CU2, CU3 are stored in a memory of or accessible to the vision system controller 122VC). Based on the, for example, three (or more) different view points of the case units CU1, CU2, CU3, in the images of FIGS. 5A-5C, the vision system controller 122VC is provided with intrinsic and extrinsic camera and case unit parameters that effect calibration of the case unit monitoring camera 410A, 410B. For example, from the images the vision system controller 122VC registers (e.g., stores in memory) a perspective of the case units CU1, CU2, CU3 relative to the case unit monitoring camera 410A, 410B. The vision system controller 122VC estimates the pose of the case units CU1, CU2, CU3 relative to the case unit monitoring camera 410A, 410B and estimates the pose of the case units CU1, CU2, CU3 relative to each other. The pose estimates PE of the respective case units CU1, CU2, CU3 are illustrated in FIGS. 5A-C as being overlaid on the respective case units CU1, CU2, CU3.

The vehicle 110 is moved so that any suitable number of view points of the case units CU1, CU2, CU3 are obtained/imaged by the case unit monitoring camera 410A, 410B to effect a convergence of the case unit characteristics/parameters (e.g., estimated by the vison system controller 122VC) for each of the known case units CU1, CU2, CU3. Upon convergence of the case unit parameters, the case unit monitoring camera 410A, 410B is calibrated. The calibration process is repeated for the other case unit monitoring camera 410A, 410B. With both of the case unit monitoring cameras 410A, 410B calibrated the vision system controller 122VC is configured with three-dimensional rays for each pixel in each of the case unit monitoring cameras 410A, 410B as well as an estimate of the three-dimensional baseline line segment separating the cameras and the relative pose of the case unit monitoring cameras 410A, 410B relative to each other. The vision system controller 122VC is configured to employ the three-dimensional rays for each pixel in each of the case unit monitoring cameras 410A, 410B, the estimate of the three-dimensional baseline line segment separating the cameras, and the relative pose of the case unit monitoring cameras 410A, 410B relative to each other so that the case unit monitoring cameras 410A, 410B form a passive stereo vision sensor such as where there are common features visible within the fields of view 410AF, 410BF of the case unit monitoring cameras 410A, 410B. As noted above, the calibration of the case unit monitoring cameras 410A, 410B was described with respect to case units CU1, CU2, CU3 but may be performed with respect to any suitable structure (e.g., permanent or transient) of the storage and retrieval system 100 in a substantially similar manner.

As may be realized, vehicle localization (e.g., positioning of the vehicle at a predetermined location along a picking aisle 130A or along the transfer deck 130B relative to a pick/place location) effected by the physical characteristic sensor system 270 may be enhanced with the pixel level position determination effected by the supplemental navigation sensor system 288. Here, the controller 122 is configured to what may be referred to as "grossly" locate the vehicle 110 relative to a pick/place location by employing on or more sensors of the physical characteristic sensor system 270. The controller 122 is configured to employ the supplemental (e.g., pixel level) position information obtained from the vision system controller 122VC of the supplemental navigation sensor system 288 to what may be referred to as "fine tune" the vehicle pose and location relative to the pick/place location so that positioning of the vehicle 110 and case units CU placed to storage locations 130S by the vehicle 110 may be held to smaller tolerances (i.e., increased position accuracy) compared to positioning of the vehicle 110 or case units CU with the physical characteristic sensor system 270 alone. Here, the pixel level positioning provided by the supplemental navigation sensor system 288 has a higher positioning definition/resolution than the electromagnetic sensor resolution provided by the physical characteristic sensor system 270.

In aspects where the case units may be dimply lit, lighting sources may be provided on the vehicle 110 to illuminate the case units (or other structure) to effect the calibration of the cameras in the manner noted above. The lighting may be a diffuse lighting or the lighting may have a known pattern(s) that are projected on the surface(s) of the case units (or other structure) so that the case unit or other structure) parameters may be extracted from the images and convergence of the case unit (or other structure) parameters is obtained by the vision system controller 122VC. Suitable markers (e.g., calibration stickers located at known locations on the case units or other structure) may also be placed on the case units/structure to facilitate feature extraction from the images obtained by the case unit monitoring cameras 410A, 410B and effect calibration of the case unit monitoring cameras 410A, 410B. Calibration of the other cameras (e.g., the forward and rearward navigation cameras 420A, 420B, 430A, 430B, the traffic monitoring camera(s) 460A, 460B, and the out of plane localization camera(s) 477A, 477B, etc.) of the supplemental navigation sensor system 288 may be effected in a manner similar to that described above.

Figure 11:
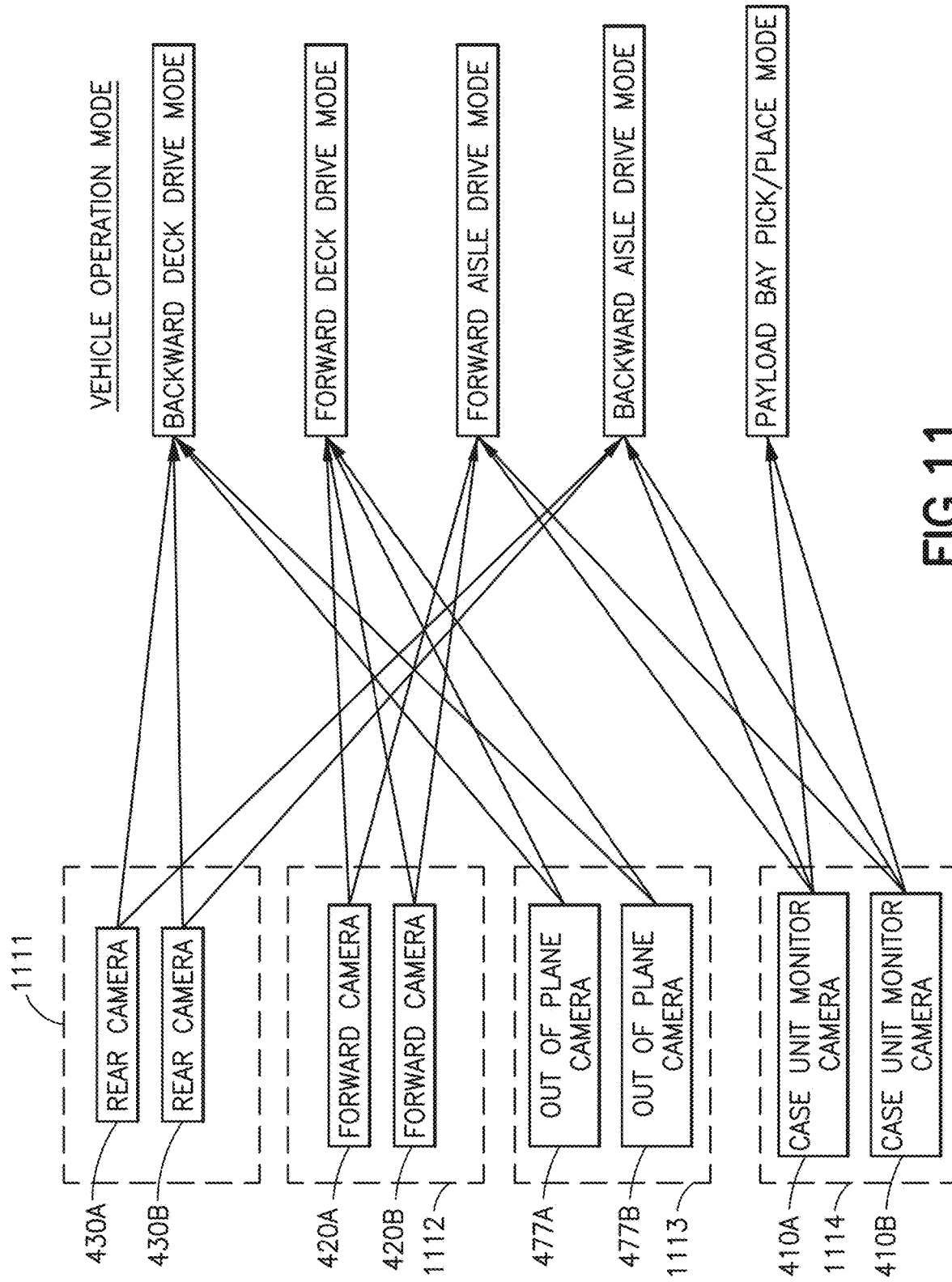
FIG. 11 is an exemplary block diagram illustrating a sensor selection depending on an operation mode of the autonomous guided vehicle of FIG. 2 in accordance with aspects of the disclosed embodiment.
Figure 12:
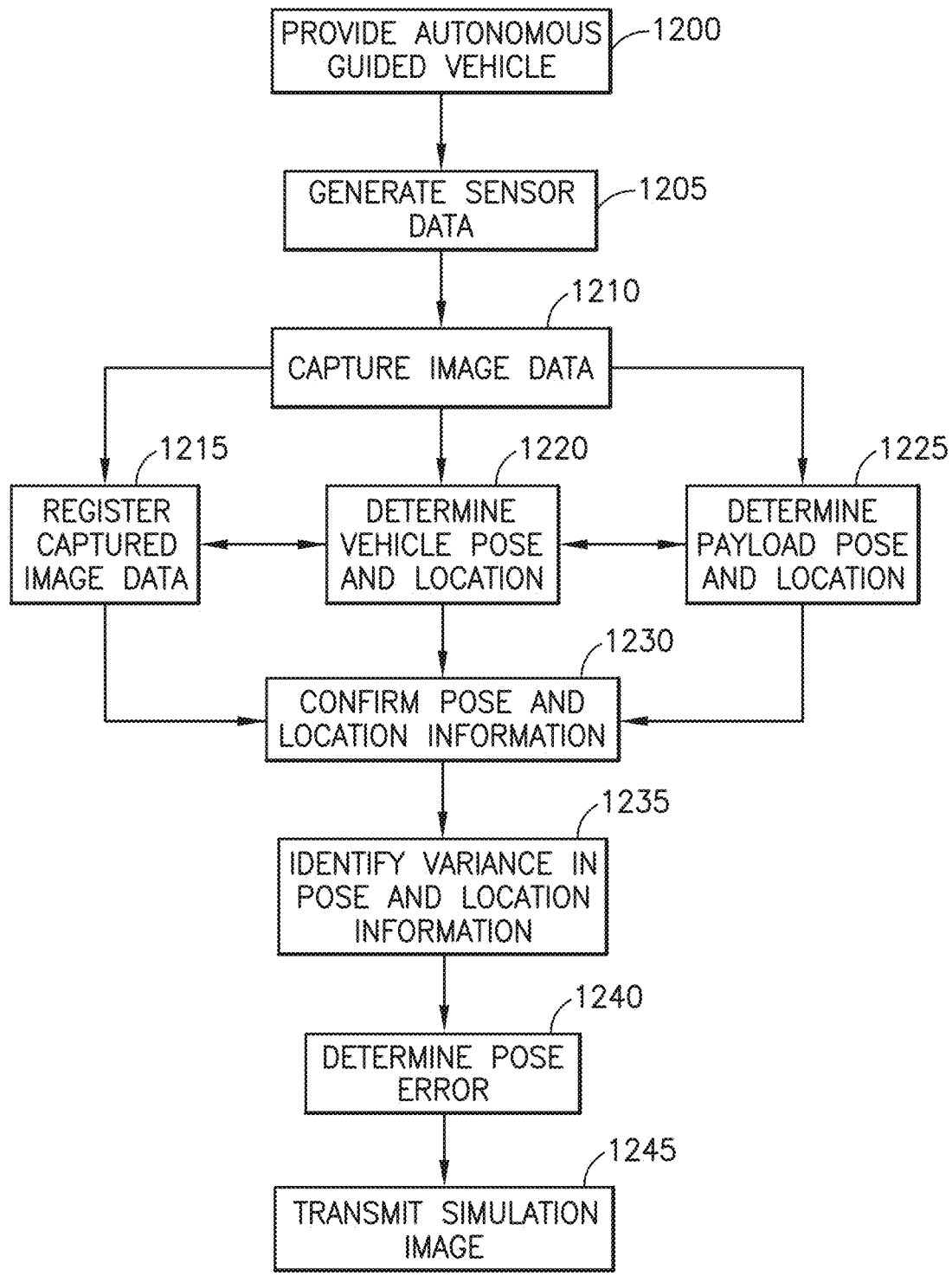
FIG. 12 is an exemplary flow diagram in accordance with aspects of the disclosed embodiment.

Referring to FIGS. 1A, 2, 4A, 4B, and 11, the vision system controller 122VC of the autonomous transport vehicle 110 is configured to dynamically select and access information from different sensors (or groups of sensors) from the supplemental navigation sensor system 288 depending on vehicle 110 operation. FIG. 11 is an illustration showing non-exhaustive sensor groupings 1111-1114 and associated non-exhaustive vehicle operations in which the sensors groups may be accessed by the vision system controller 122VC to effect that vehicle operation. Exemplary sensor group 1111 includes the rear navigation cameras 230A, 230B. Exemplary sensor group 1112 includes the forward navigation cameras 420A, 420B. Exemplary sensor group 1113 includes the out of plane cameras 477A, 477B. Exemplary senor group 1114 includes the case unit monitoring cameras 410A, 410B. For exemplary purposes only, sensor groups 1111, 1113 may be employed by the vision system controller 122VC (and controller 122) for vehicle operations where the rear end 200E2 of the vehicle 110 leads a direction of vehicle travel (e.g., backward travel on the transfer deck 130B). The sensor groups 1112, 1113 may be employed by the vision system controller 122VC (and controller 122) for vehicle operations where the front end 200E1 of the vehicle 110 leads a direction of vehicle travel (e.g., forward travel on the transfer deck 130B). The sensor groups 1112, 1114 may be employed by the vision system controller 122VC (and controller 122) for vehicle operations where the front end 200E1 of the vehicle 110 leads a direction of vehicle travel (e.g., forward travel along a picking aisle 130A). The sensor groups 1111, 1114 may be employed by the vision system controller 122VC (and controller 122) for vehicle operations where the rear end 200E2 of the vehicle 110 leads a direction of vehicle travel (e.g., backward travel along a picking aisle 130A). The sensor group 1114 may be employed by the vision system controller 122VC (and controller 122) for vehicle operations where the transfer arm 210A loads or unloads a case unit CU to or from the payload bed 210B (e.g., pick place operations).

Referring to also FIGS. 1A, 1B, 2, 4D, 17, and 18, as described above, the autonomous transport vehicle 110 includes the supplemental hazard sensor system 290. The supplemental hazard sensor system 290 is connected to the frame 200 of the autonomous transport vehicle 110 to provide the bot operational control of the autonomous transport vehicle 110 in collaboration with an operator. The supplemental hazard sensor system 290 provides data (images) The vision system data is registered by the vision system controller 122VC that a) determines information characteristics (in turn provided to the controller 122), or b) information is passed the controller 122 without being characterizes (object in predetermined criteria) and characterization is done by the controller 122. In either a) or b) it is the controller 122 that determines selection to switch to the collaborative state. After switching, then the collaborative operation is effected by a user accessing the supplemental hazard sensor system 290 via the vision system controller 122VC and/or the controller 122. In its simplest form, however, the supplemental hazard sensor system 290 may be considered as providing a collaborative mode of operation of the autonomous transport vehicle 110. The supplemental hazard sensor system 290 supplements the autonomous navigation/operation sensor system 270 and/or the supplemental sensor system 298, with the supplemental hazard sensor system 290 configured to effect collaborative discriminating and mitigation of objects/hazards, e.g., encroaching upon the travel/rolling surface 284. The supplemental hazard sensor system 290 forms, at least in part, the vision system 400 and includes at least one camera 292. It is noted that the term "camera" described herein is a still imaging or video imaging device that includes one or more of a two-dimensional camera, a two dimensional camera with RGB (red, green, blue) pixels, a three-dimensional camera with XYZ+A definition (where XYZ is the three-dimensional reference frame of the camera and A is a radar return strength or time-of-flight stamp), and an RGB/XYZ camera which includes both RGB and three-dimensional coordinate system information, non-limiting examples of which are provided herein. The at least one camera 292 of the vision system 400 is disposed to capture image data informing objects and/or spatial features 299 (having intrinsic physical characteristics) within at least a portion of the facility 100 viewed by the at least one camera 292 with the autonomous transport vehicle 110 in the different positions in the facility 100 while executing autonomous navigation and transfer tasks. As may be realized, the at least one camera 292 is illustrated in FIG. 4D, for exemplary purposes only, as being separate and distinct from the cameras illustrated in FIG. 4A; however, the at least one camera 292 may be part of the system illustrated in FIG. 4A (e.g., camera 292 on end 200E1 of the vehicle 110 may be camera 477A in FIG. 4A; camera 292 on end 200E2 of eh vehicle 110 may be camera 477B in FIG. 4A; and cameras 292 facing laterally in direction LAT1 in FIG. 4D may be cameras 460AF, 460BF in FIG. 4A).

As noted above, the vision system 400 includes the at least one camera 292. It is noted that although the aspects of the present disclosure are described with respect to a forward facing camera (i.e., a camera that faces in the direction of travel with the end 200E1 of the autonomous transport vehicle 110 leading), the camera(s) may be positioned to face in any direction (rearward, sideways, up, down, etc.) for up to 360° monitoring about the autonomous transport vehicle 110. The at least one camera 292 may be placed on the longitudinal centerline LAXCL, on either side of the longitudinal centerline LAXCL, more than one camera 292 may be placed on opposite sides of the longitudinal centerline LAXCL of the autonomous transport vehicle 110 so that the field of view 292F provides the autonomous transport vehicle 110 with stereo vision (e.g., such as cameras 420A, 420B), or any other suitable configuration. The at least one camera 292, is any suitable camera configured to provide object or spatial feature 299 detection. For example, the at least one camera 292 is any suitable high resolution or low resolution video cameras, a 3D imaging system, time-of-flight camera, laser ranging camera, or any other suitable camera configured to provide detection of the object or spatial feature 299 within at least a portion of the facility 100 viewed by the at least one camera 292 with the autonomous transport vehicle 110 in the different positions in the facility 100 while executing autonomous navigation and transfer tasks. The at least one camera 292 provides for imaging and detection (with either end 200E1, 200E2 of the autonomous transport vehicle 110 leading a direction of travel or trailing the direction of travel). The object or spatial feature 299 detection may be compared to reference floor maps and structure information (e.g., stored in a memory of or accessible by) of the vision system controller 122VC. The at least one camera 292 may also send signals to the controller 122 (inclusive of or through the vision system controller 122VC) so that as the autonomous transport vehicle 110 approaches the object or spatial feature 299, the autonomous transport vehicle 110 initiates an autonomous stop (i.e., in an autonomous operation state) or may enter a collaborative operation state so as to be stopped by an operator or maneuvered e.g., on the undeterministic rolling surface of the transfer deck 130B or within the picking aisle 130A (which may have a deterministic or undeterministic rolling surface) by the operator in order to identify the object or spatial feature 299 (e.g., another malfunctioning autonomous transport vehicle, dropped case unit, debris, spill, or other transient object within the storage and retrieval system 100).

The camera(s) 292 of the supplemental hazard sensor system 290 may be calibrated in any suitable manner (such as by, e.g., an intrinsic and extrinsic camera calibration) to effect sensing/detection of the objects or spatial features 299 in the storage and retrieval system 100. Referring to FIGS. 4D and 5B-5C, known objects (such as case units CU1, CU2, CU3 (or storage system structure) (e.g., having a known physical characteristics such as shape, size, etc.) may be placed within the field of view 292F of a camera 292 (or the autonomous transport vehicle 110 may be positioned so that the known objects are within the field of view 292F of the camera 292) of the supplemental hazard sensor system 290. These known objects may be imaged by the camera 292 from several angles/view points to calibrate each camera so that the vision system controller 122VC is configured to determine when an "unknown" (i.e., unidentifiable) object based on sensor signals from the calibrated camera is within the field of view 292F.

For example, calibration of the camera(s) 292 will be described with respect to case units CU1, CU2, CU3 having known physical characteristics/parameters. FIGS. 5B and 5C are exemplary images captured from the camera(s) 292 from, for exemplary purposes, two different view points. Here, physical characteristics/parameters (e.g., shape, length, width, height, etc.) of the case units CU1, CU2, CU3 are stored so as to be "known" (i.e., identifiable) by the vision system controller 122VC (e.g., the physical characteristics of the different case units CU1, CU2, CU3 are stored in a memory of or accessible to the vision system controller 122VC). Based on the, for example, two (or more) different view points of the case units CU1, CU2, CU3, in the images of FIGS. 5A-5B, the vision system controller 122VC is provided with intrinsic and extrinsic camera and case unit parameters that effect calibration of the camera(s) 292.

The autonomous transport vehicle 110 is moved so that any suitable number of view points of the case units CU1, CU2, CU3 are obtained/imaged by the camera(s) 292 to effect a convergence of the case unit characteristics/parameters (e.g., estimated by the vison system controller 122VC) for each of the known case units CU1, CU2, CU3. Upon convergence of the case unit parameters, the camera(s) 292 is calibrated. With the camera(s) 292 calibrated the vision system controller 122VC is configured with three-dimensional rays for each pixel in each of the camera(s) 292. As noted above, the calibration of the camera(s) 292 was described with respect to case units CU1, CU2, CU3 but may be performed with respect to any suitable structure (e.g., permanent or transient) of the storage and retrieval system 100 in a substantially similar manner.

As may be realized, where the autonomous transport vehicle 110 (that in one aspect is a payload/case transport and/or transfer robot) autonomously travels along a picking aisle 130A or along the transfer deck 130B, the autonomous transport vehicle 110 may opportunistically detect (incidental or peripheral to predetermined autonomous tasks, e.g., autonomous picking/placing payload at storage, travel to transfer station and/or charge station for autonomous payload pick/place/transfer at the transfer station, and/or autonomous charging at the charge station) other objects within the facility 100 (e.g., other bots, dropped case units, spills, debris, etc.). The vision system controller 122VC is configured to employ the supplemental navigation sensor system 288 and/or the supplemental hazard sensor system 290 (i.e., imaging information obtained from the cameras of one or more of the supplemental sensor systems) to determine whether the objects are "unknown" (i.e., whether the objects or spatial features 299 are not expected to be within an area or space along the autonomous travel path of the autonomous transport vehicle 110).

Referring to FIGS. 1A, 2, 4A, 4B, 4D, 10A, and 10B, the vision system 400 of the supplemental navigation sensor system 288 and/or supplemental hazard sensor system 290 configures the autonomous transport vehicle 110 with a virtual model 400VM of an operating environment 401 in which the autonomous transport vehicle 110 operates. For example, the vision system controller 122VC is programmed with a reference representation 400VMR of predetermined features (e.g., the fixed/permanent structure of and/or transient objects in the storage structure 130 of the storage and retrieval system described herein and included in the virtual model 400VM), the reference representation 400VMR of the predetermined features define the form or location of at least part of the facility or storage structure 130 traversed by the autonomous transport vehicle 110. Here the virtual model 400VM (and the reference representation 400VMR of predetermined features thereof) of the operating environment 401 is stored in any suitable memory of the autonomous transport vehicle (such as a memory of the vision system controller 122VC) or in a memory accessible to the vision system controller 122VC. The virtual model 400VM provides the autonomous transport vehicle 110 with the dimensions, locations, etc. of at least the fixed (e.g., permanent) structural components in the operating environment 401. The operating environment 401 and the virtual model 400VM thereof includes at least fixed/permanent structure (e.g., transfer deck 130B, picking aisles 130A, storage spaces 130S, case unit transfer areas, case unit buffer locations, vehicle charging locations, support columns, etc.) of one more storage structure level 130L; in one or more aspects, the operating environment 401 and the virtual model 400VM include the fixed structure of the one or more storage structure level 130L and at least some transitory structure (e.g., case units CU stored or otherwise located at case unit holding locations of the storage and retrieval system 100, etc.) of and located within the storage level 130L on which the autonomous transport vehicle 110 operates; in one or more other aspects the operating environment 401 and the virtual model 400VM includes at least the fixed structure and at least some transitory structure (e.g., case units)) of one or more levels 130L of the storage structure 130 on which the autonomous transport vehicle 110 could operate; and in still other aspects, the operating environment

401 and virtual model 400VM includes the entirety of the storage structure and at least some of the transitory structure (such as transitory structure for a storage level on which the autonomous transport vehicle operates).

The autonomous transport vehicle 110 may have stored thereon (or in a memory accessible thereby) a portion of the virtual model 400VM that corresponds with a portion of the operating environment in which the autonomous transport vehicle 110 operates. For example, the autonomous transport vehicle 110 has stored thereon (or in a memory accessible thereby) only a portion of the virtual model 400VM corresponding to a storage structure level 130L on which the autonomous transport vehicle is disposed. The virtual model 400VM of the operating environment 401 may be dynamically updated in any suitable manner to facilitate autonomous transport vehicle 110 operations in the storage structure 130. For example, where the autonomous transport vehicle 110 is moved from one storage structure level 130L to another different storage structure level 130L the vision system controller 122VC is updated (e.g., such as by the controller 122 and/or wirelessly by control server 120) to include a portion of the virtual model 400VM corresponding to the other different storage structure level 130L. As another example, the virtual model 400VM may be dynamically updated as case units are added and removed from the storage structure 130 so as to provide a dynamic virtual model case unit map that indicates the predetermined (expected) location of the case units CU that are to be transferred by the autonomous transport vehicles 110. In other aspects, the predetermined (expected) locations of the case units within the storage structure may not be included in the virtual model 400VM; however, the predetermined (expected) locations, sizes, SKUs, etc. of one or more case units to be transferred by an autonomous transport vehicle 110 are communicated from, for example, controller 120 to the autonomous transport vehicle 110, where the vision system 400 (and the vision system controller 122VC) effect verification of case unit(s) at the predetermined location as described herein (e.g., the vision system 400 compares what it expects to "see" with what is actually "sees" to verify the correct case unit(s) are being transferred) and/or for detection/identification of another malfunctioning autonomous transport vehicle, dropped case unit, debris, spill, or other transient object within the storage and retrieval system 100.

The vision system controller 122VC is configured to register image data captured by the supplemental navigation sensor system 288 and generate, from the captured image data, at least one image (e.g., still image and/or video image) of one or more features of the predetermined features (e.g., the fixed/permanent structure of and/or transient objects in the storage structure 130 of the storage and retrieval system described herein). The at least one image (see, e.g., FIGS. 5A-5C, 9A, 10A, and 10B for exemplary images) being formatted as a virtual representation VR of the one or more (imaged) predetermined features so as to provide a comparison (in at least one but up to the six degrees of freedom X, Y, Z, Rx, Ry, Rz) to one or more corresponding reference (e.g., a corresponding feature of the virtual model 400VM that serves as a reference for identifying the form and/or location of the imaged predetermined feature) of the predetermined features of the reference representation 400VMR.

Figure 13:
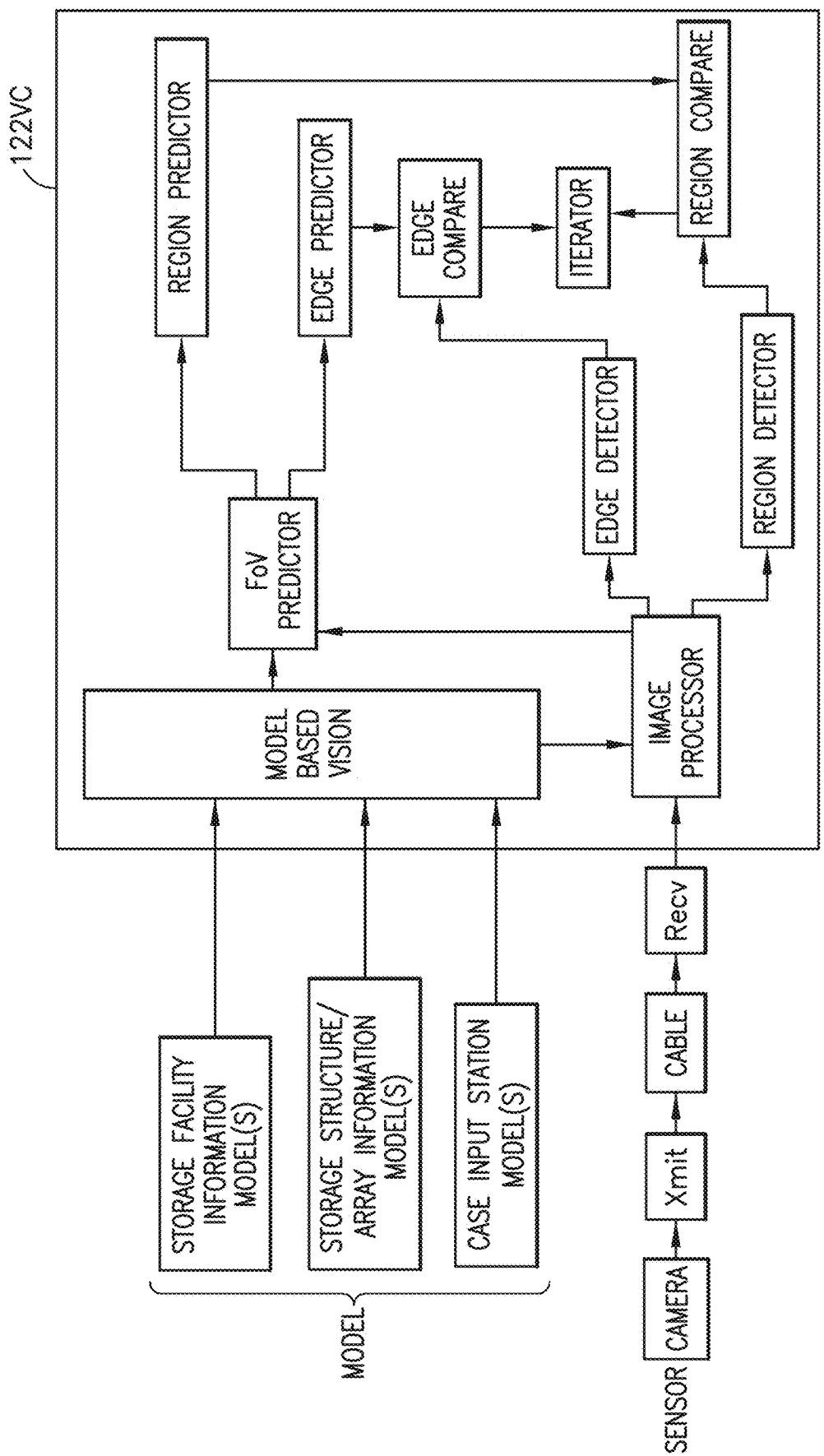
FIG. 13 is an exemplary flow diagram of a vision analysis effected by the autonomous guided vehicle of FIG. 2 in accordance with aspects of the disclosed embodiment.

FIG. 13 is an exemplary flow diagram of the comparison where at least one model 400VM of the storage and retrieval system is stored within or accessible to the vision system controller 122VC. For exemplary purposes only, a storage facility information model, a storage structure/array information model, and a case input station model are provided but in other aspects any suitable models and number of models may be provided to provide the vision system controller 122VC with virtual information pertaining to the operating environment of the autonomous transport vehicles 110. The different models may be combined to provide the vision system controller 122VC with a complete virtual operating environment in which the autonomous transport vehicle 110 operates. The sensors of the vision system 400 (as described herein) also provide sensor data to the vision system controller 122VC. The sensor data, that embodies the virtual representation VR images, is processed with any suitable image processing methods to detect a region of interest and/or edge features of objects in the image. The vision system controller 122VC predicts, within the model 400VM, a field of view of the sensor(s) providing the image data and determines, within the predicted field of view, regions of interest and edges of objects. The regions of interest and edges of the virtual model 400VM are compared with the regions of interest and edges of the virtual representation VR pose and location determination of one or more of the autonomous transport vehicle 110 and case units (payloads) as described herein.

Figure 9A:
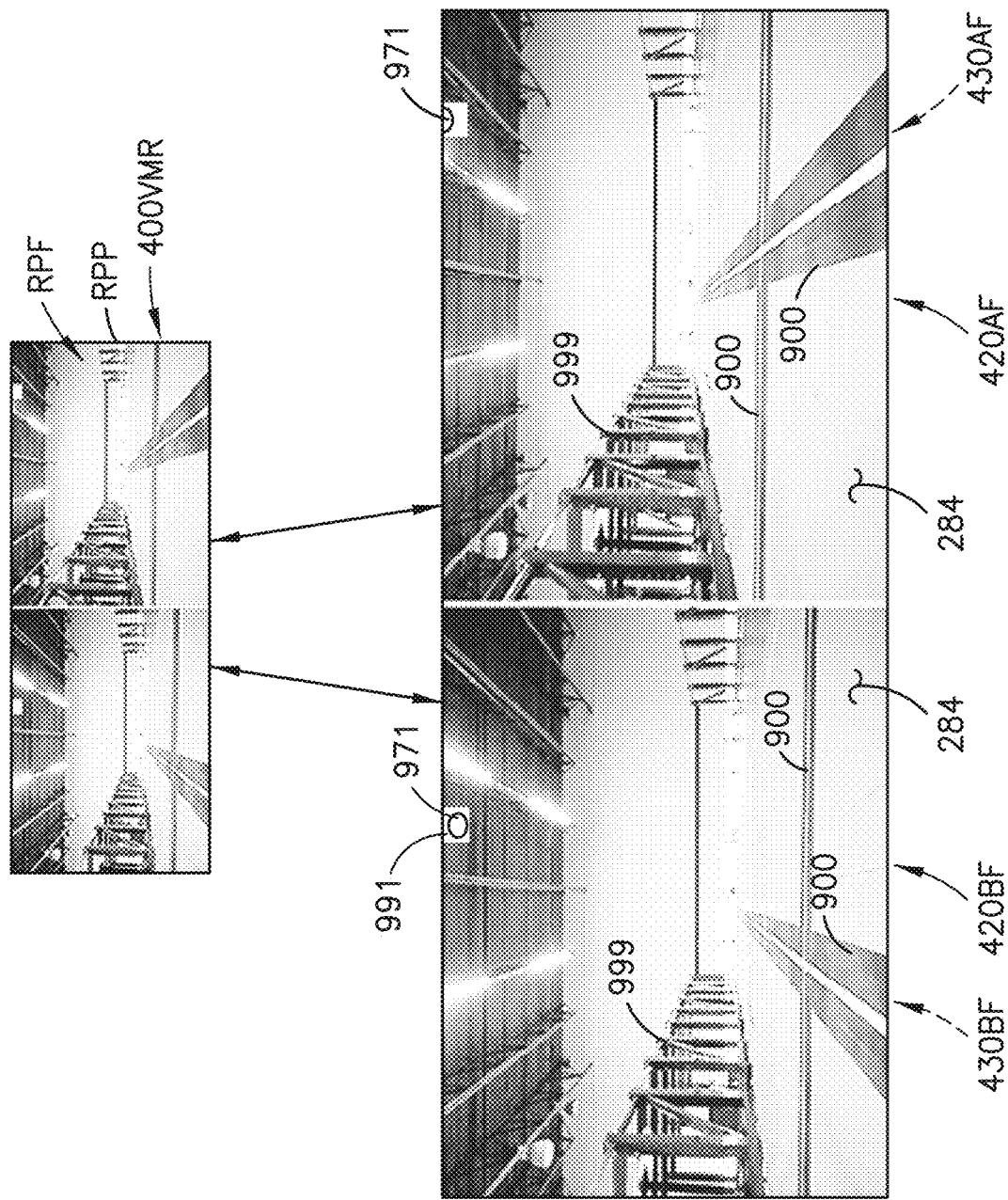
FIG. 9A is an exemplary stereo vision image captured by a supplemental sensor system of the autonomous guided vehicle of FIG. 2 in accordance with aspects of the disclosed embodiment.
Figure 10A:
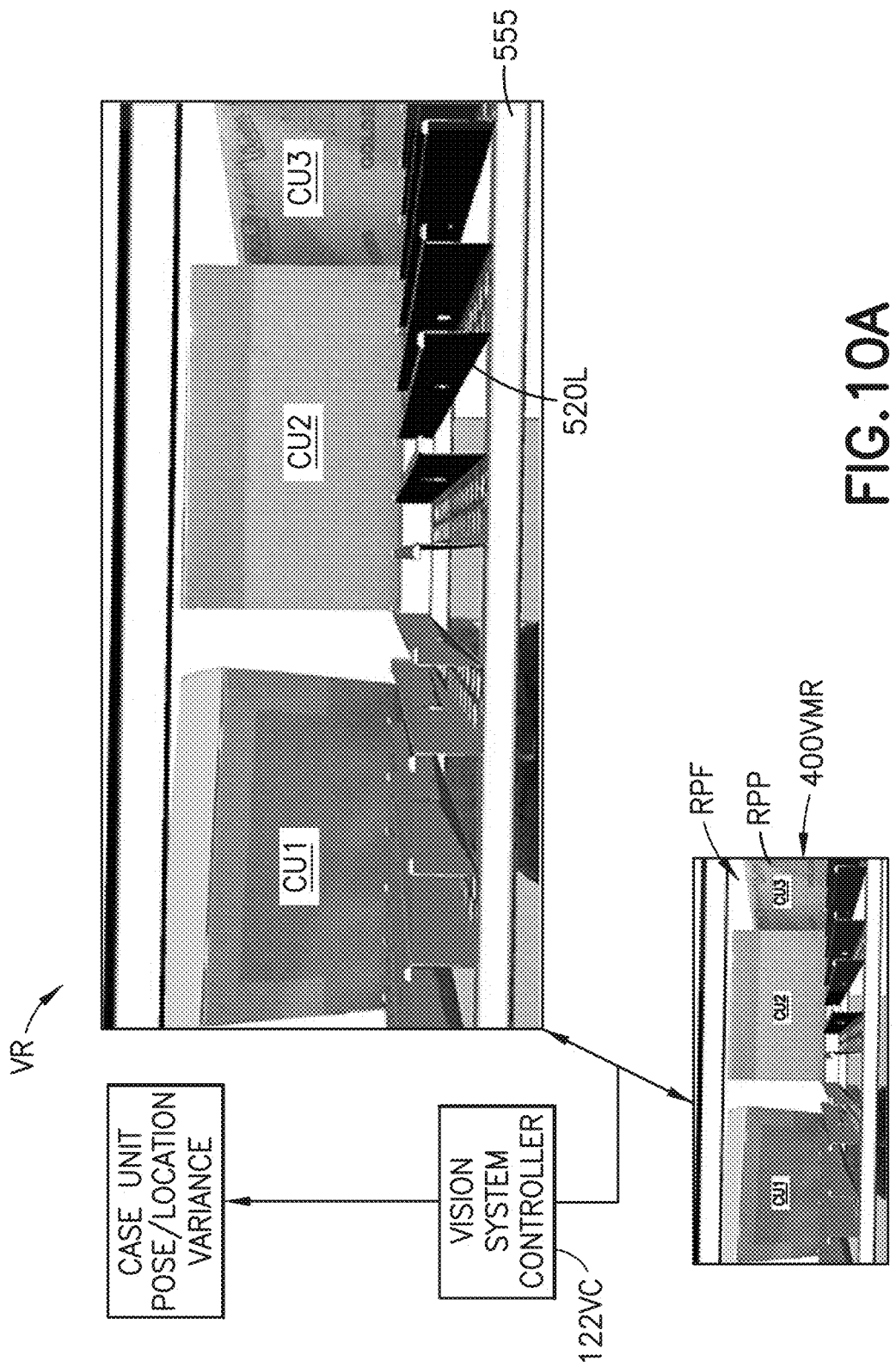
FIG. 10A is an exemplary augmented image captured by a supplemental sensor system of the autonomous guided vehicle of FIG. 2 in accordance with aspects of the disclosed embodiment.
Figure 10B:
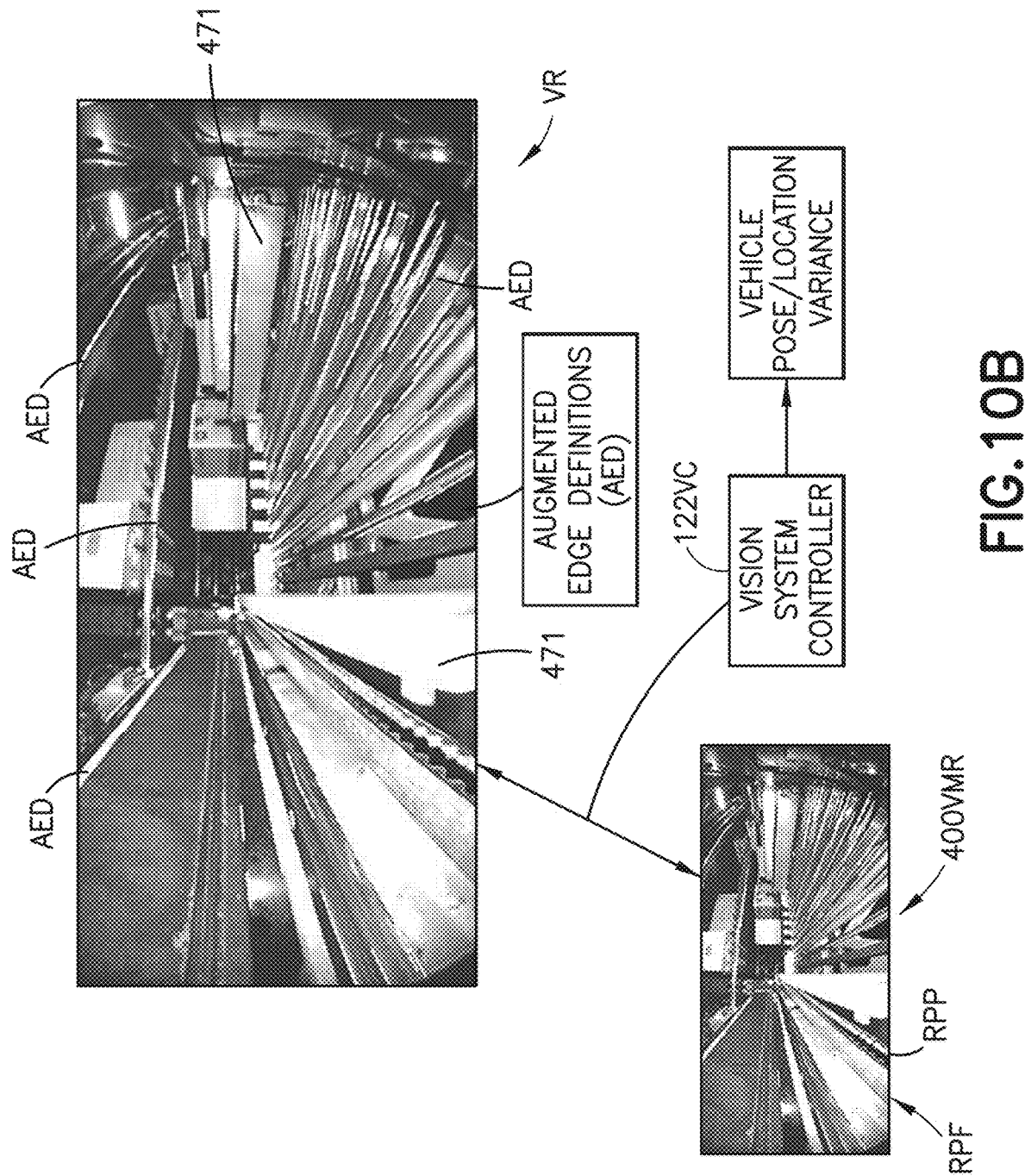
FIG. 10B is an exemplary augmented stereo vision image captured by a supplemental sensor system of the autonomous guided vehicle of FIG. 2 in accordance with aspects of the disclosed embodiment.

The vision system controller 122VC is configured (as described herein with at part of the virtual model 400VM and with suitable imaging processing non-transitory computer program code) so that the virtual representation VR, of the imaged one or more features (e.g., in FIG. 9A the imaged features are the storage and retrieval system rack/column structure, in FIG. 10A the imaged features are the case units CU1-CU3, and in FIG. 10B the imaged features are the case units, storage rack structure, and a portion of the payload bed 210B) of the predetermined features, is effected resident on the autonomous transport vehicle 110, and comparison between the virtual representation VR of the one or more imaged predetermined features and the one or more corresponding reference predetermined features RPF (e.g., presented in a reference presentation RPP of the virtual model 400VM) is effected resident on the autonomous transport vehicle 110 (see FIGS. 9A and 10A). Here, the autonomous transport vehicle 110 pose determination and navigation is autonomous and decoupled from and independent of each system controller (e.g., control server 120 or other suitable controller of the storage and retrieval system) that sends commands to the autonomous transport vehicle 110.

As described herein, the controller 122 is configured to employ the supplemental (e.g., pixel level) position information obtained from the vision system controller 122VC of the supplemental navigation sensor system 288 to what may be referred to as "fine tune" the vehicle pose and location relative to the pick/place location so that positioning of the vehicle 110 and case units CU placed to storage locations 130S by the vehicle 110 may be held to smaller tolerances (i.e., increased position accuracy) compared to positioning of the vehicle 110 or case units CU with the physical characteristic sensor system 270 alone. The fine tuning of the autonomous transport vehicle 110 pose and location is effected by the vision system controller 122VC, where the vision system controller 122VC is configured to confirm autonomous transport vehicle 110 pose and location information registered by the vision system controller 122VC from the physical characteristic sensor system 270 based on the comparison between the virtual representation VR and the reference representation RPP.

The comparison between the virtual representation VR and the reference representation RPP by the vision system controller 122VC builds confidence in the data generated by the physical characteristic sensor system 270 by verifying the accuracy of the data with the information obtained from the supplemental navigation sensor system 288. Here, the vision system controller 122VC is configured to identify a variance in the autonomous guided vehicle pose and location based on the comparison between the virtual representation VR and the reference representation RPP, and update (e.g., modify the pose and/or location information from the physical characteristic sensor system 270) or complete (if the pose and/or location information from the physical characteristic system 270 is missing) autonomous transport vehicle 110 pose or location information from the physical characteristic sensor system 270 (e.g., to effect finally positioning the autonomous transport vehicle 110 to a predetermined commanded position) based on the variance.

The vision system controller 122VC is configured to determine a pose error in the information from the physical characteristic sensor system 270 and fidelity of the autonomous guided vehicle 110 pose and location information from the physical characteristic sensor system 270 based on at least one of the identified variance and an image analysis of at least one image (from the vision system 400 of the supplemental navigation sensor system 288), and assign a confidence value according to at least one of the pose error and the fidelity. Where the confidence value is below a predetermined threshold, the vision system controller 122VC is configured to switch autonomous guided vehicle navigation based on pose and location information generated from the virtual representation VR in place of pose and location information from the physical characteristic sensor system 270. The switching from the physical characteristic sensor system pose and location information to the virtual representation VR pose and location information may be effected by the vision system controller 122VC (or controller 122), by de-selecting the pose and location information, generated from the physical characteristic sensor system 270, and selecting/entering pose and location information from the virtual representation VR in a kinematic/dynamic algorithm (such as described in U.S. patent application Ser. No. 16/144,668 titled "Storage and Retrieval System" and filed on Sep. 27, 2018, the disclosure of which is incorporated herein by reference in its entirety).

After the vision system controller 122VC effects the above-noted switching the vision system controller 122VC is configured to continue autonomous transport vehicle 110 navigation to any suitable destination (such as a payload place destination, charging destination, etc.); while in other aspects the vision system controller 122VC is configured to select an autonomous transport vehicle 110 safe path and trajectory bringing the autonomous transport vehicle 110 from a position at switching to a safe location 157 (the safe location being a dedicated induction/extraction area of a transfer deck, a lift transfer area, or other area of the transfer deck 130B or picking aisle 130A at which the autonomous transport vehicle 110 may be accessed by an operator without obstructing operation of other autonomous transport vehicles 110 operating in the storage and retrieval system 100) for shut down of the autonomous transport vehicle 110; while in still other aspects, the vision system controller 122VC is configured to initiate communication to an operator of the storage and retrieval system 100 identifying autonomous transport vehicle 110 kinematic data and identify a destination of the autonomous transport vehicle 110 for operator selection (e.g., presented on user interface UI). Here the operator may select or switch control of the autonomous guided vehicle (e.g., through the user interface UI) from automatic operation to either quasi automatic operation (e.g., the autonomous transport vehicle 110 operates autonomously with limited manual input) or manual operation (e.g., the operator remotely controls operation of the autonomous transport vehicle 110 through the user interface UI). For example, the user interface UI may include a capacitive touch pad/screen, joystick, haptic screen, or other input device that conveys kinematic directional commands (e.g., turn, acceleration, deceleration, etc.) and/or pick place commands from the user interface UI to the autonomous guided vehicle 110 to effect operator control inputs in the quasi automatic operational and manual operational modes of the autonomous transport vehicle 110.

It is noted that where the variance described herein is persistent (to within a predetermined tolerance) the vision system controller 122VC may be configured to apply the variance as a offset that is automatically applied to the data from the physical characteristic sensor system 270 to grossly position the autonomous transport vehicle 110 based on the data from the physical characteristic sensor system 270 as modified by the offset, where comparison with the virtual representation VR and the reference representation RPP verifies the validity of the offset and adjusts the offset (and autonomous transport vehicle 110 pose and location) according to any variance. Where the variance reaches a predetermined threshold the vision system controller 122VC may alert a user of the storage and retrieval system 100 that the autonomous guided vehicle 110 may be due for servicing.

Still referring to FIGS. 1A, 2, 4A, 4B, and 10A, while the pose and location error identification of the autonomous transport vehicle 110 is described above, the vision system controller 122VC is configured to effect a similar pose and location error identification for the case units CU, such as held in storage locations 130S or other holding areas of the storage and retrieval system. For example, the vision system controller 122VC is configured to confirm payload pose and location information registered by the vision system controller 122VC from the physical characteristic sensor system 270 based on the comparison between the virtual representation VR and the reference representation RPP of the virtual model 400VM. The vision system controller 122VC is configured to identify a variance in the payload (case unit) pose and location based on the comparison between the virtual representation VR and the reference representation RPP, and update (e.g., modify the pose and/or location information from the physical characteristic sensor system 270) or complete (if the pose and/or location information from the physical characteristic system 270 is missing) payload pose or location information from the physical characteristic sensor system based on the variance.

The vision system controller 122VC is configured to determine a pose error in the information from the physical characteristic sensor system 270 and fidelity of the payload pose and location information from the physical characteristic sensor system 270 based on at least one of the identified variance and an image analysis of the at least one image from the vision system 400 of the supplemental navigation sensor system 288. The vision system controller 122VC assigns a confidence value according to at least one of the payload pose error and the fidelity. With the confidence value below a predetermined threshold, the vision system controller 122VC switches autonomous transport vehicle 110 payload handling based on pose and location information generated from the virtual representation VR in place of pose and location information from the physical characteristic sensor system 270.

After switching, the vision system controller 122VC is configured to, in some aspects, continue autonomous guided vehicle handling to a predetermined destination (such as a payload placement location or an area of the storage and retrieval system where the payload may be inspected by an operator); in other aspects the vision system controller 122VC is configured to initiate communication to an operator identifying payload data along with an operator selection of autonomous guided vehicle control from automatic payload handling operation to quasi automatic payload handling operation (where the operator provides limited input to transfer arm 210A and traverse movements of the autonomous guided vehicle) or manual payload handling operation (where the operator manually controls movement of the transfer arm 210A and traverse movements of the autonomous guided vehicle) via the user interface device UI.

In a manner similar to that described above, the vision system controller 122VC is configured to transmit, via a wireless communication system (such as network 180) communicably coupling the vision system controller 122VC and an operator interface UI, a simulation image combining the virtual representation VR of the one or more imaged predetermined features and one or more corresponding reference predetermined features of a reference presentation RPP presenting the operator with an augmented reality image in real time (see FIG. 10A, where reference predetermined features include the shelves 555 and the virtual representations include those of the case units CU1-CU3). Here, the vision system 400 of the supplemental navigation sensor system 288 provides a "dashboard camera" (or dash-camera) that transmits video and/or still images from the vehicle 110 to an operator to allow remote operation or monitoring of the vehicle 110. It is noted that the vision system 400 may also operate as a data recorder that periodically sends still images obtained from the vision system cameras to a memory of the user interface UI, where the still images are stored/cached for operator review (e.g., in addition to providing a real-time video stream the vision system 400 provides for non-real time review of the still images). The still images may be captured and transmitted to the user interface for storage at any suitable interval such as, for example, every second, every ten seconds, every thirty seconds, every minute, or at any other suitable time intervals (exclusive of real time video stream recording), where the periodicity of the still image capture/recording maintains suitable communication bandwidth between, for example, the control server 120 and the bots 110 (noting that in accordance with aspects of the disclosed embodiment, the number of bots 110 operating/transferring case units in the storage and retrieval system 100 may be on the order of hundreds to thousands of bots 110). Here, the user interface UI with the record of stored still images provides for an interactive presentation/data interface where a user reviews the still images to determine how or why an event (e.g., such as a case miss-pick, bot breakage, product spill, debris presence on the transfer deck, etc.) occurred and what transpired prior to and/or after the event.

The vision system controller 122VC is configured to receive real time operator commands (e.g., from the user interface UI) to the traversing autonomous guided vehicle 110, which commands are responsive to the real time augmented reality image (see FIGS. 9A and 10A), and changes in the real time augmented reality image transmitted to the operator by the vision system controller 122VC. The video or still images may be stored (and time stamped) in a memory onboard the vehicle 110 and sent to control server 120 and/or an operator on request; in other aspects the video and/or still images may be broadcast or otherwise transmitted in real time for viewing on a user interface UI (as described herein) accessible to the operator.

The vision system controller 122VC is also configured to register image data captured by the supplemental hazard sensor system 290 and generate, from the captured image data, at least one image (e.g., still image and/or video image) of one or more object or spatial feature 299 showing the predetermined physical characteristic. The at least one image (see, e.g., FIGS. 5B, 5C, and 15 for exemplary images) may be formatted as a virtual representation VR of the one or more object or spatial feature 299 (see FIGS. 4D and 15) so as to provide a comparison (in at least one but up to the six degrees of freedom X, Y, Z, Rx, Ry, Rz (see FIG. 2)) to one or more corresponding reference (e.g., a corresponding feature of the virtual model 400VM that serves as a reference for identifying the form and/or location of the imaged predetermined feature) of the predetermined features of the reference representation 400VMR. The controller 122VC is configured to verify (via the comparison) the existence of presence of the predetermined physical characteristic of the object or spatial feature 299 based on the comparison between the virtual representation and the reference representation (i.e., compare to determine whether the object is "known" or "unknown"). Where the object or spatial feature 299 is verified by the controller 122VC as "unknown", the controller 122VC determines a dimension of the predetermined physical characteristic and commands (e.g., through the controller 122) the autonomous transport vehicle 110 to stop in a predetermined location relative to the object 299 (i.e., a trajectory is determined to autonomously place the bot in a predetermined position relative to the object or spatial feature 299) based on a position of the object or spatial features 299 determined from the comparison (as may be realized, the command stop interrupts the automatic routine of the vehicle previous autonomous commands, in effect diverting the bot from automatic tasking). In response to detecting the predetermined physical characteristic of at least one object or spatial feature 299, the controller 122 selectably reconfigures the autonomous transport vehicle 110 from an autonomous state to a collaborative vehicle state so as to finalize discrimination of the object or spatial feature 299 as a hazard and identify a mitigation action of the vehicle with respect to the hazard (i.e., selectably switches the autonomous transport vehicle 110 from an autonomous operation state to a collaborative operation state and identifies whether the vehicle can mitigate the hazard, e.g., remove a disabled vehicle or act as a signal/beacon to warn other vehicles performing autonomous tasks). In the collaborative operation state, the autonomous transport vehicle 110 is disposed to receive operator commands for the autonomous transport vehicle 110 to continue effecting vehicle operation for discriminating and mitigation of the object or spatial feature 299.

In one aspect, the autonomous transport vehicle 110 may not include the reference map (e.g., virtual model 400VM). In this aspect, when the camera 292 detects an object or spatial feature 299, the controller 122VC determines a position of the object within a reference frame of the at least one camera 292, which is calibrated and has a predetermined relationship to the autonomous transport vehicle 110. From the object pose in camera reference frame, the controller 122VC determines presence of the predetermined physical characteristic of object 299 (i.e., whether the object 299 is extended across bot path, blocks the bot, or is proximate, within a predetermined distance, to the bot path to be deemed an obstacle or hazard). Upon determination of presence of an object and switch from the autonomous state to the collaborative vehicle state, the controller 122VC is configured to initiate transmission communicating image/ video the of presence of the predetermined physical characteristic to an operator (user) interface UI for collaborative operator operation of the autonomous transport vehicle 110 as will be further described below (Here the vehicle 110 is configured as an observation platform and pointer for a user in collaborative mode. The vehicle 110 in this mode is also a pointer for other bots executing in autonomous operation, that identify the pointer bot (e.g., via control system 120, or beacon) and reroute automatically to avoid the area until further command and if avoidance is not available to stop ahead of encountering the object/hazard).

Figure 15:
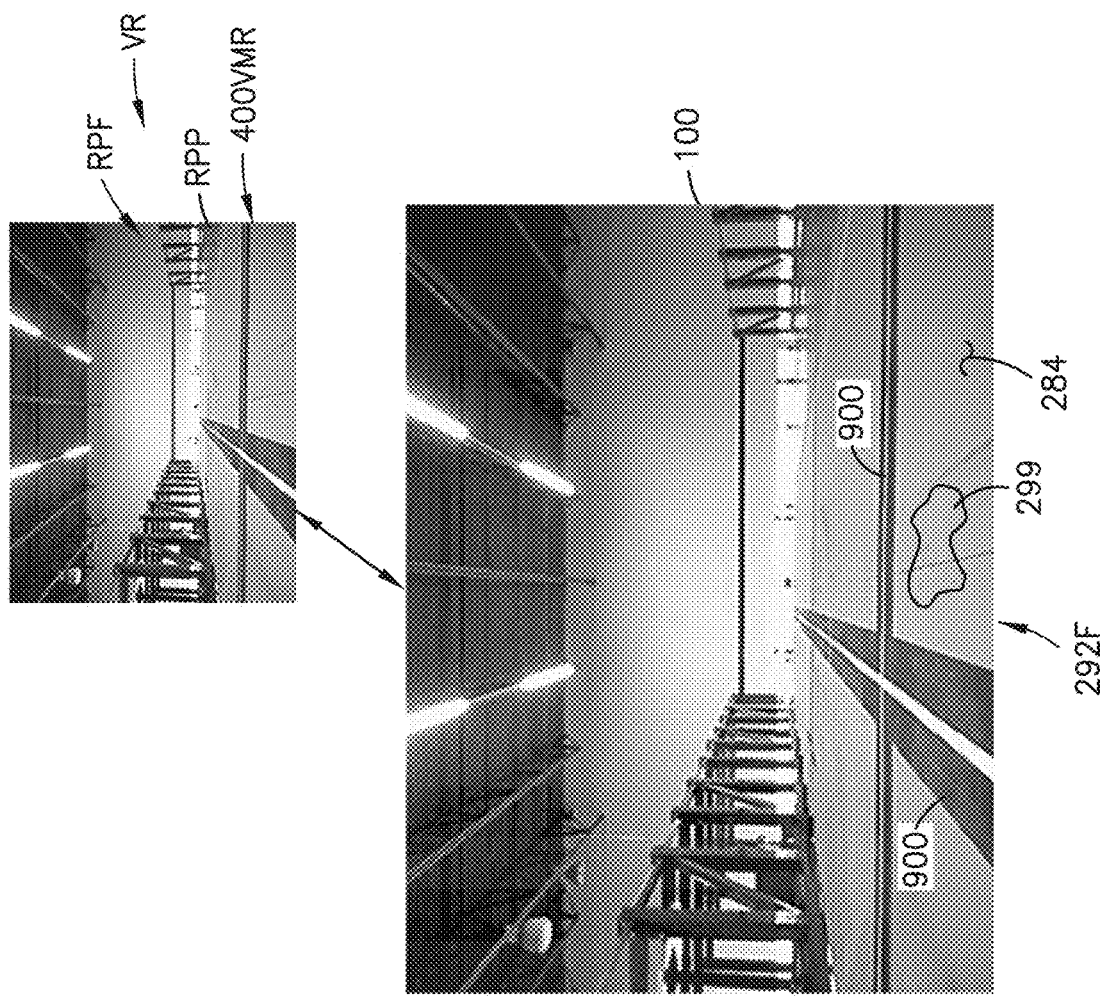
FIG. 15 is an exemplary image captured by a supplemental sensor system of the autonomous guided vehicle of FIG. 2 in accordance with aspects of the disclosed embodiment.
Figure 16:
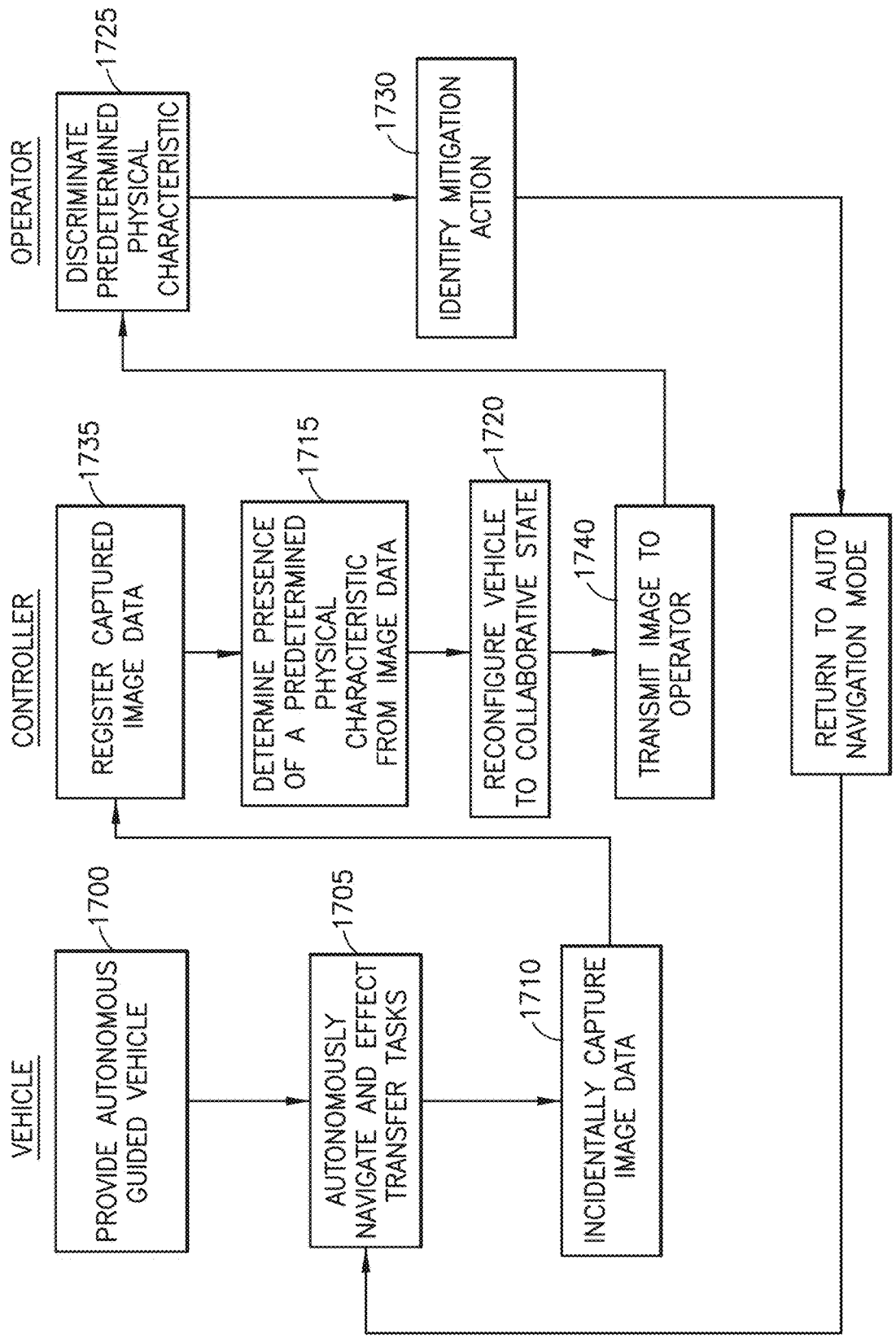
FIG. 16 is an exemplary flow diagram of an image analysis effected by the autonomous guided vehicle of FIG. 2 in accordance with aspects of the disclosed embodiment.
Figure 17:
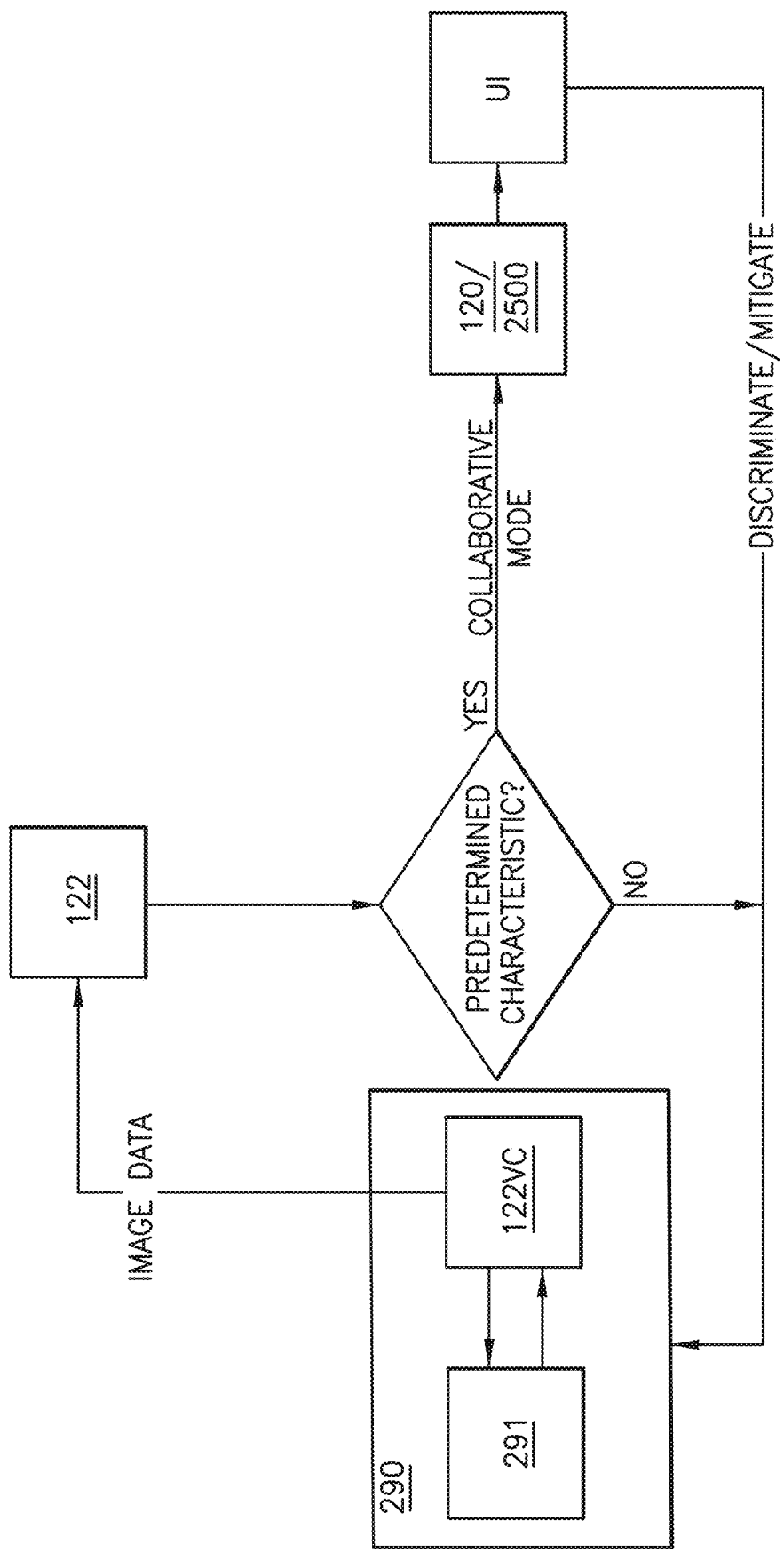
FIG. 17 is an exemplary flow diagram of an image analysis collaboratively effected with a supplemental sensor system of the autonomous guided vehicle of FIG. 2 and an operator in accordance with aspects of the disclosed embodiment.
Figure 18:
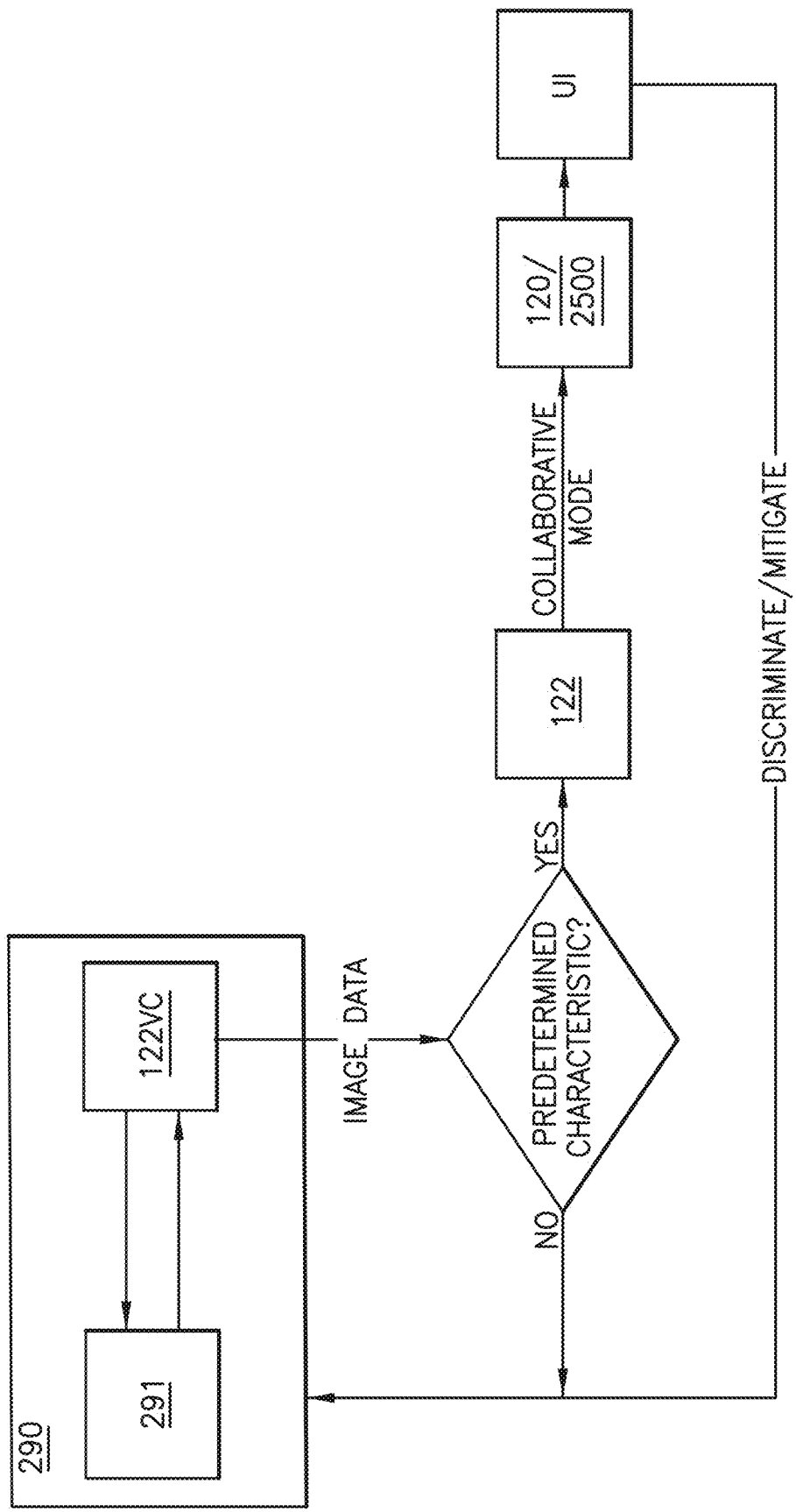
FIG. 18 is an exemplary flow diagram of an image analysis collaboratively effected with a supplemental sensor system of the autonomous guided vehicle of FIG. 2 and an operator in accordance with aspects of the disclosed embodiment.

The vision system controller 122VC is configured (as described herein with at least part of the virtual model 400VM and with suitable imaging processing non-transitory computer program code) so that the virtual representation VR, of the imaged object or spatial feature 299 is effected resident on the autonomous transport vehicle 110, and comparison between the virtual representation VR of the one or more imaged object or spatial feature 299 and the one or more corresponding reference predetermined features RPF (e.g., presented in a reference presentation RPP of the virtual model 400VM) is effected resident on the autonomous transport vehicle 110 (see FIG. 15). The comparison between the virtual representation VR and the reference representation RPP by the vision system controller 122VC verifies whether the object or spatial feature 299 is "unknown". The vision system controller 122VC is configured to determine a dimension of the object or spatial feature 299 based on image analysis of at least one image (from the vision system 400 of the supplemental hazard sensor system 290). Where the dimensions are unidentifiable, the vision system controller 122VC is configured to switch the autonomous transport vehicle 110 into the collaborative operation state for collaborative discrimination of the object 299 with the operator. The switching from the autonomous to the collaborative state may be effected by the vision system controller 122VC (or controller 122), by selectably reconfiguring the autonomous transport vehicle 110 from an autonomous vehicle to a collaborative vehicle (i.e., selectably switches the autonomous transport vehicle 110 from an autonomous operation state to a collaborative operation state).

In one aspect, with the above noted switching effected by the vision system controller 122VC (and controller 122), the controller 122 is configured to continue autonomous transport vehicle 110 navigation to any suitable destination relative to the detected object, applying a trajectory to the autonomous transport vehicle 110 that brings the autonomous transport vehicle 110 to a zero velocity within a predetermined time period where motion of the autonomous transport vehicle 110 along the trajectory is coordinated with "known" and "unknown" objects located relative to the autonomous transport vehicle 110. With the autonomous transport vehicle 110 stopped, the vision system controller 122VC initiates communication to the operator of the storage and retrieval system 100 displaying the object or spatial feature 299 on the user interface UI for the operator to discriminate the object 299 and determine a mitigation action such as maintenance (e.g., clean-up of a spill, removal of a malfunctioning bot, etc.) and a location of the autonomous transport vehicle 110 (e.g., presented on user interface UI). As noted above, in one aspect, the controller 122 may initiate a signal/beacon to at least another bot(s) so as to alert the other bot(s) of a traffic obstacle and to avoid the obstacle or indicate a detour area (thus, in effect, the supplemental hazard sensor system 290 provides for a hazard pointer/indicator mode of one bot to others on the same level). In one aspect, the signal/beacon is sent via a local communication transmission to a system area bot task manager, managing tasks of nearby bots, or bots within a predetermined distance of the pointer bot. In other aspects, the controller 122 is configured, based on object information from the vision system 400 and vision system controller 122VC, to select an autonomous transport vehicle 110 safe path and trajectory bringing the autonomous transport vehicle 110 from a position at switching to a location 157 where the operator may view the object 299 without further obstructing operation of other autonomous transport vehicles 110 operating in the storage and retrieval system 100. The vision system controller 122VC is configured to maintain the object or spatial feature 299 within field of view 292F of at least one camera 292 and continued imaging of the predetermined physical characteristic.

In one aspect, the operator may select or switch control of the autonomous guided vehicle (e.g., through the user interface UI) from automatic operation to collaborative operation (e.g., the operator remotely controls operation of the autonomous transport vehicle 110 through the user interface UI). For example, the user interface UI may include a capacitive touch pad/screen, joystick, haptic screen, or other input device that conveys kinematic directional commands (e.g., turn, acceleration, deceleration, etc.) from the user interface UI to the autonomous transport vehicle 110 to effect operator control inputs in the collaborative operational mode of the autonomous transport vehicle 110. For example, the vision system 400 of the supplemental hazard sensor system 290 provides a "dashboard camera" (or dash-camera) that transmits video and/or still images from the autonomous transport vehicle 110 to an operator (through user interface UI) to allow remote operation or monitoring of the area relative to the autonomous transport vehicle 110 in a manner similar to that described herein with respect to supplemental navigation sensor system 288.

Referring to FIGS. 2, 4A, 4B, 9A, 10A, and 15, the vision system controller 122VC (and/or controller 122) is in one or more aspects configured to provide remote viewing with the vision system 400, where such remote viewing may be presented to an operator in augmented reality or in any other suitable manner (such as un-augmented). For example, the autonomous transport vehicle 110 is communicably connected to the warehouse management system 2500 (e.g., via the control server 120) over the network 180 (or any other suitable wireless network). The warehouse management system 2500 includes one or more warehouse control center user interfaces UI. The warehouse control center user interface US may be any suitable interfaces such as desktop computers, laptop computers, tablets, smart phones, virtual reality headsets, or any other suitable user interface configured to present visual and/or aural data obtained from the autonomous transport vehicle 110. In some aspects the vehicle 110 may include one or more microphones MCP (FIG. 2) where the one or more microphones and/or remote viewing may assist in preventative maintenance/troubleshooting diagnostics for storage and retrieval system components such as the vehicle 110, other vehicles, lifts, storage shelves, etc. The warehouse control center user interfaces UI are configured so that warehouse control center users request or are otherwise supplied (such as upon detection of an unidentifiable object 299) with images from the autonomous transport vehicle 110 and so that the requested/supplied images are viewed on the warehouse control center user interfaces UI.

The images supplied and/or requested may be live video streams, pre-recorded (and saved in any suitable memory of the autonomous transport vehicle 110 or warehouse management system 2500) images, or images (e.g., one or more static images and/or dynamic video images that correspond to a specified (either user selectable or preset) time interval or number of images taken on demand substantially in real time with a respective image request. It is noted that live video stream and/or image capture provided by the vision system 400 and vision system controller 122VC may provide for real-time remote controlled operation (e.g., teleoperation) of the autonomous transport vehicle 110 by a warehouse control center user through the warehouse control center user interface UI.

In some aspects, the live video is streamed from the vision system 400 of the supplemental navigation sensor system 288 and/or the supplemental hazard sensor system 290 to the user interface UI as a conventional video stream (e.g., the image is presented on the user interface without augmentation, what the camera "sees" is what is presented) as illustrated in FIGS. 9A and 15. In this aspect, FIG. 9A illustrates a live video that streamed without augmentation from both the forward navigation cameras 420A, 420B (a similar video stream may be provided by the rearward navigation cameras 430A, 430B but in the opposite direction); while FIG. 15 illustrates a live video that streamed without augmentation from the forward camera 292/477A (a similar video stream may be provided by the rearward camera 292/477B but in the opposite direction). Similar video may be streamed from any of the cameras of the supplemental navigation sensor system 288 and/or supplemental hazard sensor system 290 described herein. While FIG. 9A illustrates a side by side presentation of the forward navigation cameras 420A, 420B, the video stream, where requested by the user, may be for but one of the forward navigation cameras 420A, 420B. Where a virtual reality headset is employed by a user to view the streamed video, images from the right side forward navigation camera 420A may be presented in a viewfinder of the virtual reality headset corresponding to the user's right eye and images from the left side forward navigation camera 420B may be presented in a viewfinder of the virtual reality headset corresponding to the user's left eye.

Figure 9B:
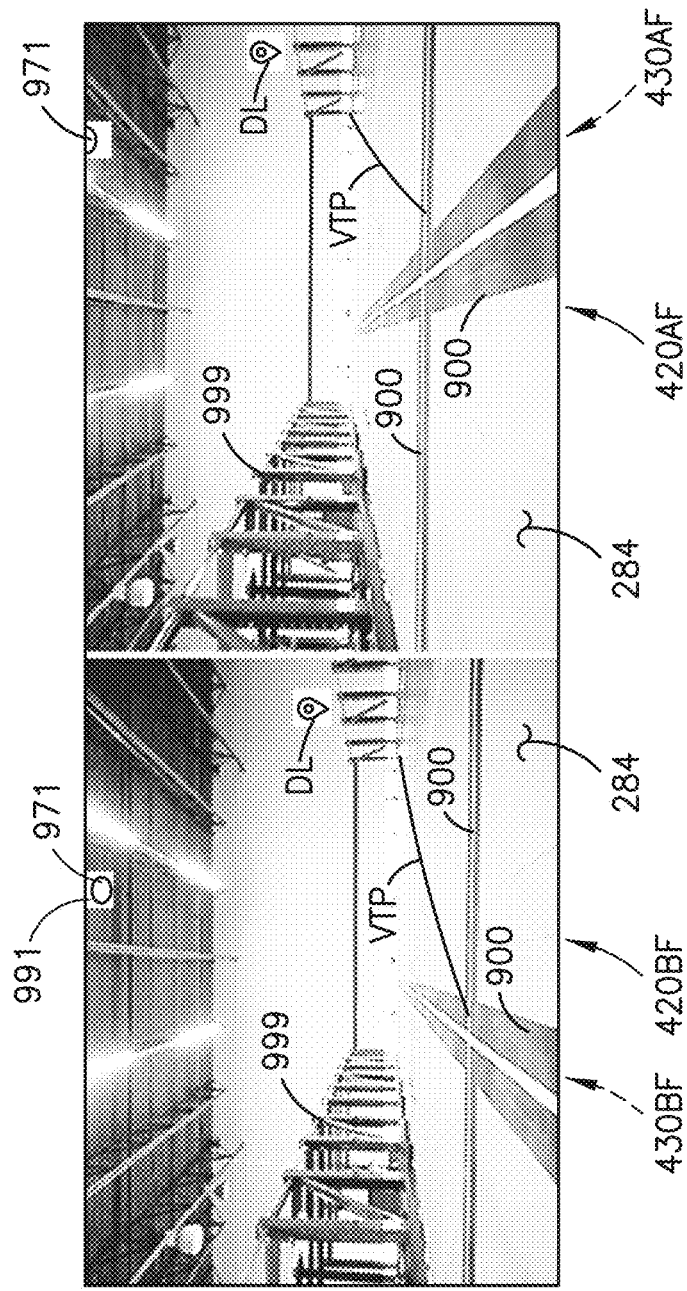
FIG. 9B is an exemplary augmented stereo vision image captured by a supplemental sensor system of the autonomous guided vehicle of FIG. 2 in accordance with aspects of the disclosed embodiment.

In some aspects, the live video is streamed from the vision system 400 of the supplemental navigation sensor system 288 to the user interface UI as an augmented reality video stream (e.g., a combination of live video and virtual objects are presented in the streamed video) as illustrated in FIG. 10A. In this aspect, FIG. 10A illustrates a live video that is streamed with augmentation from one of the case unit monitoring cameras 410A, 410B (a similar video stream may be provided by the other of the case unit monitoring cameras 430A, 430B but offset by the separation distance between the cameras 430A, 430B). Similar augmented video may be streamed from any of the cameras of the supplemental navigation sensor system 288 described herein. In FIG. 10A the case units CU1, CU2, CU3 are presented to the user through the user interface UI in the live video stream as the case units are captured by the one of the case unit monitoring cameras 410A, 410B. Virtual representations of the shelf 555 and slats 520L on which the case units CU1, CU2, CU3 are seated may be inserted into the live video stream by the vision system controller 122VC or other suitable controller (such as control server 120) to augment the live video stream. The virtual representations of the shelf 555 and slats 520L (or other structure of the storage and retrieval system 100) may be virtually inserted into the live video stream such as where portions of the structure are not within the field of view 410AF, 410BF of the case unit monitoring cameras 410A, 410B (or a field of view of whichever camera of the supplemental navigation sensor system 288 is capturing the video). Here, the virtual representations of the storage and retrieval structure may be virtually inserted into the live video streams to supplement/augment the live video stream with information that may be useful to the user (e.g., to provide a completed "picture" of what is being "observed" by the autonomous transport vehicle) where such information is not captured by cameras or not clearly discernable in the camera image data. The virtual representations of the storage and retrieval structure that are virtually inserted into the live video stream are obtained by the vision system controller 122VC (or control server 120) from the virtual model 400VM. Also referring to FIG. 9B, where the autonomous transport vehicle 110 is under remote control operation, the video streams may be augmented to provide the operator with a transport path VTP and/or destination location indicator DL that provide the operator with guidance as to a destination location of the autonomous transport vehicle 110. The transport path VTP and destination location indicator DL may also be presented in the video streams with the autonomous transport vehicle operating in the automatic/autonomous and quasi automatic operation modes to provide an operator with an indication of the planned route and destination.

Referring to FIGS. 1A, 2, 4A, 4B, 9A, 10A, and 12 an exemplary method will be described in accordance with aspects of the disclosed embodiment. The method includes providing the autonomous transport vehicle 110 (FIG. 12, Block 1200) as described herein. Sensor data is generated (FIG. 12, Block 1205) with the physical characteristic sensor system 270 where, as described herein, the sensor data embodies at least one of a vehicle navigation pose or location information and payload pose or location information. Image data is captured (FIG. 12, Block 1210) with the supplemental navigation sensor system 288 where, as described herein, the image data informs the at least one of a vehicle navigation pose or location and payload pose or location supplement to the information of the physical characteristic sensor system 270.

The method may also include determining, with the vision system controller 122VC, from the information of the physical characteristic sensor system 270 vehicle pose and location (FIG. 12, Block 1220) effecting independent guidance of the autonomous transport vehicle 110 traversing the storage and retrieval system 100 facility. The vision system controller 122VC may also determine from the information of the physical characteristic sensor system 270 payload (e.g., case unit CU) pose and location (FIG. 12, Block 1225) effecting independent underpick and place of the payload to and from the storage location and independent underpick and place of the payload in the payload bed 210B as described herein.

The vision system controller 122VC may also register the captured image data and generating therefrom at least one image of one or more features of the predetermined features (FIG. 12, Block 1215) where, as described herein, the at least one image is formatted as a virtual representation VR of the one or more predetermined features so as to provide comparison to one or more corresponding reference e.g., a corresponding feature of the virtual model 400VM that serves as a reference for identifying the form and/or location of the imaged predetermined feature) of the predetermined features of the reference representation 400VMR. As described herein, the vision system controller 122VC is configured so that the virtual representation VR, of the imaged one or more features of the predetermined features, is effected resident on the autonomous transport vehicle 110, and the comparison between the virtual representation VR of the one or more imaged predetermined features and the one or more corresponding reference predetermined features (of the reference representation 400VMR) is effected resident on the autonomous transport vehicle 110. The vision system controller 122 may confirm autonomous guided vehicle pose and location information or payload pose and location information (FIG. 12, Block 1230) registered by the vision system controller 122VC from the physical characteristic sensor system 270 based on the comparison between the virtual representation VR and the reference representation 400VMR.

The vision system controller 122VC may identify a variance in the autonomous transport vehicle 110 pose and location or a variance in the payload pose and location (FIG. 12, Block 1235) based on the comparison between the virtual representation VR and the reference representation 400VMR, and update or complete autonomous transport vehicle 110 pose or location information or update and complete the payload pose and location information from the physical characteristic sensor system 270 based on the variance. In the method, the vision system controller 122VC may determine a pose error (for the autonomous guided vehicle and/or the payload) (FIG. 12, Block 1240) in the information from the physical characteristic sensor system 270 and fidelity of the pose and location information (for the autonomous guided vehicle and/or the payload) from the physical characteristic sensor system 270 based on at least one of the identified variance and image analysis of the at least one image (e.g., from the vision system 400), and assign a confidence value according to at least one of the pose error and the fidelity. With the confidence value below a predetermined threshold, the vision system controller 122VC switches payload handling based on pose and location information generated from the virtual representation VR in place of pose and location information from the physical characteristic sensor system 270; and/or with the confidence value below a predetermined threshold, the vision system controller 122VC switches autonomous guided vehicle 110 navigation based on pose and location information generated from the virtual representation VR in place of pose and location information from the physical characteristic sensor system 270. After switching, the controller is configured to: continue autonomous guided vehicle navigation to destination or select an autonomous guided vehicle safe path and trajectory bringing the autonomous guided vehicle from a position at switching to a safe location for shut down, or initiate communication to an operator identifying autonomous guided vehicle kinematic data and a destination for operator selection of autonomous guided vehicle control from automatic operation to quasi automatic operation or manual operation via a user interface device; and/or continue autonomous guided vehicle handling to destination, or initiate communication to an operator identifying payload data along with an operator selection of autonomous guided vehicle control from automatic payload handling operation to quasi automatic payload handling operation or manual payload handling operation via a user interface device.

The controller transmits, via a wireless communication system (such as network 180) communicably coupling the vision system controller 122VC and the operator/user interface UI, a simulation image (see FIGS. 9A, 10A, 10B) (FIG. 12, Block 1245) combining the virtual representation VR of the one or more imaged predetermined features and one or more corresponding reference predetermined features RPF of a reference presentation RPP presenting the operator with an augmented reality image in real time. The vision system controller 122VC receives real time operator commands to the traversing autonomous guided vehicle 110, which commands are responsive to the real time augmented reality image (see FIGS. 9A, 10A, 10B), and changes in the real time augmented reality image transmitted to the operator by the vision system controller 122VC.

Figure 14:
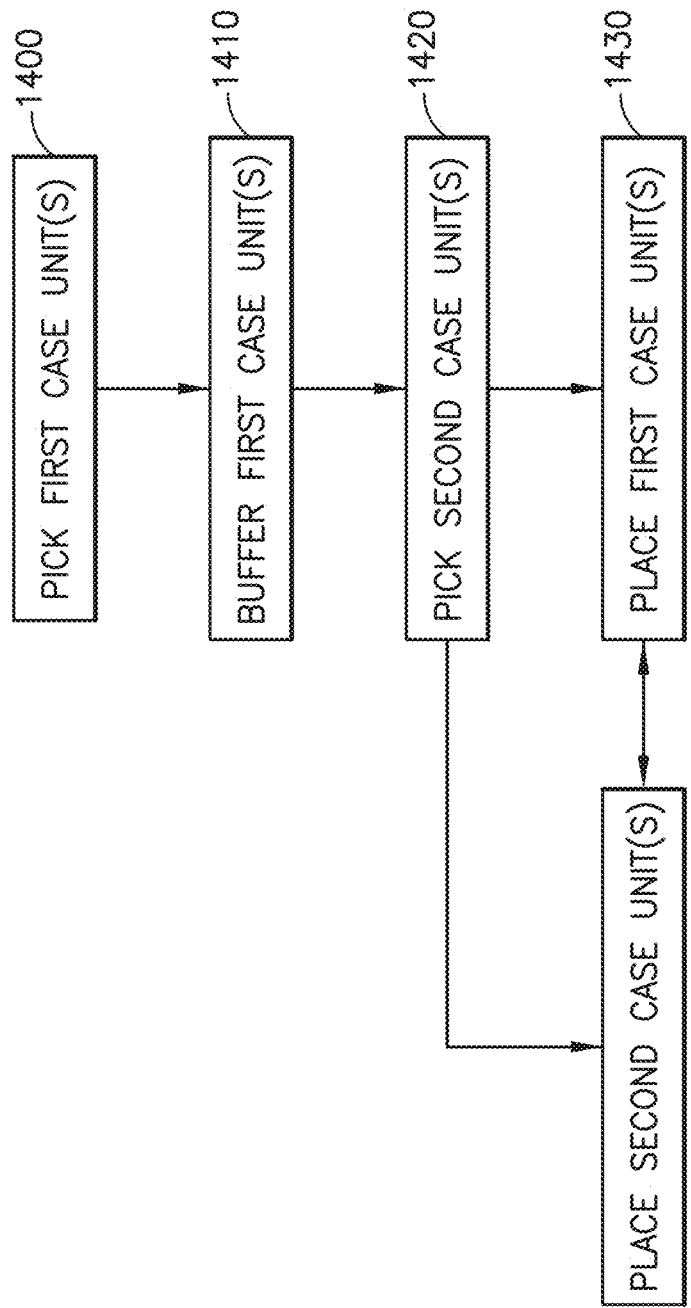
FIG. 14 is an exemplary flow diagram in accordance with aspects of the disclosed embodiment.

Referring now to FIGS. 1A, 1B, 2, 4A, 4B, and 14, an example of an autonomous transport vehicle 110 case unit(s) transfer transaction including a case unit(s) multi-pick and place operation with on the fly sortation of the case units for creating a mixed pallet load MPL (e.g., a pallet load having mixed cases or cases having different stock keeping units as shown in FIG. 1B) according to a predetermined order out sequence will be described in accordance with an aspects of the disclosed embodiment. Suitable examples of multi-pick/place operations of the autonomous transport vehicle 110 in which the aspects of the disclosed embodiment may be employed are described in U.S. Pat. No. 10,562,705 titled "Storage and Retrieval System" issued on Feb. 18, 2020; U.S. Pat. No. 10,839,347 titled "Storage and Retrieval System" issued on Nov. 17, 2020; U.S. Pat. No. 10,850,921 titled "Storage and Retrieval System" issued on Dec. 1, 2020; U.S. Pat. No. 10,954,066 titled "Storage and Retrieval System" issued on Mar. 23, 2021; and U.S. Pat. No. 10,974,897 titled "Storage and Retrieval System" issued on Apr. 13, 2021, the disclosures of which are incorporated herein by reference in their entireties. The autonomous transport vehicle 110 picks at least a first case unit CUA from a first shelf of a first storage location 130S1 of picking aisle 130A1 (FIG. 14, Block 1400). As described above, localization of the autonomous transport vehicle 110 relative to the case unit CUA in storage location 130S1 is effected with the physical characteristic sensor system 270 and/or the supplemental navigation sensor system 288 in the manner described herein.

The autonomous transport vehicle 110 traverses the picking aisle 130A1 and buffers the at least first case unit CUA within the payload bed 210B (FIG. 14, Block 1410). The autonomous transport vehicle 110 traverses the picking aisle 130A1 to a second storage location 130S2 and picks at least a second case unit CUB that is different than the at least first case unit CUA (FIG. 14, Block 1420). While the at least second case unit CUB is described as being in the same picking aisle 130A1 as the at least first case unit CUA, in other aspects the at least second case unit CUB may be in a different aisle or any other suitable holding location (e.g., transfer station, buffer, inbound lift, etc.) of the storage and retrieval system. Localization of the autonomous transport vehicle 110 relative to the case unit CUB in storage location 130S2 is effected with the physical characteristic sensor system 270 and/or the supplemental navigation sensor system 288 in the manner described herein. The at least first case unit CUA and the at least second case unit CUB may comprising more than one case in ordered sequence corresponding to a predetermined case out order sequence of mixed cases.

The autonomous guided vehicle 110 traverses the picking aisle 130A1 and/or transfer deck 130B, with both the at least first case unit CUA and the at least second case unit CUB held within the payload bed 210B, to a predetermined destination (such as outbound lift 150B1). The positions of the at least first case unit CUA and the at least second case unit CUB within the payload bed 210B may be monitored by at least one or more of the case unit monitoring cameras 410A, 410B, one or more three-dimensional imaging system 440A, 440B, and one or more case edge detection sensors 450A, 450B and arranged relative to one another (e.g., the supplemental navigation sensor system 288 at least in part effects on-the-fly justification and/or sortation of case units onboard the vehicle 110 in a manner substantially similar to that described in U.S. Pat. No. 10,850,921, the disclosure of which was previously incorporated herein by reference in its entirety) within the payload bed 210B (e.g., with the justification blades 471, pushers 470, and/or pullers 472) based on data obtained from the at least one or more of the case unit monitoring cameras 410A, 410B, one or more three-dimensional imaging system 440A, 440B, and one or more case edge detection sensors 450A, 450B. The autonomous transport vehicle 110 is localized (e.g., positioned) relative to the destination location with the physical characteristic sensor system 270 and/or the supplemental navigation sensor system 288 in the manner described herein. At the destination location the autonomous transport vehicle 110 places the at least first case unit CUA and/or the at least second case unit CUB (FIG. 14, Block 1430) where the transfer arm 210A is moved based on data obtained by one or more of the physical characteristic sensor system 270 and/or the supplemental navigation sensor system 288.

Referring to FIGS. 1A, 2, 4D, 15, and 16 an exemplary method will be described in accordance with aspects of the disclosed embodiment. The method includes providing the autonomous transport vehicle 110 (FIG. 16, Block 1700) as described herein. The autonomous transport vehicle 110 is configured to autonomously navigate to different positions with the navigation system and operates to effect predetermined transfer tasks at the different positions (FIG. 16, Block 1705) while incidentally capturing image data (FIG. 16, Block 1710) with the supplemental hazard sensor system 290. As described herein, the image data informs objects and/or spatial features 299 (having intrinsic physical characteristics) within at least a portion of the facility 100 viewed by the at least one camera 292 of the supplemental hazard sensor system 290 with the autonomous transport vehicle 110 in the different positions in the facility 100.

The method may also include determining, with the vision system controller 122VC, from the information of the supplemental hazard sensor system 290 presence of a predetermined physical characteristic of at least one object or spatial feature (FIG. 16, Block 1715), and in response thereto, selectably reconfiguring the vehicle from an autonomous state to a collaborative vehicle state (FIG. 16, Block 1720) for collaboration with an operator, the vehicle in the collaborative state is disposed to receive operator commands for the vehicle to continue effecting vehicle operation so as to finalize discrimination of the object or spatial feature 299 as a hazard (FIG. 16, Block 1725) and identify a mitigation action of the vehicle with respect to the hazard (FIG. 16, Block 1730) as described herein.

The vision system controller 122VC may also register the captured image data and generating therefrom at least one image of the presence of a predetermined physical characteristic of the at least one object or spatial feature 299 (FIG. 16, Block 1735) where, as described herein, the at least one image is formatted as a virtual representation VR of the predetermined physical characteristic of the at least one object or spatial feature 299 so as to provide comparison to one or more corresponding reference (e.g., a corresponding feature of the virtual model 400VM that serves as a reference for identifying the form and/or location of the imaged object or spatial feature 299) of the predetermined features of the reference representation 400VMR. As described herein, the vision system controller 122VC is configured so that the virtual representation VR, of the imaged object or spatial feature 299, is effected resident on (e.g., onboard) the autonomous transport vehicle 110, and the comparison between the virtual representation VR of the object or spatial feature 299 and the one or more corresponding reference predetermined features (of the reference representation 400VMR) is effected resident on the autonomous transport vehicle 110.

In the method, the vision system controller 122VC may determine presence of an unknown physical characteristic of the at least one object or spatial feature and switch the autonomous transport vehicle 110 from an autonomous operation state to a collaborative operation state. With the above noted switching effected, the controller 122 is configured to: stop the autonomous transport vehicle 110 relative to the object or spatial feature 299 or select an autonomous guided vehicle path and trajectory bringing the autonomous transport vehicle 110 from a position at switching to a location 157 to initiate communication to an operator for identifying the object or spatial feature 299 via a user interface device UI.

The controller 122VC transmits, via a wireless communication system (such as network 180) communicably coupling the vision system controller 122VC and the operator/user interface UI, an image (see FIG. 15) (FIG. 16, Block 1740) combining the virtual representation VR of the one or more imaged object or spatial feature 299 and one or more corresponding reference predetermined features RPF of a reference presentation RPP presenting the operator with an augmented (or un-augmented) reality image in real time. The controller 122 receives real time operator commands to the autonomous transport vehicle 110, which commands are responsive to the real time augmented reality or un-augmented image (see FIG. 15), and changes in the real time augmented reality or un-augmented image transmitted to the operator by the vision system controller 122VC.

In accordance with one or more aspects of the disclosed embodiment an autonomous guided vehicle comprises:
  a frame with a payload hold;
  a drive section coupled to the frame with drive wheels supporting the autonomous guided vehicle on a traverse surface, the drive wheels effect vehicle traverse on the traverse surface moving the autonomous guided vehicle over the traverse surface in a facility;
  a payload handler coupled to the frame configured to transfer a payload, with a flat undeterministic seating surface seated in the payload hold, to and from the payload hold of the autonomous guided vehicle and a storage location, of the payload, in a storage array;
  a physical characteristic sensor system connected to the frame having electro-magnetic sensors, each responsive to interaction or interface of a sensor emitted or generated electro-magnetic beam or field with a physical characteristic, the electro-magnetic beam or field being disturbed by interaction or interface with the physical characteristic, and which disturbance is detected by and effects sensing by the electro-magnetic sensor of the physical characteristic, wherein the physical characteristic sensor system is configured to generate sensor data embodying at least one of a vehicle navigation pose or location information and payload pose or location information; and
  a supplemental sensor system, connected to the frame, that supplements the physical characteristic sensor system, the supplemental sensor system being, at least in part, a vision system with cameras disposed to capture image data informing the at least one of a vehicle navigation pose or location and payload pose or location supplement to the information of the physical characteristic sensor system.

In accordance with one or more aspects of the disclosed embodiment the autonomous guided vehicle further comprises a controller connected to the frame, operably connected to the drive section or the payload handler, and communicably connected to the physical characteristic sensor system, wherein the controller is configured to determine from the information of the physical characteristic sensor system vehicle pose and location effecting independent guidance of the autonomous guided vehicle traversing the facility.

In accordance with one or more aspects of the disclosed embodiment the controller is configured to determine from the information of the physical characteristic sensor system payload pose and location effecting independent underpick and place of the payload to and from the storage location and independent underpick and place of the payload in the payload hold.

In accordance with one or more aspects of the disclosed embodiment the controller is programmed with a reference representation of predetermined features defining at least part of the facility traversed through by the autonomous guided vehicle.

In accordance with one or more aspects of the disclosed embodiment the controller is configured to register the captured image data and generate therefrom at least one image of one or more features of the predetermined features, the at least one image being formatted as a virtual representation of the one or more predetermined features so as to provide comparison to one or more corresponding reference of the predetermined features of the reference representation.

In accordance with one or more aspects of the disclosed embodiment the controller is configured so that the virtual representation, of the imaged one or more features of the predetermined features, is effected resident on the autonomous guided vehicle, and comparison between the virtual representation of the one or more imaged predetermined features and the one or more corresponding reference predetermined features is effected resident on the autonomous guided vehicle.

In accordance with one or more aspects of the disclosed embodiment the controller is configured to confirm autonomous guided vehicle pose and location information registered by the controller from the physical characteristic sensor system based on the comparison between the virtual representation and the reference representation.

In accordance with one or more aspects of the disclosed embodiment the controller is configured to identify a variance in the autonomous guided vehicle pose and location based on the comparison between the virtual representation and the reference representation, and update or complete autonomous guided vehicle pose or location information from the physical characteristic sensor system based on the variance.

In accordance with one or more aspects of the disclosed embodiment the controller is configured to determine a pose error in the information from the physical characteristic sensor system and fidelity of the autonomous guided vehicle pose and location information from the physical characteristic sensor system based on at least one of the identified variance and analysis of the at least one image, and assign a confidence value according to at least one of the pose error and the fidelity.

In accordance with one or more aspects of the disclosed embodiment the controller is configured so that with the confidence value below a predetermined threshold, the controller switches autonomous guided vehicle navigation based on pose and location information generated from the virtual representation in place of pose and location information from the physical characteristic sensor system.

In accordance with one or more aspects of the disclosed embodiment after switching, the controller is configured to:
continue autonomous guided vehicle navigation to destination, or
select an autonomous guided vehicle safe path and trajectory bringing the autonomous guided vehicle from a position at switching to a safe location for shut down, or
initiate communication to an operator identifying autonomous guided vehicle kinematic data and a destination for operator selection of autonomous guided vehicle control from automatic operation to quasi automatic operation or manual operation via a user interface device.

In accordance with one or more aspects of the disclosed embodiment the controller is configured to confirm payload pose and location information registered by the controller from the physical characteristic sensor system based on the comparison between the virtual representation and the reference representation.

In accordance with one or more aspects of the disclosed embodiment the controller is configured to identify a variance in the payload pose and location based on the comparison between the virtual representation and the reference representation, and update or complete payload pose or location information from the physical characteristic sensor system based on the variance.

In accordance with one or more aspects of the disclosed embodiment the controller is configured to determine a pose error in the information from the physical characteristic sensor system and fidelity of the payload pose and location information from the physical characteristic sensor system based on at least one of the identified variance and analysis of the at least one image, and assign a confidence value according to at least one of the pose error and the fidelity.

In accordance with one or more aspects of the disclosed embodiment the controller is configured so that with the confidence value below a predetermined threshold, the controller switches autonomous guided vehicle payload handling based on pose and location information generated from the virtual representation in place of pose and location information from the physical characteristic sensor system.

In accordance with one or more aspects of the disclosed embodiment after switching, the controller is configured to:
continue autonomous guided vehicle handling to destination, or
initiate communication to an operator identifying payload data along with an operator selection of autonomous guided vehicle control from automatic payload handling operation to quasi automatic payload handling operation or manual payload handling operation via a user interface device.

In accordance with one or more aspects of the disclosed embodiment the controller is configured to transmit, via a wireless communication system communicably coupling the controller and an operator interface, a simulation image combining the virtual representation of the one or more imaged predetermined features and one or more corresponding reference predetermined features of a reference presentation presenting the operator with an augmented reality image in real time.

In accordance with one or more aspects of the disclosed embodiment the controller is configured to receive real time operator commands to the traversing autonomous guided vehicle, which commands are responsive to the real time augmented reality image, and changes in the real time augmented reality image transmitted to the operator by the controller.

In accordance with one or more aspects of the disclosed embodiment the supplemental sensor system at least in part effects on-the-fly justification and/or sortation of case units onboard the autonomous guided vehicle.

In accordance with one or more aspects of the disclosed embodiment imaged or viewed objects described by one or more of supplemental information, supplemental vehicle navigation pose or location, and supplemental payload pose or location, from the supplemental sensor system, are coapted to a reference model of one or more of surrounding facility features and interfacing facility features so as to enhance, via the one or more of the supplemental information, the supplemental vehicle navigation pose or location, and the supplemental payload pose or location resolution of one or more of the vehicle navigation pose or location information and the payload pose or location information.

In accordance with one or more aspects of the disclosed embodiment an autonomous guided vehicle comprises:
  a frame with a payload hold;
  a drive section coupled to the frame with drive wheels supporting the vehicle on a traverse surface, the drive wheels effect vehicle traverse on the traverse surface moving the autonomous guided vehicle over the traverse surface in a facility;
  a payload handler coupled to the frame configured to transfer a payload, with a flat undeterministic seating surface seated in the payload hold, to and from the payload hold of the autonomous guided vehicle and a storage location, of the payload, in a storage array;
  a physical characteristic sensor system connected to the frame having electro-magnetic sensors, each responsive to interaction or interface of a sensor emitted or generated electro-magnetic beam or field with a physical characteristic, the electro-magnetic beam or field being disturbed by interaction or interface with the physical characteristic, and which disturbance is detected by and effects sensing by the electro-magnetic sensor of the physical characteristic, wherein the physical characteristic sensor system is configured to generate sensor data embodying at least one of a vehicle navigation pose or location information and payload pose or location information; and
  an auxiliary sensor system, connected to the frame, that is separate and distinct from the physical characteristic sensor system, the auxiliary sensor system being, at least in part, a vision system with cameras disposed to capture image data informing the at least one of a vehicle navigation pose or location and payload pose or location which image data is auxiliary information to the information of the physical characteristic sensor system.

In accordance with one or more aspects of the disclosed embodiment the autonomous guided vehicle further comprises a controller connected to the frame, operably connected to the drive section or the payload handler, and communicably connected to the physical characteristic sensor system, wherein the controller is configured to determine from the information of the physical characteristic sensor system vehicle pose and location effecting independent guidance of the autonomous guided vehicle traversing the facility.

In accordance with one or more aspects of the disclosed embodiment the controller is configured to determine from the information of the physical characteristic sensor system payload pose and location effecting independent underpick and place of the payload to and from the storage location and independent underpick and place of the payload in the payload hold.

In accordance with one or more aspects of the disclosed embodiment the controller is programmed with a reference representation of predetermined features defining at least part of the facility traversed through by the autonomous guided vehicle.

In accordance with one or more aspects of the disclosed embodiment the controller is configured to register the captured image data and generate therefrom at least one image of one or more features of the predetermined features, the at least one image being formatted as a virtual representation of the one or more predetermined features so as to provide comparison to one or more corresponding reference of the predetermined features of the reference representation.

In accordance with one or more aspects of the disclosed embodiment the controller is configured so that the virtual representation, of the imaged one or more features of the predetermined features, is effected resident on the autonomous guided vehicle, and comparison between the virtual representation of the one or more imaged predetermined features and the one or more corresponding reference predetermined features is effected resident on the autonomous guided vehicle.

In accordance with one or more aspects of the disclosed embodiment the controller is configured to confirm autonomous guided vehicle pose and location information registered by the controller from the physical characteristic sensor system based on the comparison between the virtual representation and the reference representation.

In accordance with one or more aspects of the disclosed embodiment the controller is configured to identify a variance in the autonomous guided vehicle pose and location based on the comparison between the virtual representation and the reference representation, and update or complete autonomous guided vehicle pose or location information from the physical characteristic sensor system based on the variance.

In accordance with one or more aspects of the disclosed embodiment the controller is configured to determine a pose error in the information from the physical characteristic sensor system and fidelity of the autonomous guided vehicle pose and location information from the physical characteristic sensor system based on at least one of the identified variance and analysis of the at least one image, and assign a confidence value according to at least one of the pose error and the fidelity.

In accordance with one or more aspects of the disclosed embodiment the controller is configured so that with the confidence value below a predetermined threshold, the controller switches autonomous guided vehicle navigation based on pose and location information generated from the virtual representation in place of pose and location information from the physical characteristic sensor system.

In accordance with one or more aspects of the disclosed embodiment after switching, the controller is configured to:

continue autonomous guided vehicle navigation to destination or select an autonomous guided vehicle safe path and trajectory bringing the autonomous guided vehicle from a position at switching to a safe location for shut down, or initiate communication to an operator identifying autonomous guided vehicle kinematic data and a destination for operator selection of autonomous guided vehicle control from automatic operation to quasi automatic operation or manual operation via a user interface device.

In accordance with one or more aspects of the disclosed embodiment the controller is configured to confirm payload pose and location information registered by the controller from the physical characteristic sensor system based on the comparison between the virtual representation and the reference representation.

In accordance with one or more aspects of the disclosed embodiment the controller is configured to identify a variance in the payload pose and location based on the comparison between the virtual representation and the reference representation, and update or complete payload pose or location information from the physical characteristic sensor system based on the variance.

In accordance with one or more aspects of the disclosed embodiment the controller is configured to determine a pose error in the information from the physical characteristic sensor system and fidelity of the payload pose and location information from the physical characteristic sensor system based on at least one of the identified variance and analysis of the at least one image, and assign a confidence value according to at least one of the pose error and the fidelity.

In accordance with one or more aspects of the disclosed embodiment the controller is configured so that with the confidence value below a predetermined threshold, the controller switches autonomous guided vehicle payload handling based on pose and location information generated from the virtual representation in place of pose and location information from the physical characteristic sensor system.

In accordance with one or more aspects of the disclosed embodiment after switching, the controller is configured to:

continue autonomous guided vehicle handling to destination, or initiate communication to an operator identifying payload data along with an operator selection of autonomous guided vehicle control from automatic payload handling operation to quasi automatic payload handling operation or manual payload handling operation via a user interface device.

In accordance with one or more aspects of the disclosed embodiment the controller is configured to transmit, via a wireless communication system communicably coupling the controller and an operator interface, a simulation image combining the virtual representation of the one or more imaged predetermined features and one or more corresponding reference predetermined features of a reference presentation presenting the operator with an augmented reality image in real time.

In accordance with one or more aspects of the disclosed embodiment the controller is configured to receive real time operator commands to the traversing autonomous guided vehicle, which commands are responsive to the real time augmented reality image, and changes in the real time augmented reality image transmitted to the operator by the controller.

In accordance with one or more aspects of the disclosed embodiment the supplemental sensor system at least in part effects on-the-fly justification and/or sortation of case units onboard the autonomous guided vehicle.

In accordance with one or more aspects of the disclosed embodiment imaged or viewed objects described by one or more of supplemental information, supplemental vehicle navigation pose or location, and supplemental payload pose or location, from the auxiliary sensor system, are coapted to a reference model of one or more of surrounding facility features and interfacing facility features so as to enhance, via the one or more of the supplemental information, the supplemental vehicle navigation pose or location, and the supplemental payload pose or location resolution of one or more of the vehicle navigation pose or location information and the payload pose or location information.

In accordance with one or more aspects of the disclosed embodiment a method comprises:

providing an autonomous guided vehicle with:

a frame with a payload hold, a drive section coupled to the frame with drive wheels supporting the autonomous guided vehicle on a traverse surface, the drive wheels effect vehicle traverse on the traverse surface moving the autonomous guided vehicle over the traverse surface in a facility, and a payload handler coupled to the frame configured to transfer a payload, with a flat undeterministic seating surface seated in the payload hold, to and from the payload hold of the autonomous guided vehicle and a storage location, of the payload, in a storage array;

generating sensor data with physical characteristic sensor system, the sensor data embodying at least one of a vehicle navigation pose or location information and payload pose or location information, wherein the physical characteristic sensor system connected to the frame and has electro-magnetic sensors, each responsive to interaction or interface of a sensor emitted or generated electro-magnetic beam or field with a physical characteristic, the electro-magnetic beam or field being disturbed by interaction or interface with the physical characteristic, and which disturbance is detected by and effects sensing by the electro-magnetic sensor of the physical characteristic; and capturing image data with a supplemental sensor system, the image data informing the at least one of a vehicle navigation pose or location and payload pose or location supplement to the information of the physical characteristic sensor system, wherein the supplemental sensor system is connected to the frame and supplements the physical characteristic sensor system, the supplemental sensor system being, at least in part, a vision system with cameras disposed to capture the image data.

In accordance with one or more aspects of the disclosed embodiment the method further comprises determining, with a controller, from the information of the physical characteristic sensor system vehicle pose and location effecting independent guidance of the autonomous guided vehicle traversing the facility, wherein the controller is connected to the frame and operably connected to the drive section or the payload handler, and communicably connected to the physical characteristic sensor system.

In accordance with one or more aspects of the disclosed embodiment the method further comprises, with the controller, determining from the information of the physical characteristic sensor system payload pose and location effecting independent underpick and place of the payload to and from the storage location and independent underpick and place of the payload in the payload hold.

In accordance with one or more aspects of the disclosed embodiment the controller is programmed with a reference representation of predetermined features defining at least part of the facility traversed through by the autonomous guided vehicle.

In accordance with one or more aspects of the disclosed embodiment the method further comprises, with the controller, registering the captured image data and generating therefrom at least one image of one or more features of the predetermined features, the at least one image being formatted as a virtual representation of the one or more predetermined features so as to provide comparison to one or more corresponding reference of the predetermined features of the reference representation.

In accordance with one or more aspects of the disclosed embodiment the controller is configured so that the virtual representation, of the imaged one or more features of the predetermined features, is effected resident on the autonomous guided vehicle, and comparison between the virtual representation of the one or more imaged predetermined features and the one or more corresponding reference predetermined features is effected resident on the autonomous guided vehicle.

In accordance with one or more aspects of the disclosed embodiment the method further comprises, with the controller, confirming autonomous guided vehicle pose and location information registered by the controller from the physical characteristic sensor system based on the comparison between the virtual representation and the reference representation.

In accordance with one or more aspects of the disclosed embodiment the method further comprises, with the controller, identifying a variance in the autonomous guided vehicle pose and location based on the comparison between the virtual representation and the reference representation, and updating or completing autonomous guided vehicle pose or location information from the physical characteristic sensor system based on the variance.

In accordance with one or more aspects of the disclosed embodiment the controller determines a pose error in the information from the physical characteristic sensor system and fidelity of the autonomous guided vehicle pose and location information from the physical characteristic sensor system based on at least one of the identified variance and analysis of the at least one image, and assign a confidence value according to at least one of the pose error and the fidelity.

In accordance with one or more aspects of the disclosed embodiment, with the confidence value below a predetermined threshold, the controller switches autonomous guided vehicle navigation based on pose and location information generated from the virtual representation in place of pose and location information from the physical characteristic sensor system.

In accordance with one or more aspects of the disclosed embodiment after switching, the controller is configured to:
continue autonomous guided vehicle navigation to destination or select an autonomous guided vehicle safe path and trajectory bringing the autonomous guided vehicle from a position at switching to a safe location for shut down, or
initiate communication to an operator identifying autonomous guided vehicle kinematic data and a destination for operator selection of autonomous guided vehicle control from automatic operation to quasi automatic operation or manual operation via a user interface device.

In accordance with one or more aspects of the disclosed embodiment the controller confirms payload pose and location information registered by the controller from the physical characteristic sensor system based on the comparison between the virtual representation and the reference representation.

In accordance with one or more aspects of the disclosed embodiment the controller identifies a variance in the payload pose and location based on the comparison between the virtual representation and the reference representation, and update or complete payload pose or location information from the physical characteristic sensor system based on the variance.

In accordance with one or more aspects of the disclosed embodiment the controller determines a pose error in the information from the physical characteristic sensor system and fidelity of the payload pose and location information from the physical characteristic sensor system based on at least one of the identified variance and analysis of the at least one image, and assign a confidence value according to at least one of the pose error and the fidelity.

In accordance with one or more aspects of the disclosed embodiment, with the confidence value below a predetermined threshold, the controller switches autonomous guided vehicle payload handling based on pose and location information generated from the virtual representation in place of pose and location information from the physical characteristic sensor system.

In accordance with one or more aspects of the disclosed embodiment after switching, the controller is configured to:
continue autonomous guided vehicle handling to destination, or
initiate communication to an operator identifying payload data along with an operator selection of autonomous guided vehicle control from automatic payload handling operation to quasi automatic payload handling operation or manual payload handling operation via a user interface device.

In accordance with one or more aspects of the disclosed embodiment the controller transmits, via a wireless communication system communicably coupling the controller and an operator interface, a simulation image combining the virtual representation of the one or more imaged predetermined features and one or more corresponding reference predetermined features of a reference presentation presenting the operator with an augmented reality image in real time.

In accordance with one or more aspects of the disclosed embodiment the controller receives real time operator commands to the traversing autonomous guided vehicle, which commands are responsive to the real time augmented reality image, and changes in the real time augmented reality image transmitted to the operator by the controller.

In accordance with one or more aspects of the disclosed embodiment controller effects, with at least the supplemental sensor system, justification and/or sortation of case units onboard the autonomous guided vehicle.

In accordance with one or more aspects of the disclosed embodiment imaged or viewed objects described by one or more of supplemental information, supplemental vehicle navigation pose or location, and supplemental payload pose or location, from the supplemental sensor system, are coapted to a reference model of one or more of surrounding facility features and interfacing facility features so as to enhance, via the one or more of the supplemental information, the supplemental vehicle navigation pose or location, and the supplemental payload pose or location resolution of one or more of the vehicle navigation pose or location information and the payload pose or location information.

In accordance with one or more aspects of the disclosed embodiment an autonomous guided vehicle comprises:
- a frame with a payload hold;
- a drive section coupled to the frame with drive wheels supporting the vehicle on a traverse surface, the drive wheels effect vehicle traverse on the traverse surface moving the vehicle over the traverse surface in a facility;
- a payload handler coupled to the frame configured to transfer a payload to and from the payload hold of the vehicle and a storage location, of the payload, in a storage array;
- a supplemental sensor system, connected to the frame for collaboration of the vehicle and an operator, supplemental sensor system supplements a vehicle autonomous navigation/operation sensor system configured to at least collect sensory data embodying vehicle pose and location information for auto navigation by the vehicle of the facility,
- wherein the supplemental sensor system is, at least in part, a vision system with at least one camera disposed to capture image data informing objects and/or spatial features within at least a portion of the facility viewed by the at least one camera with the vehicle in different positions in the facility; and
- a controller connected to the frame and communicably coupled to the supplemental sensor system so as to register the information from the image data of the at least one camera, and the controller is configured to determine, from the information, presence of a predetermined physical characteristic of at least one object or spatial feature, and in response thereto, selectably reconfigure the vehicle from an autonomous state to a collaborative vehicle state disposed to receive operator commands for the vehicle to continue effecting vehicle operation.

In accordance with one or more aspects of the disclosed embodiment the predetermined physical characteristic is that the at least one object or spatial feature extends across at least part of, the traverse surface, a vehicle traverse path across the traverse surface or through space of the vehicle or another different vehicle traversing the traverse surface In accordance with one or more aspects of the disclosed embodiment the controller is programmed with a reference representation of predetermined features defining at least in part the facility traversed through by the vehicle.

In accordance with one or more aspects of the disclosed embodiment the controller is configured to register the captured image data and generate therefrom at least one image of the at least one object or spatial feature showing the predetermined physical characteristic.

In accordance with one or more aspects of the disclosed embodiment the at least one image is formatted as a virtual representation of the at least one object or spatial feature so as to provide comparison to one or more reference features of the predetermined features of the reference representation.

In accordance with one or more aspects of the disclosed embodiment the controller is configured to identify the presence of the predetermined physical characteristic of the object or spatial feature based on the comparison between the virtual representation and the reference representation, determine a dimension of the predetermined physical characteristic and command the vehicle to stop in a predetermined trajectory based on a position of the object or spatial features determined from the comparison.

In accordance with one or more aspects of the disclosed embodiment a stop position in the predetermined trajectory maintains object or spatial reference within field of view of at least one camera and continued imaging of the predetermined physical characteristic, initiates a signal to at least another vehicle of one or more of a traffic obstacle, an area to avoid, or a detour area.

In accordance with one or more aspects of the disclosed embodiment the predetermined physical characteristic is determined by the controller by determining a position of the object within a reference frame of the at least one camera, that is calibrated and has a predetermined relationship to the vehicle, and from the object pose in the reference frame of the at least one camera determine presence of predetermined physical characteristic of object.

In accordance with one or more aspects of the disclosed embodiment the controller is configured such that, identification of presence and switch from the autonomous state to the collaborative vehicle state, the controller initiates transmission communicating image, identification of presence of predetermined physical characteristic, to operator interface for operator collaboration operation of the vehicle.

In accordance with one or more aspects of the disclosed embodiment the controller is configured to apply a trajectory to the autonomous guided vehicle that brings the autonomous guided vehicle to a zero velocity within a predetermined time period where motion of the autonomous guided vehicle along the trajectory is coordinated with location of the objects and/or spatial features.

In accordance with one or more aspects of the disclosed embodiment the capture of image data informing objects and/or spatial features is opportunistic during transfer of a payload to/from the payload hold of the vehicle or a storage location in a storage array.

In accordance with one or more aspects of the disclosed embodiment the controller is programmed to command the vehicle to the different positions in the facility associated with the vehicle effecting one or more predetermined payload autonomous transfer tasks, wherein each of the one or more predetermined payload autonomous transfer tasks is a separate and distinct task from the capture image data viewed by the at least one camera in the different positions.

In accordance with one or more aspects of the disclosed embodiment the controller is configured so that determination of presence of the predetermined physical characteristic of the at least one object or spatial feature is, coincident at least in part with, but supplemental and peripheral to vehicle actions effecting each of the one or more predetermined payload auto transfer tasks.

In accordance with one or more aspects of the disclosed embodiment the controller is configured so that determination of presence of the predetermined physical characteristic of the at least one object or spatial feature is, opportunistic to vehicle actions effecting each of the one or more predetermined payload auto transfer tasks.

In accordance with one or more aspects of the disclosed embodiment at least one of the one or more predetermined payload auto transfer tasks is effected at at least one of the different positions.

In accordance with one or more aspects of the disclosed embodiment the collaborative vehicle state is supplemental to the autonomous state of the vehicle effecting each of the one or more predetermined payload auto transfer tasks.

In accordance with one or more aspects of the disclosed embodiment a method comprises:

providing an autonomous guided vehicle with:
a frame with a payload hold;
a drive section coupled to the frame with drive wheels supporting the vehicle on a traverse surface, the drive wheels effect vehicle traverse on the traverse surface moving the vehicle over the traverse surface in a facility;
a payload handler coupled to the frame configured to transfer a payload to and from the payload hold of the vehicle and a storage location, of the payload, in a storage array;
generating, with a supplemental sensor system connected to the frame for collaboration of the vehicle and an operator, image data informing objects and/or spatial features within at least a portion of the facility viewed by the at least one camera with the vehicle in different positions in the facility, wherein the supplemental sensor system is, at least in part, a vision system with at least one camera disposed to capture image data and the supplemental sensor system supplements a vehicle autonomous navigation/operation sensor system configured to at least collect sensory data embodying vehicle pose and location information for auto navigation by the vehicle of the facility;
registering, with a controller connected to the frame and communicably coupled to the supplemental sensor system, the information from the image data of the at least one camera; and
determining, with the controller, from the information, presence of a predetermined physical characteristic of at least one object or spatial feature, and in response thereto, selectably reconfiguring the vehicle from an autonomous state to a collaborative vehicle state disposed to receive operator commands for the vehicle to continue effecting vehicle operation.

In accordance with one or more aspects of the disclosed embodiment the predetermined physical characteristic is that the at least one object or spatial feature extends across at least part of, the traverse surface, a vehicle traverse path across the traverse surface or through space of the vehicle or another different vehicle traversing the traverse surface.

In accordance with one or more aspects of the disclosed embodiment the controller is programmed with a reference representation of predetermined features defining at least in part the facility traversed through by the vehicle.

In accordance with one or more aspects of the disclosed embodiment the method further comprises generating, from the registered captured image data, at least one image of the at least one object or spatial feature showing the predetermined physical characteristic.

In accordance with one or more aspects of the disclosed embodiment the at least one image is formatted as a virtual representation of the at least one object or spatial feature, the method further comprising comparing the virtual representation to one or more reference features of the predetermined features of the reference representation.

In accordance with one or more aspects of the disclosed embodiment the method further comprises identifying, with the controller, the presence of the predetermined physical characteristic of the object or spatial feature based on the comparison between the virtual representation and the reference representation, determining a dimension of the predetermined physical characteristic, and commanding the vehicle to stop in a predetermined trajectory based on a position of the object or spatial features determined from the comparison.

In accordance with one or more aspects of the disclosed embodiment the method further comprises, with the vehicle in a stop position in the predetermined trajectory, maintaining the object or spatial reference within a field of view of the at least one camera and continued imaging of the predetermined physical characteristic, initiating a signal to at least another vehicle of one or more of a traffic obstacle, an area to avoid, or a detour area.

In accordance with one or more aspects of the disclosed embodiment the predetermined physical characteristic is determined by the controller by determining a position of the object within a reference frame of the at least one camera, that is calibrated and has a predetermined relationship to the vehicle, and from the object pose in the reference frame of the at least one camera determine presence of predetermined physical characteristic of the object.

In accordance with one or more aspects of the disclosed embodiment the controller is configured such that, identification of presence of the predetermined physical characteristic of the at least one object or spatial feature and switch from the autonomous state to the collaborative vehicle state, initiates transmission communicating image, identification of presence of predetermined physical characteristic, to an operator interface for operator collaboration operation of the vehicle.

In accordance with one or more aspects of the disclosed embodiment the method further comprises applying, with the controller, a trajectory to the autonomous guided vehicle bringing the autonomous guided vehicle to a zero velocity within a predetermined time period, where motion of the autonomous guided vehicle along the trajectory is coordinated with a location of the objects and/or spatial features.

In accordance with one or more aspects of the disclosed embodiment the capture of image data informing objects and/or spatial features is opportunistic during transfer of a payload to/from the payload hold of the vehicle or a storage location in a storage array.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the disclosed embodiment.

What is claimed is:

1. An autonomous guided vehicle comprising:
a frame with a payload hold;
a drive section coupled to the frame with drive wheels supporting the autonomous guided vehicle on a traverse surface, the drive wheels effect vehicle traverse on the traverse surface moving the autonomous guided vehicle over the traverse surface in a facility;
a payload handler coupled to the frame configured to transfer a payload, with a flat undeterministic seating surface seated in the payload hold, to and from the payload hold of the autonomous guided vehicle and a storage location, of the payload, in a storage array;
a physical characteristic sensor system connected to the frame having electro-magnetic sensors, each electro-magnetic sensor is responsive to interaction or interface of an electro-magnetic beam or field, emitted or generated by the electromagnetic sensor, with a physical characteristic, the electro-magnetic beam or field being disturbed by interaction or interface with the physical characteristic, and which disturbance is detected by and effects sensing by the electro-magnetic sensor of the physical characteristic, wherein the physical characteristic sensor system is configured to generate sensor data embodying at least one of a vehicle navigation pose or location information and payload pose or location information; and a supplemental sensor system, connected to the frame, that supplements the physical characteristic sensor system, the supplemental sensor system being, at least in part, a vision system with cameras disposed to capture image data informing the at least one of a vehicle navigation pose or location and payload pose or location supplemental to the sensor data embodying the at least one of the vehicle navigation pose or location information and payload pose or location information from the physical characteristic sensor system.

2. The autonomous guided vehicle of claim 1, wherein the supplemental sensor system at least in part effects on-the-fly justification and/or sortation of case units onboard the autonomous guided vehicle.

3. The autonomous guided vehicle of claim 1, wherein imaged or viewed objects described by one or more of supplemental information, supplemental vehicle navigation pose or location, and supplemental payload pose or location, from the supplemental sensor system, are coapted to a reference model of one or more of surrounding facility features and interfacing facility features so as to enhance, via the one or more of the supplemental information, the supplemental vehicle navigation pose or location, and the supplemental payload pose or location resolution of one or more of the vehicle navigation pose or location information and the payload pose or location information.

4. The autonomous guided vehicle of claim 1, further comprising a controller connected to the frame, operably connected to the drive section or the payload handler, and communicably connected to the physical characteristic sensor system, wherein the controller is configured to determine, from the sensor data embodying the at least one of the vehicle navigation pose or location information and payload pose or location information from the physical characteristic sensor system, vehicle pose and location effecting independent guidance of the autonomous guided vehicle traversing the facility.

5. The autonomous guided vehicle of claim 4, wherein the controller is configured to determine, from the sensor data embodying the at least one of the vehicle navigation pose or location information and payload pose or location information from the physical characteristic sensor system, payload pose and location effecting independent underpick and placement of the payload to and from the storage location and independent underpick and placement of the payload in the payload hold.

6. The autonomous guided vehicle of claim 4, wherein the controller is programmed with a reference representation of predetermined features defining at least part of the facility traversed through by the autonomous guided vehicle.

7. The autonomous guided vehicle of claim 4, wherein the controller is configured to transmit, via a wireless communication system communicably coupling the controller and an operator interface, a simulation image combining a virtual representation of the one or more imaged predetermined features and one or more corresponding reference predetermined features of a reference presentation presenting the operator with an augmented reality image in real time.

8. The autonomous guided vehicle of claim 7, wherein the controller is configured to receive real time operator commands to the autonomous guided vehicle, which commands are responsive to the augmented reality image, and changes in the augmented reality image transmitted to the operator by the controller, where the autonomous guided vehicle is traversing along the traverse surface and the augmented reality image is presented to the operator in real time.

9. An autonomous guided vehicle comprising:
a frame with a payload hold;
a drive section coupled to the frame with drive wheels supporting the vehicle on a traverse surface, the drive wheels effect vehicle traverse on the traverse surface moving the autonomous guided vehicle over the traverse surface in a facility;
a payload handler coupled to the frame configured to transfer a payload, with a flat undeterministic seating surface seated in the payload hold, to and from the payload hold of the autonomous guided vehicle and a storage location, of the payload, in a storage array;
a physical characteristic sensor system connected to the frame having electro-magnetic sensors, each electromagnetic sensor is responsive to interaction or interface of an electro-magnetic beam or field, emitted or generated by the electromagnetic sensor, with a physical characteristic, the electro-magnetic beam or field being disturbed by interaction or interface with the physical characteristic, and which disturbance is detected by and effects sensing by the electro-magnetic sensor of the physical characteristic, wherein the physical characteristic sensor system is configured to generate sensor data embodying at least one of a vehicle navigation pose or location information and payload pose or location information; and
an auxiliary sensor system, connected to the frame, that is separate and distinct from the physical characteristic sensor system, the auxiliary sensor system being, at least in part, a vision system with cameras disposed to capture image data informing the at least one of a vehicle navigation pose or location and payload pose or location which image data is auxiliary information to the sensor data embodying the at least one of the vehicle navigation pose or location information and payload pose or location information from the physical characteristic sensor system.

10. The autonomous guided vehicle of claim 9, wherein the auxiliary sensor system at least in part effects on-the-fly justification and/or sortation of case units onboard the autonomous guided vehicle.

11. The autonomous guided vehicle of claim 9, wherein imaged or viewed objects described by one or more of auxiliary information, auxiliary vehicle navigation pose or location, and auxiliary payload pose or location, from the auxiliary sensor system, are coapted to a reference model of one or more of surrounding facility features and interfacing facility features so as to enhance, via the one or more of the auxiliary information, the auxiliary vehicle navigation pose or location, and the auxiliary payload pose or location resolution of one or more of the vehicle navigation pose or location information and the payload pose or location information.

12. The autonomous guided vehicle of claim 9, further comprising a controller connected to the frame, operably connected to the drive section or the payload handler, and communicably connected to the physical characteristic sensor system, wherein the controller is configured to determine, from the sensor data embodying the at least one of the vehicle navigation pose or location information and payload pose or location information from the physical characteristic sensor system, vehicle pose and location effecting independent guidance of the autonomous guided vehicle traversing the facility.

13. The autonomous guided vehicle of claim 12, wherein the controller is configured to determine, from the sensor data embodying the at least one of the vehicle navigation pose or location information and payload pose or location information from the physical characteristic sensor system, payload pose and location effecting independent underpick and placement of the payload to and from the storage location and independent underpick and placement of the payload in the payload hold.

14. The autonomous guided vehicle of claim 12, wherein the controller is programmed with a reference representation of predetermined features defining at least part of the facility traversed through by the autonomous guided vehicle.

15. The autonomous guided vehicle of claim 14, wherein the controller is configured to register the captured image data and generate therefrom at least one image of one or more features of the predetermined features, the at least one image being formatted as a virtual representation of the one or more predetermined features so as to provide comparison to one or more corresponding reference of the predetermined features of the reference representation.

16. The autonomous guided vehicle of claim 12, wherein the controller is configured to transmit, via a wireless communication system communicably coupling the controller and an operator interface, a simulation image combining a virtual representation of one or more imaged predetermined features and one or more corresponding reference predetermined features of a reference presentation presenting the operator with an augmented reality image in real time.

17. The autonomous guided vehicle of claim 16, wherein the controller is configured to receive real time operator commands to the autonomous guided vehicle, which commands are responsive to the real time-augmented reality image, and changes in the augmented reality image transmitted to the operator by the controller, where the autonomous guided vehicle is traversing along the traverse surface and the augmented reality image is presented to the operator in real time.

18. A method comprising:
providing an autonomous guided vehicle with:
a frame with a payload hold,
a drive section coupled to the frame with drive wheels supporting the autonomous guided vehicle on a traverse surface, the drive wheels effect vehicle traverse on the traverse surface moving the autonomous guided vehicle over the traverse surface in a facility, and
a payload handler coupled to the frame configured to transfer a payload, with a flat undeterministic seating surface seated in the payload hold, to and from the payload hold of the autonomous guided vehicle and a storage location, of the payload, in a storage array;
generating sensor data with a physical characteristic sensor system, the sensor data embodying at least one of a vehicle navigation pose or location information and payload pose or location information, wherein the physical characteristic sensor system is connected to the frame and has electro-magnetic sensors, each electromagnetic sensor is responsive to interaction or interface of an electro-magnetic beam or field, emitted or generated by the electromagnetic sensor, with a physical characteristic, the electro-magnetic beam or field being disturbed by interaction or interface with the physical characteristic, and which disturbance is detected by and effects sensing by the electro-magnetic sensor of the physical characteristic; and
capturing image data with a supplemental sensor system, the image data informing the at least one of a vehicle navigation pose or location and payload pose or location supplemental to the sensor data embodying at least one of a vehicle navigation pose or location information and payload pose or location information from the physical characteristic sensor system, wherein the supplemental sensor system is connected to the frame and supplements the physical characteristic sensor system, the supplemental sensor system being, at least in part, a vision system with cameras disposed to capture the image data.

19. The method of claim 18, further comprising determining, with a controller, from the sensor data embodying at least one of a vehicle navigation pose or location information and payload pose or location information from the physical characteristic sensor system vehicle pose and location effecting independent guidance of the autonomous guided vehicle traversing the facility, wherein the controller is connected to the frame and operably connected to the drive section or the payload handler, and communicably connected to the physical characteristic sensor system.

20. The method of claim 19, further comprising, with the controller, determining from the sensor data embodying at least one of a vehicle navigation pose or location information and payload pose or location information from the physical characteristic sensor system payload pose and location effecting independent underpick and placement of the payload to and from the storage location and independent underpick and placement of the payload in the payload hold.

* * * * *